United States Patent [19]

Bigham et al.

[11] Patent Number: 5,740,075
[45] Date of Patent: Apr. 14, 1998

[54] ACCESS SUBNETWORK CONTROLLER FOR VIDEO DIAL TONE NETWORKS

[75] Inventors: John A. Bigham, Pottstown, Pa.; Regina S. Lightfoot, New Carrollton, Md.; William D. Goodman, Collegeville, Pa.; Ulric E. Arthur, Burtonsville, Md.; Edward Mihm, Warminster, Pa.; Kamran Sistanizadeh, Arlington, Va.; Bahman Amin-Salehi, Washington, D.C.

[73] Assignee: Bell Atlantic Network Services, Inc., Arlington, Va.

[21] Appl. No.: 413,810

[22] Filed: Mar. 28, 1995

Related U.S. Application Data

[63] Continuation-in-part of Ser. No. 304,174, Sep. 12, 1994.

[51] Int. Cl.$^6$ ............................................. H04H 1/00
[52] U.S. Cl. ...................... 364/514 C; 348/7; 348/10; 348/13; 455/3.1; 340/825
[58] Field of Search .................... 364/514 A–514 R, 364/464.01; 348/7, 6, 10, 13, 17; 455/6.3, 3, 1; 340/825

[56] References Cited

U.S. PATENT DOCUMENTS

| | | | |
|---|---|---|---|
| 5,136,411 | 8/1992 | Paik et al. | 359/125 |
| 5,195,092 | 3/1993 | Wilson et al. | 370/94.2 |
| 5,208,665 | 5/1993 | McCalley et al. | 358/86 |
| 5,220,420 | 6/1993 | Hoarty et al. | 358/86 |
| 5,231,494 | 7/1993 | Wachob | 358/146 |
| 5,247,347 | 9/1993 | Litteral et al. | 358/85 |
| 5,414,455 | 5/1995 | Hooper et al. | 348/7 |
| 5,442,390 | 8/1995 | Hooper et al. | 348/7 |
| 5,477,263 | 12/1995 | O'Callaghan et al. | 348/7 |
| 5,479,202 | 12/1995 | Beriont | 348/7 |
| 5,481,542 | 1/1996 | Logston et al. | 370/94.2 |
| 5,488,412 | 1/1996 | Majeti et al. | 348/10 |
| 5,544,161 | 8/1996 | Bigham et al. | 370/38.1 |
| 5,583,863 | 12/1996 | Darr, Jr. et al. | 370/70 |
| 5,608,447 | 3/1997 | Farry et al. | 348/7 |

*Primary Examiner*—Emanuel T. Voeltz
*Assistant Examiner*—Patrick Assouad
*Attorney, Agent, or Firm*—Lowe, Price, LeBlanc & Becker

[57] ABSTRACT

An access subnetwork provides broadcast access transport as well as selective allocation of resources for interactive communications sessions dedicated to individual end users. The access subnetwork has specified broadcast and interactive service interfaces, both for communications to and from an information provider and for communication to and from customer premises equipment. An Access Subnetwork Controller provides a single point of control contact within the access subnetwork. Any other subnetwork (typically an element of a higher level control subnetwork) needing a control function in the access subnetwork always sends the request for that function to the Access Subnetwork Controller. The primary responsibility of the Access Subnetwork Controller is to control resources, provide requested resources and monitor the use of resources within in the realm of the access subnetwork. The Access Subnetwork Controller functions essentially in a similar manner to provide every type of requested connection, whether the connection is for broadcast, pay-per-view or IMTV. Specifically, the Access Subnetwork Controller reserves and enables access subnetwork resources for a particular user connection and reports connections back to higher level control elements.

21 Claims, 15 Drawing Sheets

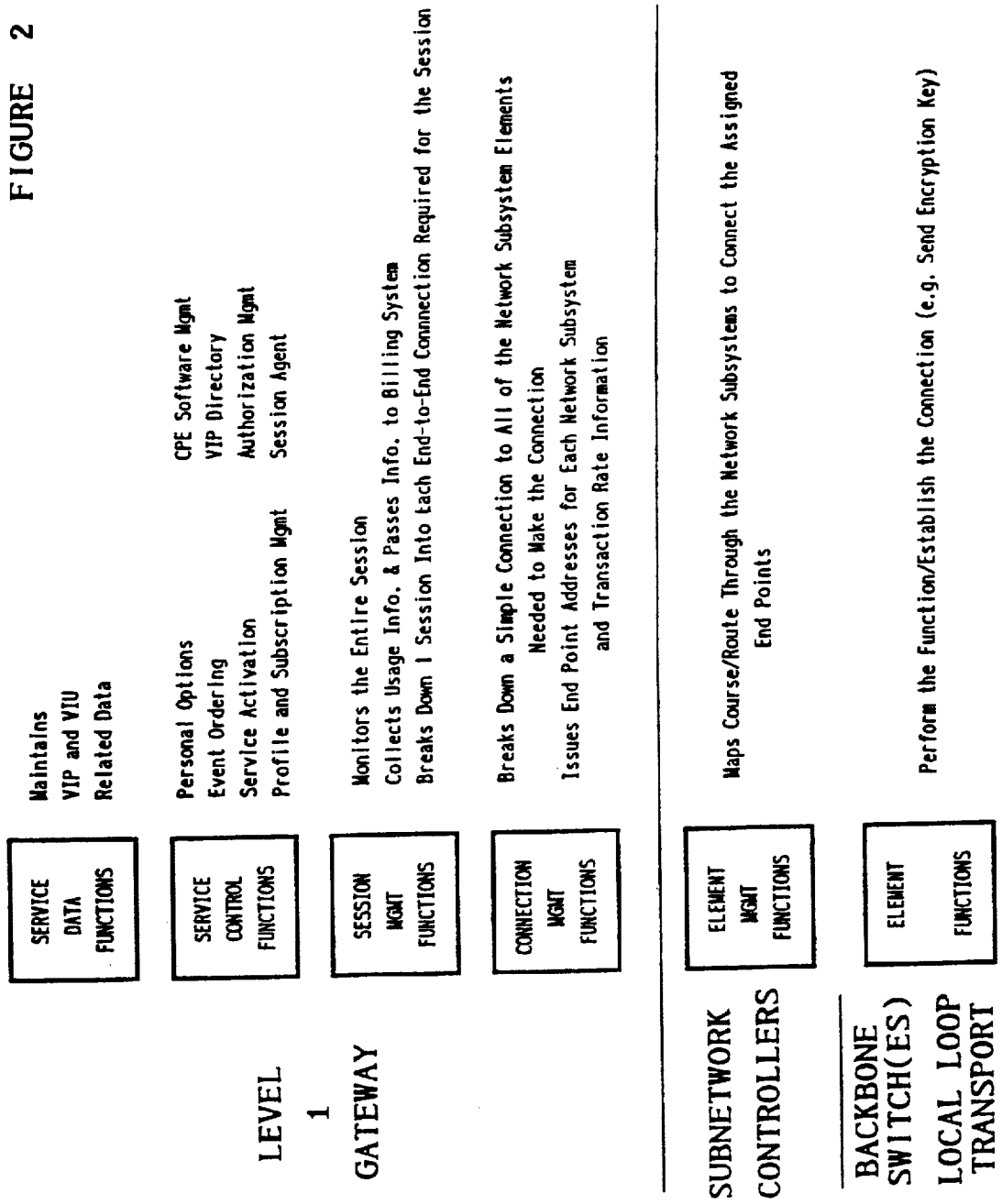

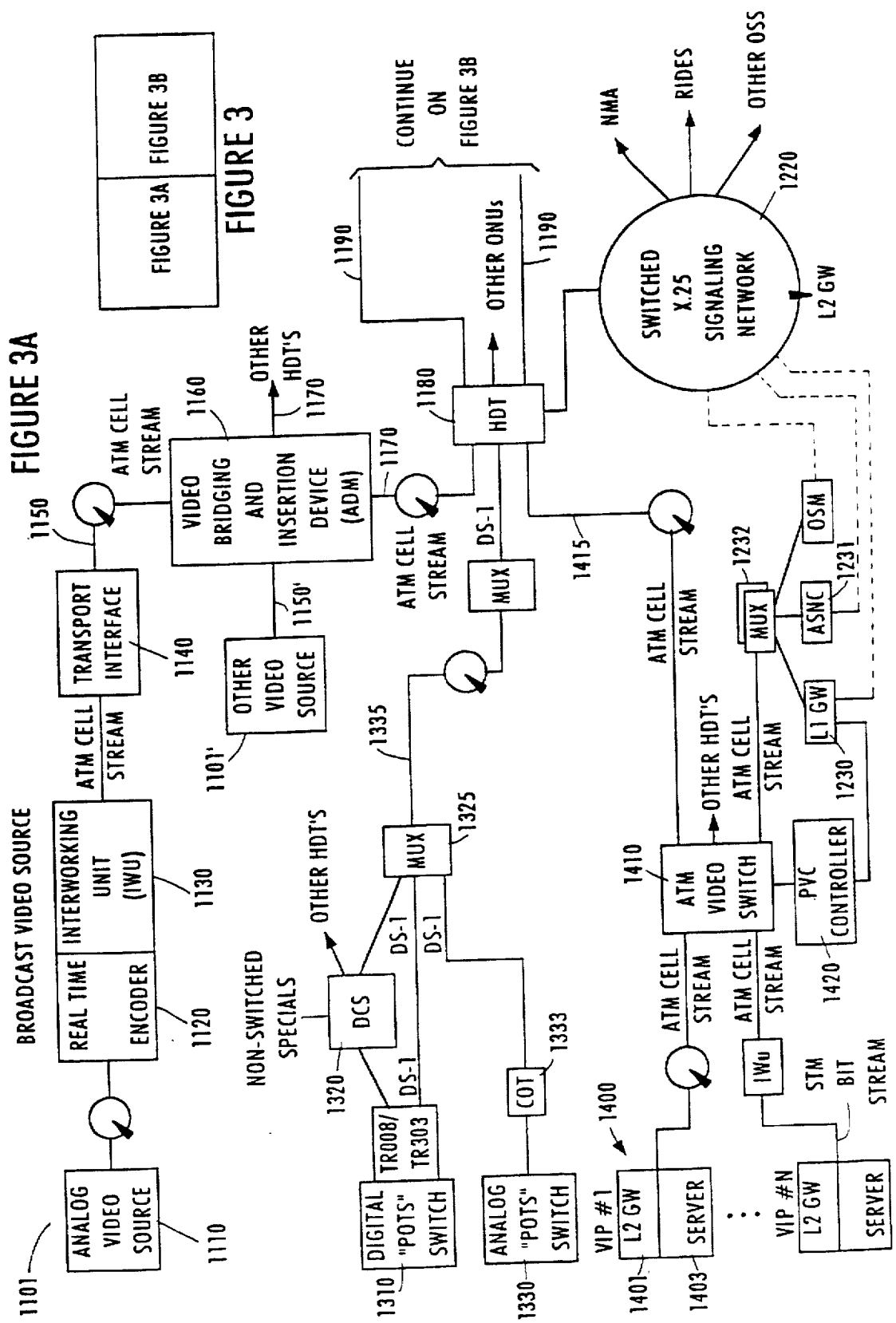

5,740,075

ACCESS SUBNETWORK CONTROLLER FOR VIDEO DIAL TONE NETWORKS

CROSS-REFERENCE TO RELATED APPLICATION

This application is a continuation-in-part of U.S. patent application Ser. No. 08/304,174 filed Sep. 12, 1994, the disclosure of which is incorporated herein by reference in its entirety.

TECHNICAL FIELD

The present invention relates to routing and access control in video distribution networks capable of providing subscribers with access to multiple information service providers for both interactive services and broadcast services.

ACRONYMS

The written description and drawings use a large number of acronyms to refer to various services and system components. Although generally known, use of several of these acronyms is not strictly standardized in the art. For purposes of this discussion, acronyms therefore will be defined as follows:

Access Subnetwork (ASN)
Access Subnetwork Controller (ASNC)
Adaptive Digital Multiplexer (ADM)
Asymmetrical Digital Subscriber Line (ADSL)
Asynchronous Transfer Mode (ATM)
ATM Adaptation Layer (AAL)
ATM cell Adaptation Unit (AAU)
ATM Packet Demultiplexer (APD)
Broadcast (BC)
Broadcast Consolidation Section (BCS)
Broadcast Service Area (BSA)
Cable Network Unit (CNU)
Carrier Access Billing System (CABS)
Cell Loss Priority (CLP) bit
Central Office (CO)
Central Office Terminal (COT)
Community Antenna Television (CATV)
Customer Record Information System (CRIS)
Customer Premises Equipment (CPE)
Digital Cross-connect Switch (DCS)
Digital Entertainment Terminal (DET)
Drop and Continue (D/C)
Electrical to Optical (E/O)
Ethernet (ENET)
First-In-First-Out (FIFO) buffers
Frequency Division Multiplexing (FDM)
Header Error Check (HEC) word
Host Digital Terminal (HDT)
Intelligent Access Peripheral (IAP)
Interactive Multimedia Television (IMTV)
Interworking Unit (IWU)
Level 1 (L1)
Level 1 Gateway (L1GW)
Level 2 (L2)
Level 2 Gateway (L2GW)
Local Area Network (LAN)
Local Loop Distribution (LLD) network
Local Video Access Node (LVAN)
Media Access Control (MAC)
Moving Pictures Experts Group (PEG)
Network Data Processor (NDP)
Network Interface Controller (NIM)
Network Interface Device (NID)
Operations and Support System (OSS)
Operations Support Module (OSM)
Optical Network Unit (ONU)
Optical to Electrical (O/E)
Over-the-Air (OTA)
Packetized Elementary Stream (PES)
Payload Type (PT)
Pay-Per-View (PPV)
Permanent Virtual Circuit (PVC)
Permanent Virtual Circuit Controller (PVCC)
Personal Identification Number (PIN)
Physical Layer Convergence Protocol (PLCP)
Plain Old Telephone Service (POTS)
Program Identification (PID) number
Program Reference Clock (PRC)
Public Access Channel (PAC)
Public Switched Network (PSN)
Quadrature Amplitude Modulation (QAM)
Quadrature Phase-Shift Keyed (QPSK) modulation
Time-Division Multiple Access (TDMA)
Vestigial Sideband (VSB) modulation
Video Dial Tone (VDT)
Video Information Provider (VIP)
Video Information User (VIU)
Video Network Hub (VNH)
Video Provider Service Center (VPSC)
Virtual Channel Identifier (VCI)
Virtual Path Identifier (VPI)

BACKGROUND

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Pat. Nos. disclose representative examples of such digital video distributions networks: 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al. discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line.

The prior art video networks have not addressed many problems which arise when the networks must be adapted to provide end users with equal access to multiple video information providers offering a wide array of services. For example, the prior art documents do not suggest an efficient procedure for managing the necessary broadcast and point-to-point connections through the network to provide desired access to large numbers of information providers.

The Assignee has proposed a switched-star digital network for delivering broadcast and interactive type services, for example in commonly assigned application Ser. No. 08/250,792, filed May 27, 1994, entitled "Full Service Network", now U.S. Pat. No. 5,608,447 the disclosure of which is incorporated herein entirely by reference. The earlier proposed network did utilize a high level control node identified as a level 1 gateway, but the lower level control functionality in that network was distributed among a wide variety of different network elements, e.g. switches, intelligent access peripherals (IAPs), etc. Each of these different network elements had a different signaling interface protocol, consequently, the level 1 gateway had to support a wide range of signaling protocols to control the disparate functions of all of the components necessary to set up each session connection through the network. Also, the level 1 gateway had to monitor and manage the functionality of many of these lower level control elements. In practice, such a control hierarchy is difficult to design and set up, it is inefficient and easy to overload, and it is prone to a variety of failures under actual operating conditions.

DISCLOSURE OF THE INVENTION

The principle object of the present invention is to provide a seamless, smooth approach for connecting a video information user (VIU) to a chosen broadcast service video information provider (VIP) or a chosen interactive service video information provider (VIP), in a multiple provider environment. The connection to the VIP of choice must be provided in a non-discriminatory manner that makes it easy for the user to get to that particular provider for either broadcast services of interactive services.

More specific objectives of the present invention relate to improving the control structure of the network to simplify initial design and set-up of the network, improve real-time efficiency of the control operations of the network, and reduce failures of the network control elements.

In accord with the present invention, the end-to-end network is subdivided into two or more subnetworks with specified open interfaces to each other. The preferred network architecture includes a backbone subnetwork and an access subnetwork. The backbone subnetwork provides point-to-point two-way communication sessions for broadband interactive multimedia communications signals with a selected one of the information providers. The access subnetwork receives digital broadband information signals from the selected information provider, via the backbone subnetwork, for transmission to one of the digital entertainment terminals. The access subnetwork also supplies control signals from the one digital entertainment terminal to the backbone subnetwork for transmission to the selected information provider. The access subnetwork also provides broadcast transport. Specifically, the access subnetwork receives broadcast digital broadband information signals for selective distribution to authorized digital entertainment terminals.

The network will also include a high level control subnetwork, e.g. including a level 1 gateway. Each transport subnetwork includes a subnetwork controller which is the single point of contact with that subnetwork for all control functions and related requests for control of services through the respective subnetwork.

The open interface between subnetworks makes interfaces and technologies within each subnetwork independent of the actual technologies within the other subnetworks. For example, the backbone subnetwork preferably utilizes Asynchronous Transfer Mode (ATM) switch technology. Such an ATM backbone network, however, works equally well with an RF broadcast based hybrid-fiber-coax type access subnetwork or with a switched digital star type access subnetwork. Similarly, either of these or other types of access subnetwork technologies could operate with alternate types of backbone networks, e.g. using direct cross connect switching or optical switching.

In accord with this design philosophy, the Access Subnetwork Controller provides a single point of control contact within the access subnetwork. Any other subnetwork (typically the control subnetwork) needing a control function in the access subnetwork always sends the request for that function to the Access Subnetwork Controller. Use of such a single control element eliminates the need for one or more of the other subnetwork control elements to interface and interact with a range of different control elements within the access subnetwork, thereby improving the efficiency of the control interface functions between the access subnetwork and the other subnetworks.

The Access Subnetwork Controller has an intense understanding of what is going on in the access subnetwork. This Controller does not understand what is going on outside of the access subnetwork. The primary responsibility of the Access Subnetwork Controller is to reserve and control resources, provide requested resources and monitor the use of resources within in the realm of the access subnetwork. Additional functions could be provided in the Access Subnetwork Controller, such as some or all of the functionality of the level 1 gateway, but inclusion of such additional functions reduces the efficiency of the Access Subnetwork Controller.

The Access Subnetwork Controller functions essentially in the same manner to provide each of a variety of different types of requested connection, whether broadcast, pay-per-view or IMTV. The Access Subnetwork Controller reserves and enables access subnetwork resources for a particular user connection and reports connections back to higher level control elements, such as the level 1 gateway. Typically, the report on connection establishment by Access Subnetwork Controller includes some information needed by other network elements in order to utilize the reserved resources.

Provisioning of a broadcast service to an individual subscriber's terminal device is administered as a connection, even though the signal is already broadcast through at least a portion of the access subnetwork, and in some networks is already broadcast all the way through to the subscriber premises. The broadcast signal, however, is not available ('connectable') through the access subnetwork to the terminal device in a manner which will permit presentation thereof to a viewer until some access control element of access subnetwork receives an appropriate instruction, as part of a connection set-up procedure. In one embodiment, the relevant control element is identified as a host digital terminal (HDT), an element serving a plurality of subscribers and selectively switching certain broadcast program channels through to subscribers terminal devices served thereby. In other embodiments, the terminal device itself includes the relevant access control element, e.g. part of a network interface module (NIM).

Examples of three different networks using the inventive Access Subnetwork Controller functionality are described in detail. As illustrated by such examples, the functions of this Controller can be incorporated into a wide variety of advanced broadband communication networks. In each network implementation, the significant purpose of the Access Subnetwork Controller is to isolate the specifics of the particular access technology and equipment from the higher level network controller and other subnetworks.

In the preferred embodiments of the enhanced video dial tone network, the backbone subnetwork comprises one or more asynchronous transfer mode (ATM) switches. A permanent virtual circuit (PVC) controller serves as the ATM backbone subnetwork controller. In the disclosed network embodiments, the access subnetwork can use either a switched digital star topology or an RF broadcast transport of both digital and analog information signals.

Of the three network architectures disclosed, the presently most preferred implementation of the access subnetwork comprises hubs which convert ATM streams into digital packet streams for RF broadcast and a number of local video access nodes connected to each hub. The local video access nodes convert ATM streams for interactive services, as received from the ATM switch, into digital packet streams for RF transmission together with the RF broadcast signals from the hub.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 2 presents a high-level overview of the control functions of a network of the type shown in FIG. 1 and delineates those functions performed by the various control elements of the network.

FIGS. 3A and 3B are a block diagram of one example of a network architecture utilizing an Access Subnetwork Controller, in accord with the present invention.

BEST MODE FOR CARRYING OUT THE INVENTION

Figure 1:
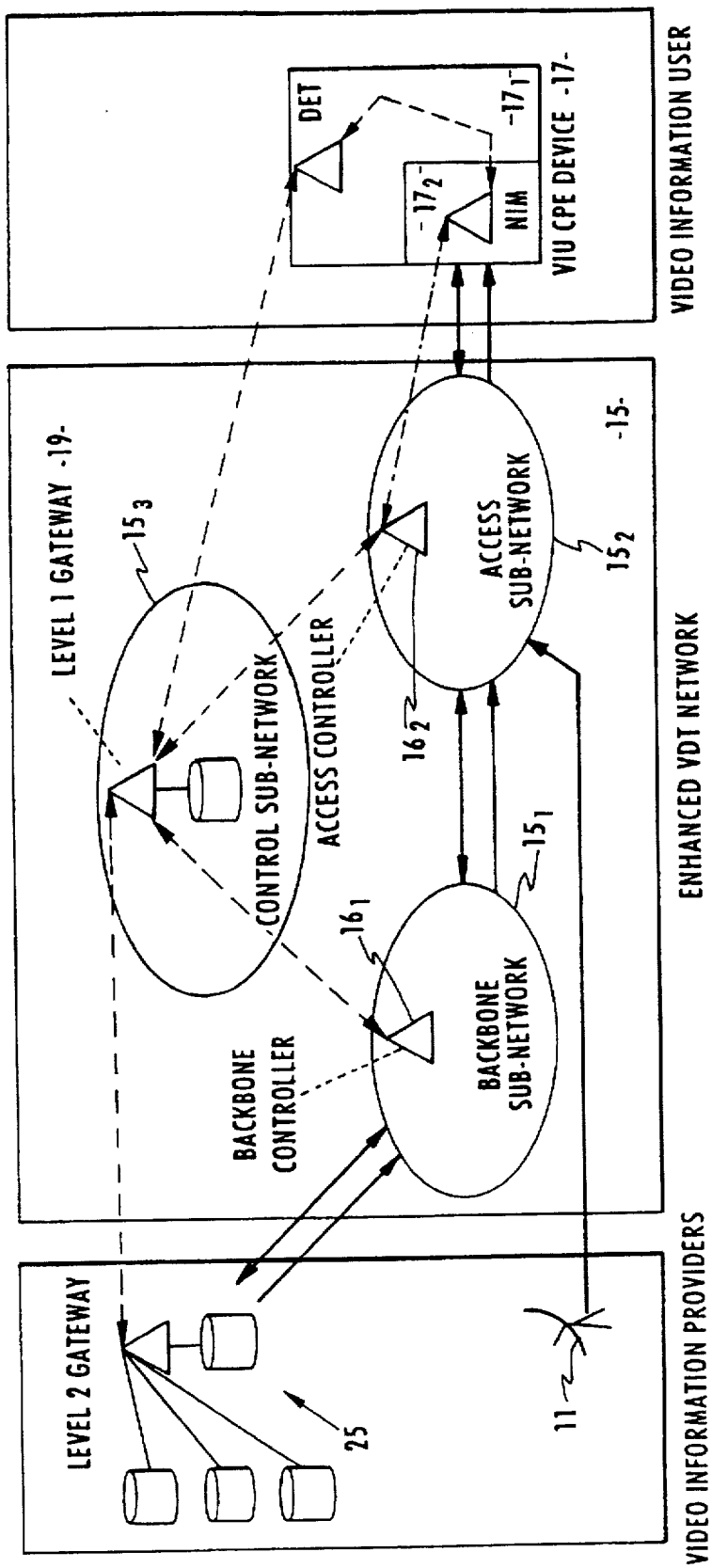
FIG. 1 is a simplified block diagram of a communication network using the Access Subnetwork Controller of the present invention to control a wide range of broadcast and interactive multi-media services.

The Access Subnetwork Controller of the present invention is useable in a variety of different broadband distribution networks which offer subscriber's selective communication with a plurality of broadband or video information service providers. FIG. 1 provides a high level, generic illustration of the functional elements of such a network, referred to as a Video Dial Tone Network. For ease of understanding, an overview of the Video Dial Tone network is set forth below, followed by a more detailed description of specific network architectures and the functions of the Access Subnetwork Controller in the presently most preferred network implementation.

Network Overview

FIG. 1 is a high level functional diagram of a network providing broadcast and interactive broadband services, through a backbone subnetwork $15_1$ and an access subnetwork $15_2$, under control of a level 1 gateway 19.

The preferred embodiment illustrated in FIGS. 5 to 9 and discussed later utilizes asynchronous transfer mode (ATM) transport in the backbone network. The access subnetwork also may utilize switched digital star technology or RF transport technology. The Access Subnetwork Controller functionality of the present invention, however, applies to those and a variety of other broadband networks using other transport technologies.

FIG. 1 therefore provides a generic illustration of the overall video dial tone (VDT) transport network 15. As shown, the network 15 comprises a backbone subnetwork $15_1$ and one or more of several possible access subnetworks $15_2$ (only one shown). The access subnetwork distributes broadcast programming to customer premises devices 17 and dynamically provides transport for interactive service related signals to and from the customer premises devices 17. The backbone subnetwork $15_1$ provides two-way communications between IMTV service VIPs and nodes of the access subnetwork $15_2$.

Certain digital program signals carried on the network may be encrypted in the access subnetwork, using encryption technology and key codes. Details of specific encryption algorithms and the key codes for encrypting and decrypting the signals are well known to those skilled in the art and familiar with the relevant patents and literature. Preferred procedures for downloading the key codes to the elements in the access subnetwork which encrypt the signals and the decoders in the CPE devices will be discussed later.

The enhanced VDT network 15 may be considered as including a separate control subnetwork $15_3$, however, the principle component of that network is the level 1 gateway 19. The control subnetwork $15_3$ will also include some means to store a variety of information relating to services provided through the network, VIPs and VIUs for use by the level 1 gateway 19, either in a separate data storage system as shown, or in storage within the computer system serving as the level 1 gateway 19. The backbone subnetwork and the access subnetwork each include a controller which is the single point of contact between the level 1 gateway 19 and the respective subnetwork. Specifically, the backbone subnetwork $15_1$ includes a backbone controller $16_1$, and the access subnetwork includes an Access Controller $16_2$ in accord with the present invention.

The Access Controller $16_2$ essentially functions in the same manner to provide every type of requested connection through the access subnetwork $15_2$, whether the connection is for a broadcast service, a pay-per-view service or an IMTV service. The Access Controller $16_2$ reserves and enables access subnetwork resources for a particular user connection and reports connections back to higher level control elements, such as the level 1 gateway.

Typically, the report on connection establishment by the Access Controller $16_2$ includes some information needed by one or more of the other network elements in order to utilize the reserved resources. For example, assume that the backbone subnetwork $15_1$ utilizes ATM transport. In ATM networks, ports and virtual path identifiers (VPIs) are pre-provisioned at network creation. In general, when a session is set up through the network, the terminals at opposite ends of the ATM connection select the ports and VPIs and assign virtual channel identifier (VCI) values, e.g. from a range of available values. Of particular note here, for ATM connections terminating on the access subnetwork, the Access Controller $16_2$ selects the terminating ports and VPIs and assigns terminating VCI values and supplies that information to the control subnetwork $15_3$.

In the network illustrated in instant FIG. 1, a number of broadcast video information providers (VIPs) operate one or more broadcast sources 11, which have a one-way connection (downstream) to various nodes of the access subnetwork $15_2$. The broadcast signals may be analog or digital or a combination of both, as discussed below. In the preferred embodiment, each digital source supplies a number of broadcast programs to the access subnetwork $15_2$ in ATM cell form.

A source 11 will supply the program signals, e.g. ATM cells containing digitized broadcast information for a broadcast service, to the network 15 at all times that the service is to be available through the network. For video services, for example, the original source video material is digitally encoded and compressed, and the digital video information is packetized in ATM cells for transport through the network 15. The ATM cells can represent service signals for broadband services (e.g. video), audio services (e.g. radio) or data services (e.g. text).

In the preferred embodiment, the VIU's customer premises equipment (CPE) 17 consists of a Digital Entertainment Terminal (DET) $17_1$ which includes a network interface module (NIM) $17_2$ adapted to connect the DET to the specific type of loop distribution plant servicing the subscriber's premises. For broadcast services, the DET $17_2$ typically is able to select and process any digital or analog channel broadcast through the access subnetwork $15_2$ to which the customer subscribes.

For premium services requiring some form of network connection control, e.g. on-line selection of a pay-per-view event, the subscriber's terminal or CPE device 17 sends a request signal to the level 1 gateway 19 within the control subnetwork $15_3$, as illustrated by the separate dotted line from the DET to the level 1 gateway 19. In one example, in response to instructions from the level 1 gateway 19, the Access Controller $16_2$ causes the access subnetwork $15_2$ to supply program signals for a requested broadcast service to the customer's CPE device 17. If the CPE terminal device (particularly the DET) requires some piece of information to enable reception, the Access Controller $16_2$ can send that information directly to the terminal, or the Controller may send the information back to the level 1 gateway which in turn relays the information to the terminal device.

The Access Controller $16_2$ supplies control information to at least one access control element of the access subnetwork $15_2$ to enable reception of the broadcast program through the DET $17_1$. The routing functionality within the access subnetwork for services depends on the structure thereof. In one embodiment, the control element is a switching element within the access subnetwork (referred to later as an HDT). In other preferred embodiments, the NIM serves as an access control element of the access subnetwork. In this later embodiment, the Access Controller sends or causes transmission through the access subnetwork of the information enabling reception of the broadcast program to the NIM $17_2$.

The level 1 gateway 19 will store usage data identifying the requested service in its associated database, for billing purposes, for audience surveys, maintenance purposes, etc.

For interactive multi-media television (IMTV) type services, the system will include a number of interactive service video information providers (VIP's) systems 25. As discussed in more detail later, each IMTV VIP 25 operates some form of source or server for transmitting information downstream through the network 15 to a terminal which has requested an interactive session with the particular VIP. Each IMTV VIP 25 also operates a control element, referred to as a level 2 gateway, which provides two-way signaling communications to the level 1 gateway 19 and provides two-way signaling communications through the network 15 to the CPE devices 17 of subscribers who have established interactive sessions with the VIP. The level 2 gateway controls operations of the server in response to instructions from the level 1 gateway 19 and various information input by subscribers through their respective CPE terminal devices 17.

The signaling communications for the IMTV VIP's 25 may go through a separate signaling network, but in the most preferred embodiments the signaling communications for those VIP's go through the backbone subnetwork $15_1$. The IMTV VIP's will typically offer broadband interactive services, such as video Ion demand, video based home shopping and video games, but these VIP's may offer other interactive services, such as interactive text services and interactive audio services (e.g. voice mail and audio on demand).

To establish a session with one of the interactive VIP's 25, a user operates his or her terminal device 17 to interact with the level 1 gateway 19 to identify the particular VIP of choice. Once the subscriber selects the VIP 25, the level 1 gateway 19 instructs the backbone subnetwork $15_1$ and the access subnetwork $15_2$ to establish at least a broadband downstream link between the VIP's server and the particular subscriber's CPE device 17 and provides any necessary information to the IMTV VIP's equipment.

If the system uses a separate signaling network, the level 1 gateway 19 or the VIP's control equipment (level 2 gateway) would initiate a parallel two-way signaling link from the VIP's control equipment to the subscriber's terminal. If the signaling rides on the backbone subnetwork $15_1$, the instructions from the level 1 gateway 19 to the controllers $16_1$ and $16_2$ could also establish the signaling link between the VIP's level 2 gateway and the subscriber's terminal device 17. Once the broadband and signaling links are up and running, the subscriber interacts with the VIP's equipment to obtain a particular desired service, e.g. to order a video of choice.

Although other digital compression encoding schemes may be used, such as DIGICIPHER™, the preferred embodiments of the present invention utilize MPEG encoding and decoding of at least the broadband information transported through the network. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. MPEG permits encoding of audio/video program materials into digitized, compressed format at rates in the range of 1.5 to 6 Mbits/s and higher.

In the illustrated network, the DET 171 includes a CPU, comprising a 386, 486 or Pentium microprocessor and associated memory (RAM, ROM and EPROM) and an audio/video decoder, controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The MPEG demultiplexer also recognizes certain packets contained in the MPEG stream as 'user data' associated with a particular program and routes that data to the CPU for further processing. The DET also includes a graphics display generator for generating displays of received text data, such as the selection menus sent from various gateway elements. The DET 17, also includes digital to analog converters and appropriate drivers to produce output signals compatible with a conventional television set from the decoded audio/video information and the graphics display. Each DET also includes means to receive selection signals from a user, typically through a remote control device (not shown) and transmit appropriate data signals over a narrowband upstream channel through the particular access subnetwork.

The digital entertainment terminal (DET) 100 is a programmable device to which different individual video information providers (VIP's) can download different applications software, through point-to-point interactive sessions or through broadcast channels. At least one VIP, typically a vendor of the DET, also can download portions of the operating system. The DET will permanently store only an operating system and a loader program, to control initial communications with the level 1 gateway 19.

The structure and operation of the DET 100, outlined above, are described in more detail in commonly assigned application Ser. No. 08/250,791, filed May 27, 1994, entitled "Dynamically Programmable Digital Entertainment Terminal", now U.S. Pat. No. 5,635,979 the disclosure of which is entirely incorporated herein by reference.

The NIM $17_2$ provides the physical interface to the subscriber line of the access subnetwork $15_2$. The NIM includes processing circuitry for providing two-way conversion between the signal formats of the main portion of the DET and the signal formats on the access subnetwork, both for downstream information reception of programming and signaling (in-band) and for two-way signaling communications (our-of-band). The structure of the main portion of the DET $17_1$ is independent of the structure of the access subnetwork. The structure of the NIM, however, depends entirely on the particular access subnetwork technology to which it connects. In some embodiments, the NIM is functionally an element of the access subnetwork and is controlled by the Access Subnetwork Controller of the present invention.

Figure 4:
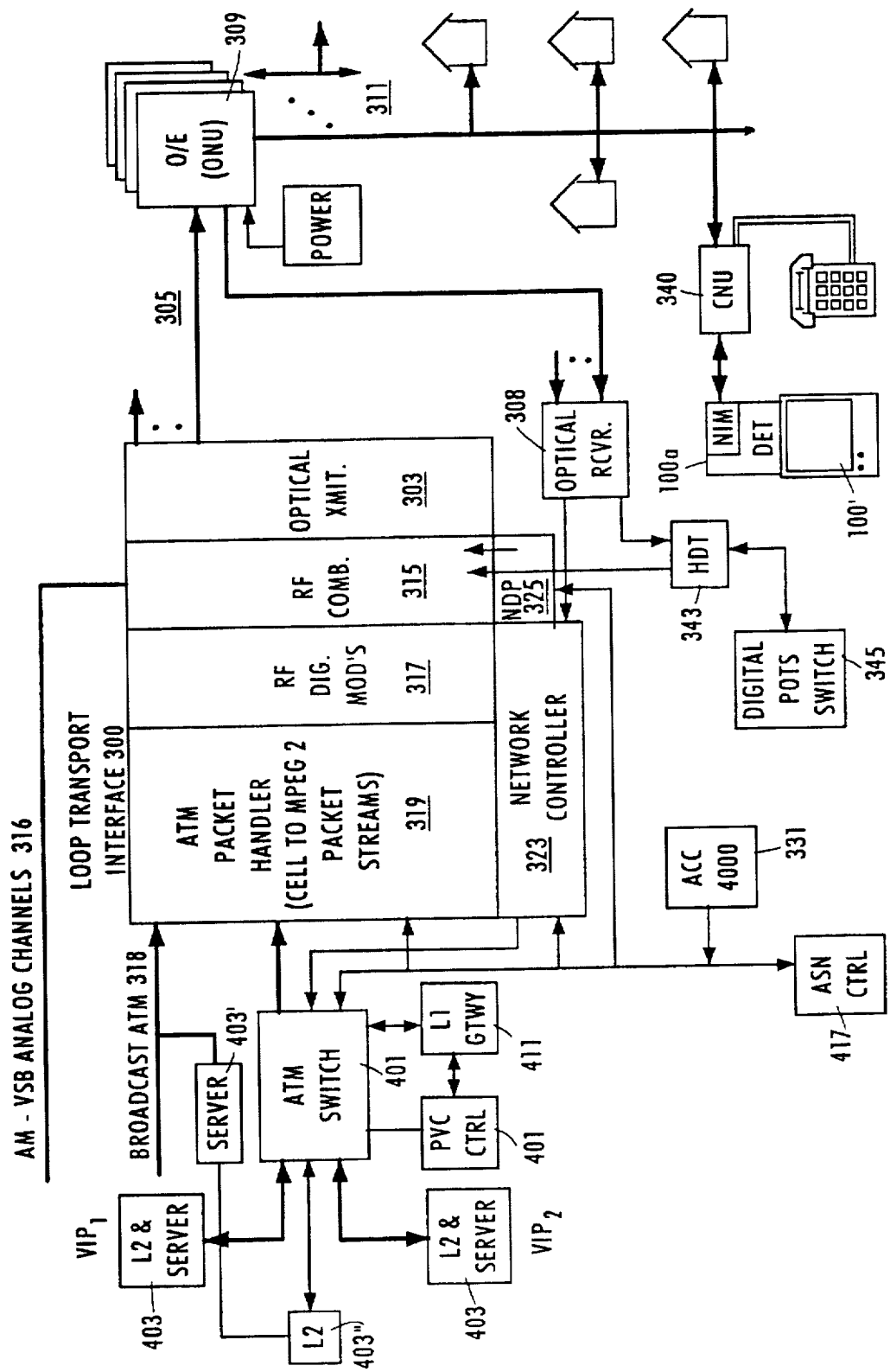
FIG. 4 illustrates a hybrid fiber coax network architecture incorporating the Access Subnetwork Controller, in accord with the present invention.

FIG. 4 depicts a functional hierarchy stack of the software and network operations relating to the level 1 gateway, the backbone network controller and the Access Subnetwork Controller. As shown in FIG. 4, the network functionality can be conceptually divided into six block elements, service data functions, service control functions, session management functions, connection management functions, element management functions and actual element functions. The service data functions, service control functions, session management functions, and connection management functions all are performed by software application modules running on the level 1 gateway 19.

In the diagram of FIG. 4 and the following description thereof, "VIU" refers to the video information user or subscriber.

The service data functions application module provides real time access to the customer and the network. The service data functions also include accumulation and maintenance of service related data. In particular, the service data includes VIP related data and subscriber or VIU (video information user) related data. The VIP related data function stores service profile information (VIP identification code, sever port information, level 2 gateway signaling address, type of DET's serviced by each VIP's equipment, etc.) for each VIP and makes that information available to the service control functionality as needed. The VIU related data function stores subscriber service profile information for each end user and makes that data available to the service control functionality as needed. The user profile data may include information such as the type of DET, DET identifications (if necessary), global address and/or billing telephone number, signaling address, etc.

The second functional level performed by an application software module running in the level 1 gateway 19 relates to the service control functions of the network. This is the level at which most of the interactions with the VIP and the subscriber take place. As shown, these interactions between the level 1 gateway and the DET include personal options, event ordering, service activation, profile and subscription management, CPE software management, VIP directory/menu, authorization management and session agent.

Personal options permits a subscriber to customize certain video dial tone related options through direct interaction with the level 1 gateway 19. Examples of personal options set up and modified through this interaction with the level 1 gateway include PIN numbers, VIP menus, and hours of service. Another personal option might allow the subscriber to specify certain times of the day or week when the network should permit access to certain broadcast or interactive services.

The event ordering interaction permits a subscriber to interact with the level 1 gateway to specify a pay-per-view event to be broadcast in the future which the user wants authorized in advance, to insure on-time reception. As part of this function, the level 1 gateway maintains event related data for the various broadcast VIP's and their respective events and interacts with the subscriber through the DET to inform the subscriber of upcoming events and receive event order inputs from the subscriber. The level 1 gateway 19 also signals the DET $17_1$ at the appropriate time to at least notify the user and may instruct the DET to turn on and/or select the appropriate channel and digital video slot to receive and display the ordered event.

The service activation function permits the user to specify various levels of broadcast service that are to be provided to the subscriber through the subscriber's DET's. The profile and subscription management function is similar and related to the service activation function. The profile and subscription management application provides an automated means for the user to alter the user's profile and subscription information stored in the level 1 gateway. This software application submodule communicates relevant change information to necessary systems, e.g. CPE software management, session management and/or network management, to implement desired changes. For example, this application submodule can be used to change scrambling, encryption or interdiction status of a broadcast channel for the user. As another example, through the profile and subscription management function the level 1 gateway would interact with the subscriber to add service for a new DET at the subscriber's premises.

Under the CPE software management function, the level 1 gateway will download software needed by the DET for a particular call, if needed. Examples of such software downloaded from the level 1 gateway include broadcast channel maps, signaling protocol versions, and complete signaling protocols. Also, if the DET $17_1$ is not capable of communicating with a VIP selected by the subscriber, the level 1 gateway 19 can download a translation program to the DET to convert messages compatible with the DET to and from message formats compatible with the VIP's equipment. Depending on the type of downloaded software, the downloading may occur only once at the time of installation, periodically or on an as-needed basis.

The VIP directory/menu application submodule presents an interface to the end user to navigate among video dial tone service features offered through the network. This application submodule presents the user with options, receives selections from the users and translates selections into service requests for processing by the session agent function application submodule. Options available to the user, in an initial preferred embodiment, include: establishing an internal session (within level 1 gateway) with a profile/subscription application, establishing an internal session (within level 1 gateway) with an event scheduling/ordering application, establishing an external session (with a level 2 gateway) to a particular interactive VIP, help functions, terminate a current session and resume an earlier interactive session (one of two maximum). For some VIP's, the VIP directory/menu application software may also provide menus of the particular VIP's services. For example, if one VIP offered video on demand, home shopping and home banking services, that VIP might have the level 1 gateway present the user with a menu of those services before actually proceeding to establish the session with that VIP's equipment. The VIP would have access to the menu data to update that data as needed.

The authorization management application submodule provides a generic authorization control capability that can be re-used across different ones of the services applications. This functionality would be separate and in addition to the PIN number functionality offered by the personal options. The authorization management application software, for example, might be used to define a pass code to permit a subscriber access to the event scheduling/ordering application, particularly if the subscriber is paying for the ordered event by credit card.

The session agent function or application submodule of the level 1 gateway actually translates a subscriber's request to communicate with a particular VIP and that VIP's acceptance of the call from the subscriber into a command to the next level to take actions to set up the desired communication session. Specifically, the agent application maintains status information for each user session, whether the session has an external end-point to a VIP or an internal end point within the level 1 gateway (e.g. to the directory/menu application, the event scheduling/ordering application, etc.). The session agent application responds to various requests from the user, from the VIP, or from the application within the level 1 gateway to establish, modify or breakdown a session and provides appropriate instructions to the session manager application to actually establish, modify or breakdown sessions. In turn, the session agent functionality receives feedback from the session manger as to the results of the instructions and in response thereto provides reports to the end users and to the VIP's. The session agent application submodule controls which sessions are active at any time, from an end user perspective, and which if any sessions become active upon termination of an existing active session. For applications internal to the level 1 gateway, the session agent also effectively wakes up and terminates the relevant application. Another feature of the session agent application is that it provides a mechanism to notify the user of events, e.g. network failures. Finally, the session agent functionality provides billing related information to the billing system.

As seen from the above discussion, the service control functions provide commands to the next lower level functionality to start making and/or terminating the communication connections through the network. The next lower level functionality, the session management functions breaks down each session into each end-to-end connection required for that session. The session management software application module maintains addresses of the network interface points of all of the VIP servers and each user's DET. The session management module functionality responds to requests from the session agent application to establish and breakdown session, relates user and VIP identifiers to the appropriate addresses for their respective network interface points and converts each individual session between two network interface points into the individual connection links needed for that session. The session management application module then provides appropriate requests to the network connection management functionality to establish and break down the individual connections which make up a session, and the session management application module receives feedback on the results of those requests. The session management application also monitors the entire session to maintain status information regarding active system topologies, and this application collects the actual usage information and passes that information to the billing system.

The connection management application module also has access to addresses of the network interface points of all of the VIP servers and each user's DET as well as the addresses of the entry and exit points of each subnetwork. The connection management application breaks down each end-to-end connection identified by the session management functionality into all of the network subsystem elements needed to complete the connection. This application coordinates with the subnetwork controllers (backbone controller $16_1$ and Access Controller $16_2$) to determine availability of necessary transport capability and issues requests with end point addresses for each network subsystem (e.g. from an IMTV VIP and from the Access Subnetwork Controller) for the requisite connectivity. Using this methodology, the connection management application module responds to requests from the session management function to establish and break down a connection between interface points of a VIP and an end user by providing corresponding requests to the relevant subnetwork controllers. The connection management application also receives feedback from the element management functionality applications performed by those controllers and notifies the service management application of events, such as failures.

Each element management function maps the course or route through the respective network subsystem and provides instructions to the relevant network elements to produce the actual connections. In the preferred embodiment, ATM element management is the function of the PVC controller which corresponds to the backbone controller $16_1$ of FIG. 1. Routing through the access subnetwork to the individual terminal devices 17 is controlled by an Access Subnetwork Controller discussed in more detail below.

In the preferred implementation, the ATM element management functionality maintains a view of allocated ATM connections and available resources across the ATM portion of the network. The backbone subnetwork controller functionality responds to commands from the connection management application of the level 1 gateway to establish paths through the backbone subnetwork. In the ATM subnetwork implementation, the PVC controller provides instructions to the ATM switching elements to establish the connections. The backbone subnetwork controller functionality also collects event and status data and aggregates traffic statistics through the backbone switching elements. Another function of the backbone subnetwork element management application is to notify the connection management application of events, such as failures, in the backbone subnetwork.

The access subnetwork management applications performed by the Access Subnetwork Controller respond to requests from the connection management application of the level 1 gateway 19 to establish both downstream video communications and one-way or two-way signaling communications over the hybrid fiber-coax distribution system.

More specifically, the access subnetwork management applications perform the following functions:

Respond to requests from the connection management application to establish downstream video and, upstream/downstream non-video connections across access subnetwork;

Maintain view of allocated resources (channels and bandwidth) of access subnetwork and users;

Perform bandwidth allocation for the access subnetwork including users on the network;

Communicate with CPE (Network Interface Module—NIM—portion) to inform it to which digital video subchannel to tune to complete video connections, or which carrier/time slots to use for control (for FDM/TDMA);

Understand some type of network addressing scheme for VIUs, and can translate (local-to-global) if necessary;

Understand addressing and perform translations (local-to-global) if necessary;

Handle any pre-allocated bandwidth management and channel allocation;

Notify network management of events (e.g. failures);

Inform the access subnetwork of address translations in support of dummy addressing (e.g. Encryption in hybrid-fiber-coax implementation);

Communicate encryption key downstream to an individually addressed NIM to enable/disable the decryption of a single channel (hybrid-fiber-coax implementation);

Communicate with access subnetwork to change the state of the device on an individual channel basis; and Respond to requests from network management to enable/disable encryption per channel, and enable/disable individual users/NIM units to decrypt the signal (hybrid-fiber-coax implementation).

The last element of the functional hierarchy stack depicted in FIG. 4 relates to the actual element functions. For the ATM implementation of the backbone subnetwork, this function is preformed by the ATM switch or switches which will provide switched ATM virtual circuits for point to point connections from VIP's servers to ports of the access subnetwork. As part of its operations, the PVC controller will collect traffic statistics from the ATM switch (es) and monitor the status of the backbone switch fabric and of individual connections. Each ATM switch receives and responds to commands from the ATM portion of the element management function, i.e. from the PVC controller, to establish and tear down ATM connections and provides notice of various events (including failures) to the element management function.

In a switched star type access subnetwork, some switching element (e.g. an HDT) performs the actual element function by establishing a requested connection between a port of the access subnetwork and a particular user's terminal. The actual element function for routing through the hybrid fiber-coax implementation of the access subnetwork to individual DET's is performed by allocation of channel resources and control of the encryption and decryption operations in that subnetwork, as discussed in more detail below with regard to FIGS. 5 to 9.

Fiber to the Curb Network Implementation

Figure 3B:
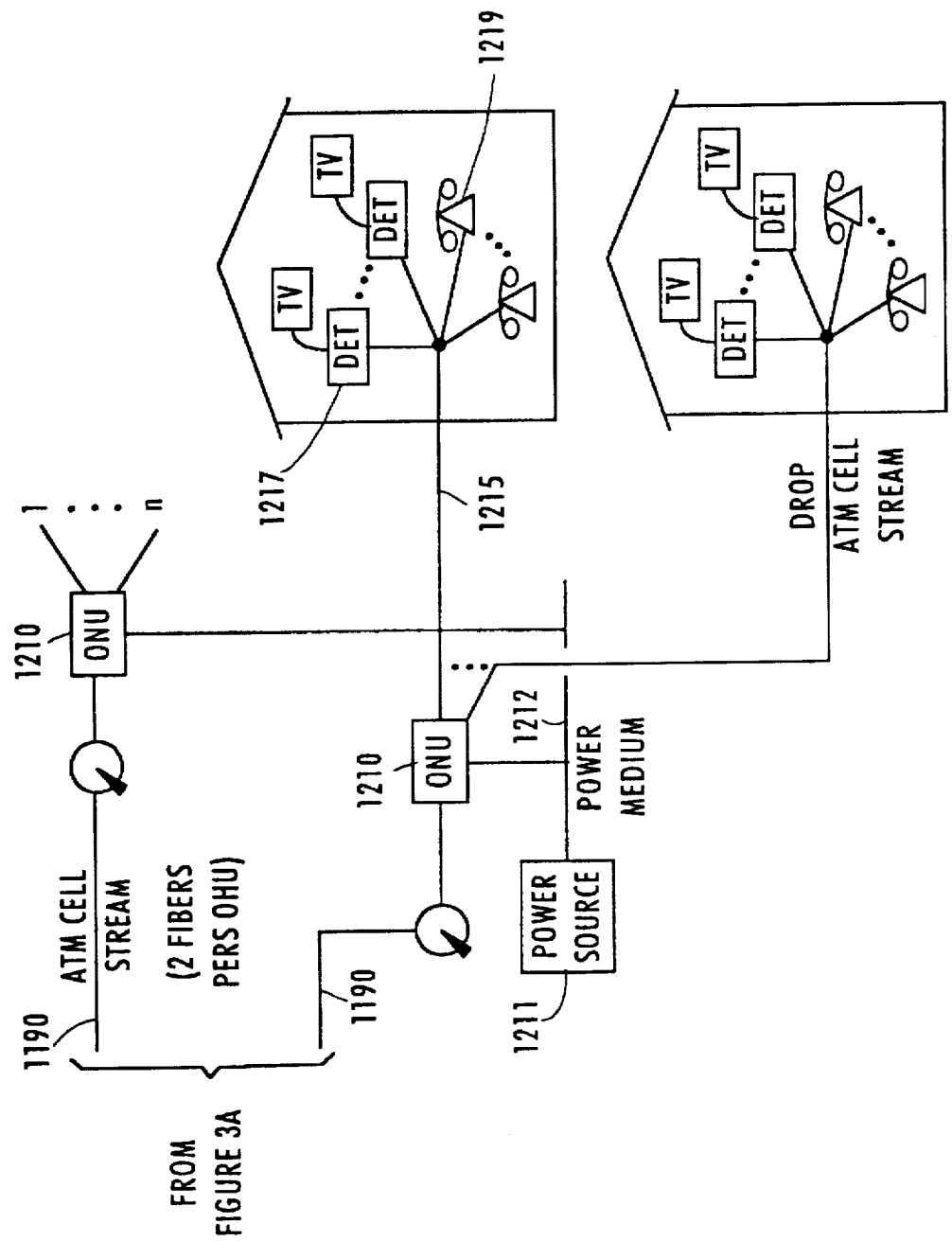

FIG. 3 depicts an example of one such advanced video dial tone network utilizing the Access Subnetwork Controller of the present invention. The illustrated network utilizes an advanced fiber to the curb system with ATM (Asynchronous Transport Mode) transport. Specifically, the illustrated network utilizes a switched star topology. The network of FIG. 3 is somewhat similar to one of the networks disclosed in the above cited application Ser. No. 08/250,792, filed May 27, 1994, entitled "Full Service Network" (attorney docket No. 680-080) now U.S. Pat. No. 5,608,447. The network of FIG. 3, however, utilizes an Access Subnetwork Controller in accord with the present invention to improve over the control processing disclosed in that earlier application.

The Full Service Network illustrated in FIG. 3 provides broadcast video distribution, archival video services and interactive multi-media services as well as a suite of narrowband services including plain old telephone service. As illustrated in that drawing, the broadcast video services will initiate from a broadcast type server, such as ATM video source 1101. The broadcast server source 1101 includes an actual analog video source 1110. Although only one is shown, a typical broadcast service provider will have a plurality of such video sources in the same or separate server systems. The analog signal from the source is carried by any convenient means, such as an optical fiber, etc. Means (not shown) are provided as necessary to convert analog video transmission signals, e.g. NTSC broadcast signals, to baseband video and audio signals. The baseband signals are applied to a real time encoder 1120.

The real time encoder 1120 digitizes the audio and video signals and performs data compression. As currently envisaged, the encoder will encode the program signal into an MPEG 2 format. MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B" frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG-2 standard provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mb/s encoding system, a group of frames consisting of a total of 15 frames for one-half second of video (one I frame and a number of P and B frames.), breaks down into 4000 transport packets.

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program reference clock (PRC) value within the optional adaptation field. In a typical 6 Mb/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames. The decoder utilizes the PRC values to synchronize the decoding operation to the timing of the respective encoder.

The illustrated real time encoder 1120 preferably is set up as a bank of encoders to process six sets of analog audio/video program signals in parallel. As such, the bank of encoders 1110 produces six 6 Mbits/sec MPEG 2 bit streams, which are combined together with appropriate overhead information into a single 45 Mbits/sec DS-3 type signal. The DS-3 signal from the encoder 1120 is input to an interworking unit (IWU) 1130. The interworking unit 1130 is the actual input point for the encoded broadcast video information into the Full Service Network of FIG. 3.

The Full Service Network uses asynchronous transfer mode (ATM) switching to transport all broadband or video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". Specifically, a 53 octet ATM cell includes a cell header consisting of 5 octets and a payload consisting of 48 octets of data.

Transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation of the Network of FIG. 3, however, all video materials will be transferred at a constant, standardized bit rate. Preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

In ATM based networks of the type under consideration here, the MPEG 2 bit streams are converted into cellular payload data, and cell headers are added. As noted above, each MPEG packet consists of 188 bytes, whereas each ATM cell includes 48 bytes of payload data. Each ATM multiplexer which maps the MPEG packets into ATM cells, here the interworking unit 1130, uses two different adaptations to encapsulate MPEG 2 packets in ATM cells. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PRC need to be encoded and transported quickly. To avoid delaying first packets containing a PRC while processing a second packet, the present system maps first packets containing a PRC immediately, using the five cell adaptation procedure. In a typical video transmission, the PRC is present in approximately 10 out of every 4000 MPEG-2 packets. Also, at least some of those 10 packets will arrive as the second packet of a pair. Consequently, only a very small number of packets are mapped using the less efficient 5-cell adaptation.

The ATM multiplexer or interworking unit 1130 checks the flags in the adaption field (if any) in the first packet to determine if that packet includes a program reference clock (PRC) value. The ATM multiplexer or interworking unit 1130 applies the 5 cell adaptation to first packets containing a program reference clock (PRC) value. The ATM multiplexer or interworking unit 1130 applies the 8 cell adaptation to pairs of cells wherein the first packet does not contain a program reference clock (PRC) value.

For each type of adaptation, the source packet or pair of packets is first converted into a single ATM adaptation layer 5 (AAL5) packet. As part of this conversion, the multiplexer type interworking unit will add an AAL5 trailer, either at the end of the single packet or at the end of the pair of packets. The actual trailer consists of 8 bytes of data, including 4 bytes of cyclic redundancy check (CRC) data, user information (e.g. length), etc.

For a 5 cell adaptation, the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The ATM multiplexer or interworking unit 1130 breaks the AAL5 packet (240 bytes) down into five 48-byte payloads (SAR-PDU) and attaches appropriate 5 byte headers to each payload to thereby form five 53-byte ATM cells.

The header of all five of the ATM cells will contain the VPI/VCI value assigned to the particular communication. The header of the first of the five cells also has a bit designated "AAU" which has a value of "0" to identify that cell as the first cell. The header of the fifth cell will have an AAU bit value of "1" to identify that cell as the last cell.

For an 8 cell adaptation, the AAL5 packet consists of two MPEG packets of 188 bytes and an 8 byte AAL5 trailer, for a total of 384 bytes. The ATM multiplexer or interworking unit 1130 breaks the AAL5 packet (384 bytes) down into eight 48-byte payloads and attaches appropriate 5 byte headers to each payload to thereby form eight 53-byte ATM cells.

The header of all eight of the ATM cells will contain the VPI/VCI value assigned to the particular communication. The header of the first of the eight cells will have an AAU bit value of "0" to identify that cell as the first cell. The header of the eighth cell will have an KAU bit value of "1" to identify that cell as the last cell.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, for a broadcast program, the cells from the one broadcast source all contain the same VPI/VCI value whether the five-cell adaptation was used or the eight-cell adaptation was used.

As noted, the ATM mux type interworking unit 1130 will process MPEG-2 packet streams for up to six programs. In addition to converting the MPEG-2 packets for each program to ATM cells, the unit 1130 will combine the cells from the six programs into a single DS3 bit stream.

At the network node which terminates the ATM cell transport, a receiver captures each ATM cell having a specified VPI/VCI. In the present embodiment, the network transports ATM cells through to the subscriber terminals 1217, therefore the receiving node would be the subscriber's terminal, i.e. the subscriber's digital entertainment terminal (DET). In other embodiments discussed later, an element of the access subnetwork terminates the ATM transport and converts the information back to MPEG packets before broadcasting to the terminal devices.

As part of the reverse adaptation functionality, an MPEG demultiplexer buffers cells until it finds a cell having an AAU value of "0" in its header (first cell) and another cell having an AAU value of "1" in its header (last cell). The demultiplexer counts the number of cells from first to last to determine the type of adaptation used to map cells.

If the demultiplexer has captured five cells, the demultiplexer pulls out the payload data and uses the CRC data do check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

The interworking unit 1130 also grooms a number of continuous MPEG 2 bit streams of the broadcast services for ATM cell stream transmission over optical fiber transport links. In an initial implementation, downstream links would carry an OC-12 bit rate, but higher rate transports such as OC-48 will be used in later implementations. Assuming use of OC-12 rate, one such transport link will normally carry the equivalent of 12 DS-3's. However, conversion into ATM cell format with associated headers imposes added overhead requirements on the data transmissions. In the presently preferred embodiment, one interworking unit 1130 therefore processes up to ten DS-3 signals to produce an ATM bit stream at the OC-12 rate.

A transport interface 1140 converts the electrical signal from the interworking unit 1130 into an optical signal and transmits the optical signal through fiber 1150 to an adaptive digital multiplexer (ADM) identified in the drawing as a video bridging and insertion device 1160. The ADM 1160 performs three functions, passive bridging, active bridging and insertion of signals from other broadcast service providers (if any). The three functions may actually be separate, but in the preferred embodiment, all three would be performed by elements collocated within the one network component ADM 1160.

As noted above, the real time encoders 1120 each output a single DS-3 signal comprising up to 6 MPEG 2 bit streams. The interworking unit 1130 processes up to ten DS-3 signals to produce an ATM bit stream at the OC-12 rate. Consequently, one broadcast video source 1101 may produce as many as 60 channels of CATV type broadcast programming for transport over one OC-12 type SONET optical fiber 1150. Many providers, however, may not choose to broadcast so many channels. For example, the provider operating broadcast video source 1101 may offer only 42 channels. Such an ATM channel transmission on the optical fiber 1150 will not utilize the entire OC-12 channel capacity of that fiber. In the specific example, the 42 channels together require the equivalent of 7 of the available 10 DS-3's.

The illustrated architecture permits a second broadcast service provider to utilize the transport capacity not used by the first provider. The second broadcast service provider would offer additional channels from a separate second source 1101'. The source 1101' is essentially identical in structure and operation to the source 1101, but the source 1101' will offer up to the number of channels necessary to fill the OC-12 transport capacity. In the example, if the source 1101 transmits 42 channels (7 DS-3's) via the fiber 1150, the second source 1101' could transmit up to 18 additional channels (3 DS-3's). The function of the insertion device in the ADM 1160 is to combine the signals from the two sources into a single OC-12 rate signal (10 DS-3's in ATM cell format) for further transmission through the optical network.

The two bridging functions facilitate dissemination of the broadcast material throughout the entire Full Service Network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 1170 to host digital terminals throughout the network service area. The host data terminal (HDT) 1180 is shown as a representative example.

When a subscriber requests a specific broadcast channel, the digital entertainment terminal (DET) in the subscriber's home provides a signal identifying the selected channel to the HDT 1180. The signaling between the digital entertainment terminal (DET) and the HDT 1180 will be discussed in more detail below. Inside the HDT, the ATM cell stream from an optical fiber 1170 is applied to a bus. To carry larger numbers of channels, there would be duplicate sources, insertion devices and bridging elements to transport the additional channels over fibers parallel to the illustrated fibers 1170. Signals from one or more such additional parallel fibers would be applied to corresponding parallel buses inside HDT 1180. In response to the selection of a broadcast program, the HDT 1180' switches the ATM cell stream for the selected program from the appropriate bus to a downstream channel going to the subscriber's DET 1217.

One HDT will communicate with a large number of optical network unit (ONU's) 1210, two of which are shown. The HDT will communicate with each ONU 1210 via a pair of optical fibers 1190. In the presently preferred implementation, each home or living unit will have as many as four DET's. Each ONU 1210 and the downstream fiber of the pair 1190 to the ONU 1210 will provide downstream video services to a number of homes, e.g. 8 to 24. The transmissions on the downstream fibers between the HDT and the ONU's 1210 are synchronous, although the video information remains in ATM cell format. Each DET served by an ONU 1210 is assigned a specified time slot on the downstream fiber of a pair 1190.

The HDT 1180 includes a component which is essentially a non-blocking type ATM switch. In response to the selection signal from a DET, the HDT 1180 accesses the appropriate bus and identifies each ATM cell on that bus for which the header information indicates that the cell represents information for the selected broadcast channel. The identified ATM cells are bridged by the ATM switch from the bus to a line card providing transmissions over the optical fiber 1190 to the particular ONU 1210 which services the requesting subscriber's premises. When the HDT selects each ATM cell for transmission to a specific DET, elements on the line card communicating with the particular ONU will buffer the cell as necessary and place the cell in the time slot for that DET on the downstream fiber of optical fiber pair 1190. The cells selected for a particular DET, together with cells going to other DET's served by the same ONU multiplexed into their respective time slots, are applied to an electrical to optical converter and transmitted over the downstream fiber to the ONU 1210 serving the particular subscriber's premises.

The basic purpose of the ONU 1210 is to desegregate the HDT side links into individual customer links and provide optical to electrical conversion for electrical delivery to the individual subscribers' premises. Although depicted by a single line in the drawing, in the currently preferred implementation, the drop cable 1215 to each subscriber's premises comprises a coaxial cable for carrying the video and/or two-way digital data signals and a twisted wire pair for carrying telephone signaling. Alternatively, ADSL communications over twisted wire pair could be used between the ONU and the subscribers premises. In the preferred embodiment, the ONU 1210 includes means to convert optical signals received overt he downstream fiber to electrical signals and transmit signals from each DET's assigned time slot down over the coaxial cable to the subscriber's premises. The ONU also provides two-way conversion between optical and electrical signals for voice telephone service over the twisted wire pairs and for the signaling channels to/from the DET's.

A power source 1211 supplies −130V dc and battery reserve power for telephone service to the ONU's 1210. The power source 1211 may connect to the ONU's via twisted pairs, but in the preferred embodiment, the power is carried over a coax distribution cable 1212.

The digital entertainment terminal (DET) 1217 is a programmable device to which different applications programs and/or portions of the operating system will be downloaded as outlined above with regard to FIG. 1 from a gateway device in order to permit the DET to interact with different information service providers and thereby offer the user totally different types of services. The DET may be similar to that used in the network of FIG. 1, with the exception that the network interface module within the DET 1217 provides the various broadband and signaling connections to a coaxial cable, instead of to an interface to an ADSL twisted wire pair type line, and the communication software within the DET is adapted to process ATM transported information.

The DET 1217 includes means in the NIM (not shown) to demodulate received data and convert ATM cell stream data into bit stream data for further processing. As noted above, the DET 1217 also includes a digital signal processor to decompress received video signals as well as a graphics display generator for generating displays of text data, such as the initial turn-on selection menu. The DET will also include a digital to analog converter and appropriate drivers to produce output signals compatible with a conventional television set. Each DET 1217 also includes the means to receive selection signals from a user and transmit appropriate data signals over a narrowband channel on the coaxial drop cable to the ONU 1210.

The ONU multiplexes the user input data signals from the DET's it services together and transmits those signals to the HDT over an upstream fiber of the optical fiber pair 1190. For broadcast selections, the HDT 1180 processes and responds to the upstream control signals. For other types of services, the HDT transmits the upstream control signals to control elements referred to as gateways. In an initial implementation, the HDT's communicate with the gateways through an X.25 type data network. Future implementations will use ATM communications for these signaling links.

In the network of FIG. 3, the level 1 gateway 1230 provides high level control of all routing and access functions of the network and accumulates various usage statistics. The control functions include controlling access to broadcast programs by individual subscribers. Control of access to on demand programming and interactive multimedia services through a PVC controller 1420 and an ATM switch 1410 will be discussed in more detail below. The level 1 gateway also will transmit narrowband information to the DET 1217 instructing it to initiate display of various selection menus of available video information service providers.

The level 1 gateway 1230 communicates through one or more ATM multiplexers 1232 and the ATM switch 1410 with an Access Subnetwork Controller (ASNC) 1231 which maintains a data base of broadcast video information service providers and services, resource allocation within the access subnetwork, and customer profile data for the broadcast, archival and interactive video services available through the access subnetwork. This data may include pre-subscription information, identification of impulse pay per view events and premium channels, etc.

The level 1 gateway 1130 also communicates through one or more ATM multiplexers 1232 and the ATM switch 1410 with an operations support module (OSM). The operations support module provides an interface to standard operating support systems used for additional network provisioning functions. The level 1 gateway 1230, the Access Subnetwork Controller (ASNC) 1231 and the operations support module (OSM) also communicate with a variety of elements of a telephone company's operations support system (OSS) through the X.25 signaling system 1220.

In the embodiment of FIG. 3, the broadcast portion of the access subnetwork runs from the transport interfaces 1140 through the above discussed network to the HDT's 1180. The PIDT's 1180 are the elements of the access subnetwork which provide real-time control of which broadcast services each subscriber can access. The Access Subnetwork Controller 1231, however, programs this functionality of the. HDT's 1180 to effectively make broadcast connections' available to the subscribers through the access subnetwork. For interactive or 'IMTV' type services, the access subnetwork includes the fibers 1415 between the HDTs 1180 and the ATM backbone subnetwork.

The ATM backbone subnetwork comprises at least one ATM switch 1410, as shown in FIG. 3. In preferred embodiments the ATM switch 1410 serves as a hub switch connected to the VIPs servers and connects to smaller ATM 'access switches' which provide the actual connections through the fibers 1415 to the HDTs 1180. The PVC controller 1420 controls the ATM switch(es) and serves as the backbone subnetwork controller in this network implementation.

When the subscriber selects a specific broadcast channel, the DET 1217 transmits data upstream through the various network elements to the HDT 1180. In response, the programmed control processor within the HDT accesses stored data regarding the broadcast services to which the customer currently subscribes, as previously indicated by broadcast 'connection' instructions from the Access Subnetwork Controller 1231. If the customer subscribes to the requested service, the HDT 1180 routes the cells for that channel to the subscriber's DET 1217 in the manner discussed above. If the customer is not currently a subscriber to that service, the HDT 1180 transmits a data message back to the DET 1217 instructing it to provide an appropriate television display, e.g. informing the customer of a service denial and/or asking the subscriber for appropriate inputs to initiate a new subscription.

Provisioning access to this type of broadcast service is controlled by the Access Subnetwork Controller 1231, in response to instructions from the level 1 gateway 1230. More specifically, when a VIU first subscribes to a broadcast service, e.g. when first obtaining network services or when subscribing to services of a new broadcast service VIP, a request for that service first goes to the level 1 gateway 1230. This request most often comes to the level 1 gateway from the VIP who has sold a new broadcast service to the VIU, either through signaling through the X.25 network from a control or billing system (not shown) operated by the broadcast VIP, or from the OSS. The level 1 gateway 1230 in turn instructs the Access Subnetwork Controller 1231 to make the identified broadcast service available to the particular subscriber. The level 1 gateway 1231 supplies information regarding the VIU and the broadcast service to the Access Subnetwork Controller 1231, and the Access Subnetwork Controller 1231 downloads appropriate profile information to the HDT serving the particular VIU to enable the VIU to access the broadcast service. The provisioning of broadcast services through the level 1 gateway and the access subnetwork controller of the present invention are discussed in more detail below with regard to implementation of such procedures in the presently preferred network (see e.g. the discussion of FIG. 11).

The provisioning data downloaded to the HDT's 1180 would include channel mapping information and subscriber authorization control information. The channel mapping information specifies what programs are carried on each ATM virtual circuit, within each DS-3, on each respective optical fiber 1170. The HDT 1180 accesses the channel mapping information in response to each program selection by a subscriber to route the ATM cell stream to the requesting DET. The authorization control data would indicate which program each subscriber is authorized to access, e.g. because that party has subscribed to the particular program service and is not delinquent in bill payments. When a subscriber requests a program, the HDT 1180 would check this data to determine whether or not to supply the program to the subscriber's DET 1217.

In addition to broadcast video, the network of FIG. 3 offers subscribers access to other wideband services, such as video on demand and interactive multimedia (IMTV) services. Access to these additional broadband services is through an ATM switch 1410. As discussed in more detail below, the access through this switch is controlled by the level 1 gateway 1230 and the controllers of the respective subnetworks.

Each of the non-broadcast service providers 1400 will have a level 2 gateway 1401 and some form of file server 1403. The video information provider's (`VIP`'s) system may provide ATM cell stream outputs for transmission through the network. Alternatively, if the provider's equipment transmits only bit stream data, the network operator would supply an interworking unit similar to the unit 1130 discussed above to convert the provider's bit stream data into an ATM cell stream format compatible with the Full Service Network. The ATM switch transmits selected ATM cells via optical fibers 1415 to the HDT's 1180.

To establish a broadband communication session or connection through the network between an interactive information service provider 1400 and a particular DET 1217 requires establishment of a virtual circuit through the ATM switch 1410 and the appropriate HDT 1180. In the network of FIG. 3, a PVC controller 1420 stores data tables defining all possible virtual circuits through the ATM switch between the HDT's and each provider's equipment. These data tables define the terminating and originating header information, the input ports from the servers 1403, and the particular fiber output port used to route cells to the correct HDT 1180. The data tables thus define "permanent virtual circuits" (PVC's) between the providers and the HDT's.

When a subscriber initiates a session with a broadband interactive service provider, for example IMTV VIP 1400, the subscriber's DET 1217 provides an appropriate "off-hook" signal to the HDT 1180. The HDT 1180 sends the message through the X.25 packet switched network to the level 1 gateway 1230. When the level 1 gateway 1230 receives the addressed message from the HDT, that gateway uses the X.121 address of the caller included in the message to check its internal database to determine if the caller is a valid network customer. If the caller is not a valid customer, the system tears downs the session. If the caller is a valid customer, the level 1 gateway 1230 transmits an X.25 call accept message back to the terminal and waits for the first application level message.

Once the call is accepted and an X.25 signalling link is provided, the DET 1217 sends an initiation message that says "hello". This "hello" message includes basic information such as a customer premises equipment (CPE) identifier and a CPE type designation. The level 1 gateway 1230 sends a menu and a banner through the downstream signaling channel. The menu is a screen of text listing VIP's available to this customer or the VIP's that the customer has previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET 1217 transmits an appropriate data signal upstream through the network to the level 1 gateway 1230.

The level 1 gateway 1230 may execute a PIN number access routine, if the subscriber has previously requested such access control for selected ones of the VIP's. For simplicity here, it is assumed that the currently selected VIP is not subject to such a PIN number requirement. The level 1 gateway 1230 is merely expecting to receive the VIP selection input from the DET 1217 within a predetermined period following the menu transmission. If the level 1 gateway 1230 receives the selection input message from the DET 1217 within the predetermined period, the gateway 1230 translates that message into a 4 digit code for the selected VIP's level 2 gateway.

At that time, the level 1 gateway 1230 sends a message to the DET 1217 saying please wait while we connect to the VIP. The level 1 gateway then goes over the X.25 network to communicate with the selected VIP's level 2 gateway. Assuming that the subscriber selected VIP 1400, the level 1 gateway 1230 contacts the level 2 gateway 1401 and indicates that it has a customer calling. The level i gateway 1230 identifies the customer to the level 2 gateway 1401 by sending the standard billing telephone number for the calling customer to the level 2 gateway. The VIP's level 2 gateway may accept or reject the call after receiving the initial request indicating a customer is available. If the level 2 gateway 1401 sends a message back to the level 1 gateway 1230 indicating a rejection of the call, the level 1 gateway transmits a message to the DET 1217 instructing that terminal to display some form of call rejection notice on the associated TV.

Alternatively, the level 2 gateway 1401 accepts the call, provides a server output port and gives a port identification for the port on the server 1403 to the level 1 gateway 1230. The VIP's server output port is preassigned an originating VPI value and a range of originating VCI values, based on the maximum number of channels through the network that the VIP purchased for this server port. The level 2 gateway 1401 therefore assigns an available VCI value from that range to the session and forwards the VPI and VCI together with a desired bandwidth for the session to the level 1 gateway 1230.

In response to the acceptance message from the level 2 gateway 1401, the level 1 gateway transmits a connection request to the Access Subnetwork Controller 1231 requesting a channel of the desired bandwidth through the access subnetwork to the subscriber's DET 1217. The Access Subnetwork Controller 1231 determines if the bandwidth is available on the fiber 1415 going to the HDT 1180 serving the particular subscriber. The HDT 1180 is preassigned a range of terminating VPI/VCI values. The Access Subnetwork Controller 1231 therefore assigns an available VPI/VCI value from that range to the session. The Access Subnetwork Controller 1231 instructs the serving HDT 1180 to route cells having that VPI/VCI value from the fiber 1415 to the channel assigned to the DET 1217 on the fiber 1190 and thus through the ONU 1210 and the subscriber's drop 1215 to that DET. The Access Subnetwork Controller 1231 also transmits a reply message to the level 1 gateway 1230 indicating that the link through the access subnetwork has been established. The reply message includes an identifier of the port for the fiber 1415 to the serving HDT 1180 and the assigned terminating VPI/VCI value.

The level 1 gateway 1230 also sends a message to the PVC controller 1420 to establish a virtual circuit between the server port of the selected provider 1400 and the fiber 1415 going to the serving HDT 1180. This message includes respective port identifiers and the assigned originating and terminating VPI/VCI values.

The PVC controller accesses its data tables to identify an available permanent virtual circuit between the provider 1400 and the HDT 1180 for which all necessary elements through the ATM switch(es) 1410 are currently available. When an available circuit is identified, the PVC controller 1420 provides appropriate instructions to the ATM switch (es) 1410 to make the necessary connection and VPI/VCI translation and informs the level 1 gateway 1230.

If the broadband communication connection is successfully established between the VIP's server port and the serving HDT 1180, the PVC controller 1420 transmits back an appropriate indication thereof to the level 1 gateway 1230. The level 1 gateway 1230 informs the level 2 gateway 1401 that it has set up a good broadband link and transmits the X.121 address of the calling customer's DET 1217 to the level 2 gateway 1401. The level 2 gateway uses that address to initiate a new signaling communication through the X.25 network 1220 with the subscriber's set-top terminal DET 1217. At the same time, the level 1 gateway tears down its own X.25 signaling connection with the subscriber's set-top terminal and initiates a billing record for the call. Alternatively, if the PVC controller 1420 informs the level 1 gateway 1230 that it could not establish the broadband connection, the level 1 gateway passes that information on to the level 2 gateway 1401 and provides an appropriate message for display by the DET 1217 informing the customer.

During the communication session between the subscriber and the VIP 1400, the DET can transmit control signalling upstream through the ONU 1210 the HDT 1180 and the X.25 data network to the level 2 gateway 1401. The level 2 gateway can also send signaling information, such as control data and text/graphics, downstream through the same path to the DET 1217. For downstream transmission, the server 1403 will provide ATM cells with an appropriate header. The ATM switch 1410 will route the cells using the header and transmit those cells over the fiber 1415 to the HDT serving the requesting subscriber. The HDT 1180 will recognize the terminating VPI/VCI in the cell headers as currently assigned to the particular DET 1217 and will forward the cells through the downstream fiber of pair 1190 and the ONU 1210 to that DET, in essentially the same manner as for broadcast programming.

When a broadband session ends, e.g. as indicated by an exchange of appropriate messages between the DET 1217 and the level 2 gateway 1401, the level 2 gateway instructs the level 1 gateway 1230 to tear down the broadband connection. The instruction includes the customer's billing telephone number and the server port identification for the VIP port used for the broadband communication. In response, the level 1 gateway 1230 stops the billing timing for that broadband session and transmits instructions to both the PVC controller 1420 and the Access Subnetwork Controller 1231 to tear down the broadband connections through the ATM switch(es) 1410 and the HDT 1180, respectively. The level 1 gateway 1230 creates a log record of the interactive broadband call, including VIP and VIU identifications, bandwidth, start time and either duration or end time, for purposes of billing the VIP 1400 for the broadband connect time.

The Full Service Network illustrated in FIG. 3 will also provides narrowband transport for voice and narrowband data services. A digital switch 1310 or an analog switch 1330 will provide standard type plain old telephone service (POTS) for customers of the Full Service Network. The digital POTS switch provides a DS-1 type digital input/output port through interfaces conforming to either TR008 or TR303. The output may go to a digital cross-connect switch (DCS) 1320 for routing to the various HDT's or directly to a multiplexer (MUX) 1325 serving a particular HDT. The MUX 1325 may also receive telephone signals in DS-1 format from the analog switch through a central office terminal (COT) 1333. The central office terminal 1333 converts analog signals to digital and digital signals to analog as necessary to allow communication between the analog switch 1330 and the rest of the network.

The MUX 1325 serves to multiplex a number of DS-1 signals for transmission over one fiber of an optical fiber pair 1335 to the HDT 1180 and to demultiplex signals received over the other fiber of the pair 1335. The fiber pairs between the HDT 1180 and the ONU's 1210 will also have a number of DS-1 channels to carry telephone and narrowband data signals to and from the subscriber's premises. The subscribers' drops 1215 include both a coaxial cable and one or more twisted wire pairs. In addition to the video services discussed above, the ONU will provide telephone signals and appropriate power to the subscribers' premises over the twisted wire pairs connected to subscribers' telephone sets 1219. The ONU's will also provide two-way narrowband data communication to the DET's in narrowband channels over coaxial cable.

An alternate switched star type fiber-to-the-curb type access subnetwork, i.e. using HDT's which switch DS-3 channels to respective DET's for broadcast and IMTV services, is disclosed in commonly assigned copending application Ser. No. 08/380,758 filed on Jan. 31, 1995, the disclosure of which is incorporated herein entirely by reference. In that application, the access subnetwork includes an ATM edge multiplexer, optical fiber transport to the HDT's, the HDT's and the ONU's. Again, the disclosed backbone ATM subnetwork comprises an ATM switch.

Hybrid-Fiber-Coax Network Implementation

FIG. 4 depicts another video network utilizing an Access Subnetwork Controller in accordance with the present invention. The network of FIG. 4 is a hybrid fiber-coax system which provides RF transport of both analog and digital broadband services. The illustrated network provides broadcast video distribution, archival video services and interactive multi-media services as well as plain old telephone service.

Within an area containing a large number of subscribers, such as a LATA, a telco deploys a number of Loop Transport Interfaces 300, only one of which appears in the drawing (FIG. 4). At least as currently envisaged, each Loop Transport Interface 300 will be located in a telco central office. In an area serviced through multiple central offices, several different central offices would each have a Loop Transport Interface similar in structure to the Interface 300 depicted in FIG. 4. In some respects, each Loop Transport Interface will serve as the headend of an otherwise conventional optical fiber trunk and coaxial cable type CATV distribution network.

In the Loop Transport Interface 300, a laser type optical transmitter 303 transmits downstream signals through fibers 305 to optical to electrical nodes referred to as "optical network units" or ONU's. The laser operates in a linear mode in the range of 5–750 MHz. The transmitter has an optical splitter and can transmit to several ONU nodes 309. Each ONU 309 performs optical to electrical conversion on the downstream signals and supplies downstream RF electrical signals to a coaxial cable distribution system 311.

The optical transmitter receives and transmits signals from an RF (radio frequency) combiner 315. The combinet 315 combines and levelizes RF signals from several sources to produce the appropriate signal spectrum for driving the optical transmitter 303. One set of signals 315 supplied to the RF combiner will be group of AM-VSB (amplitude modulated vestigial sideband) analog television signals from one or more appropriate sources not separately shown. Such signals are essentially "in-the-clear" CATV type broadcast signals capable of reception by any subscriber's cable ready television set. Typically, the analog stations will occupy a number of the lower video channels (e.g. channels 2 through 40) and include over-the-air programming available in the area as well as public access channels.

The analog television signals are broadcast from the optical transmitter 303 through the tree and branch optical and coax distribution network to provide "basic" CATV type service to all subscribers on the network. For subscribers choosing only analog television service who do not have a cable ready television, the Network operating company offers a standard CATV type analog frequency converter, or the subscriber could choose to purchase a converter on the open market. The network interface module in the DET 100a will also include a tuner that permits subscribers to the digital services to receive the analog broadcast channels through the same equipment used for the digital services.

The Network depicted in FIG. 4 also provides transport for digitized and compressed audio/video programming, both for certain broadcast services and for interactive services, such as video on demand. Such programming will be encoded and compressed in MPEG-2 format, in precisely the manner discussed above with regard to FIG. 3.

In the illustrated Network, the MPEG encoded video is transported to each Loop Transport Interface using asynchronous transfer mode (ATM) transport and switching. As noted above, ATM information is organized into cells each comprising a header, primarily for identifying cells relating to the same virtual connection, and an information field or "payload". The ATM cell header information includes a virtual circuit identifier/virtual path identifier (VCI/VPI) to identify the particular communication each cell relates to. For example, for broadcast signals, the VCI/VPI will identify a particular program channel. MPEG 2 broadband signals are mapped into ATM cells in the manner discussed above with regard to FIG. 3, and a number of ATM cell streams are multiplexed together at an OC rate.

In the illustrated network, digital broadcast service signals 318 in MPEG encoded form and arranged in ATM cell packets are applied to one or more input pors of an ATM packet handler 319 in the Loop Transport Interface 300. These broadcast service signals originate in one or more broadcast VIP's ATM servers which are essentially the same structure as the servers/sources 1101, 1101 shown in FIG. 3. The ATM broadcast services will carry premium service type programming. The ATM broadcast signals may originate from any appropriate source (not shown). For certain interactive services which utilize one digitized channel to provide limited downstream transport to a large number of subscribers, the ATM broadcast cell stream signals originate from a server 403'. Fully interactive broadband digital signals, in MPEG-ATM format, are also applied to the ATM packet handler from an ATM switch 401. The ATM packet handler 319 terminates all ATM cell transport through the Network. This handler receives the ATM cell streams and converts the cell payload information into MPEG 2 packet streams.

In addition to the analog broadcast signals, the RF combiner 315 which prepares signals for downstream transmission by the optical transmitter 303 receives a variety of other analog RF signals from a group of RF digital modulators. The RF analog outputs from the modulators carry digital broadband information. The content for the digital RF modulators comes from the ATM packet handler 319 the operation of which is controlled by the Access Subnetwork Controller 417.

U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network. The currently preferred implementation uses 64 QAM (quadrature amplitude modulation) or 16 VSB (vestigial sideband) modulation techniques in the RF modulators 317 in the Loop Transport Interface 300. For example, using 64 QAM, 4 channels of 6 Mbits/s MPEG encoded digital video information can be modulated into one 6 MHz bandwidth analog channel. Similarly, 16 VSB yields 6 channels of 6 Mbits/s MPEG encoded digital video information modulated into one 6 MHz bandwidth analog channel. Each RF modulator produces a 6 MHz bandwidth output at a different carrier frequency.

The preferred 64 QAM modulators actually modulate up to 27 Mbits/s into one 6 MHz bandwidth signal. For simplicity assume four 6 Mbits/s programs within the 27 Mbits/s stream, but it should be understood that typically the 27 Mbits/s stream contains some mix of 6 Mbits/s, 3 Mbits/s and/or 1.5 Mbits/s programs fully utilizing the 27 Mbits/s payload capacity.

The 6 MHz bandwidth RF signals from the modulators 317 are supplied to the optical transmitter 303 for downstream transmission together in a combined spectrum with the AM-VSB analog television signals 316. The downstream transport of the digital programming is an RF transmission exactly the same as for the analog basic service channels, but each of the channels from the RF modulators 317 contains 4 or more digitized and compressed video program channels in one multiplexed bit stream. The 6 Mhz digital program channels will be carried through the fiber and coaxial system in standard CATV channels not used by the analog basic service programming. The ONU 309 is essentially transparent to both the analog basic service channels and the channels carrying the digital programming and supplies all of the signals as a combined broadcast over the coaxial cable network 311. The optical fiber 305 from the transmitter, the ONU's 309 and the coaxial distribution systems 311 therefor provide a broadcast network transporting all downstream programming to all subscriber premises serviced thereby.

At the subscriber premises, a network interface module (NIM) couples the set-top device or digital entertainment terminal (DET) 100a to a drop cable of the coaxial distribution network 311. In this Network configuration, the NIM includes an analog frequency tuner controlled by the microprocessor in the main portion of the DET 100a to selectively receive the RF channel signals, including those channels carrying digital information. The NIM also includes a QPSK, QAM or VSB demodulator to demodulate the digitized program signals carried in one of the received 6 MHz channel and will perform a forward error correction function on the demodulated data. The digital audio/video signal processor within the main portion of the DET selects packets of one of the programs from the digital data, decompresses received audio and video signals, generates graphics display information and performs digital to analog conversion to produce output signals compatible with a conventional television set 100', exactly as in the earlier embodiment.

The analog tuner in the NIM will tune in all channel frequencies carried by the network, including those used for the analog broadcast services. The DET 100a includes a bypass switch or the like and an analog demodulator to selectively supply analog signals from the basic service channels directly to the audio/video output terminals or to the modulator, to provide signals to drive a standard television receiver. The DET 100a therefore can be used as a frequency converter for reception of the analog signals.

As in the earlier embodiment, each DET 100a includes a remote control and/or keypad to receive various selection signals from a user. At least in response to certain user inputs, such as selection of a pay per view event, the DET will relay data signals upstream over a signaling channel on the coaxial cable to the ONU 309. The actual transmission of any such data signals upstream from the DET 100a occurs in response to a polling of the DET by the ONU 309. The ONU 309 combines upstream data signals from the DET's serviced thereby and transmits those signals upstream over another optical fiber 307 to an optical receiver 308 in the Loop Transport Interface 300. Each DET 100a may transmit data on a different carrier frequency, in which case the network controller knows which DET sent particular data based on the received frequency channel. Alternatively, for interactive services, the DET may transmit a unique identification code with the upstream message.

The optical receiver 308 supplies the upstream signaling channels to a network controller 323. The network controller 323 includes appropriate RF demodulators and data processing equipment to process all upstream signaling from the DETs 100a and associated NIMs serviced by the loop transport interface 300. The network controller 323 communicates upstream data messages from the NIMs to the ACC 4000 331 via an Ethernet connection. The Ethernet also provides a connection through an ATM router (not shown) to the ATM switch 410 to transport upstream signaling information received by the network controller 323 to the level 1 gateway 411 and/or various VIPs' equipment.

A network data processor 325 controls all downstream out-of-band signaling transmissions to the NIMs and DETs. The network data processor 325 receives messages for transmission via the Ethernet. The network data processor 325 includes a CPU to process the messages, typically addressed in accord with Internet protocol addressing. The network data processor 325 includes at least one QPSK modulator for modulating downstream out of band signaling messages onto an RF channel not otherwise used for program transport.

The Access Subnetwork Controller 417 controls all services provided through the loop transport interface 300. The Access Subnetwork Controller 417 communicates with the elements of the loop transport interface 300, e.g. the ACC 4000 331, the network controller 323, the NDP 325 and the ATM packet handler 319 via the Ethernet. For example, the Access Subnetwork Controller 417 provides instructions to the ATM packet handler 319 to use the VCI/VPI header from the ATM cells to route the reconstructed MPEG packet streams to the appropriate ones of the digital RF modulators 317.

Certain digital program signals carried on the network may be encrypted using encryption technology and key codes. Details of specific encryption algorithms, the key codes are well known to those skilled in the art and familiar with the relevant patents and literature.

In the implementation of the network illustrated in FIG. 4, an ACC 4000 331 performs set top management, encryption control and specific program access control functions. The ACC 4000 responds to instructions from the Access Subnetwork Controller 417 to administer encryption and terminal device operations and control. For example, the ACC 4000 transmits instructions (e.g. including decryption keys) through the network data processor 325 and the downstream out of band signaling channel to the NIMs to control access to individual channels.

Service profiles for each customer on the network and their DET's are set up and stored within the level 1 gateway 411. The level 1 gateway 411 may also provide an interface to appropriate billing systems (not shown) for some broadcast services, such as pay per view. For ATM broadcast services, when a subscriber first signs up, a portfolio of channels subscribed to by that customer is established in the subscriber's profile data within the level 1 gateway and downloaded to the Access Subnetwork Controller 417 through the ATM switch and the Ethernet. Based on this profile data, the Access Subnetwork Controller instructs the ACC 4000 to download decryption keys to decrypting circuitry included in the NIM of the subscriber's DET 100a. If a service key is needed to permit the DET to receive broadcast channels, the Access Subnetwork Controller 417 returns that service key to the level 1 gateway 411 for transmission to the main portion of the DET 100a. In the preferred embodiment, the service key is identified as a 'connection block descriptor' and includes information defining a logical network channel number used to access the broadcast channel, and RF channel information needed to tune to the RF channel carrying the program. For digital services, the connection block descriptor also includes at least one MPEG II PID value needed to identify the program within the digital stream on that RF channel. Connection block descriptor administration is discussed in more detail below with regard to the embodiment of FIGS. 5–9 and the process flows of FIGS. 10–14B.

All digital broadcast service signals are broadcast into each subscriber's premises, and each DET 100a includes means for receiving and decoding each such digital broadcast service channel, as discussed above with regard to FIG. 3. The microprocessor in the DET 100a controls access to any of these channels based on the downloaded connection block descriptor information stored in the system memory. For example, if one subscriber requests HBO, and that subscriber has paid to subscribe to HBO, the subscriber's DET 100a will contain map information based on connection block descriptors instructing it to tune the RF channel and select and decode the digital program carrying HBO for display on the subscriber's television set 100'. If encrypted, data stored in the NIM will permit decrypting of the selected program channel. However, if a requesting subscriber has not paid for HBO, the downloaded information will not provide the requisite data for tuning and decoding of that channel and the NIM will not store the relevant decryption key.

The illustrated Network also offers pay per view services through the ATM broadcast program channels 318. A user selects a pay per view event by operating the DET 100a. The DET 100a transmits a purchase message upstream through the Loop Transport Interface 300 to the level 1 gateway 411. If the authorization data in the subscriber's profile in the level 1 gateway indicates that the DET identification is valid and the subscriber is authorized to purchase such events, the level 1 gateway instructs the Access Subnetwork Controller 417 to authorize reception. If decryption is required, the Access Subnetwork Controller instructs the ACC 4000 331 to provide a decryption key to the NIM. In response to an appropriate message from the level 1 gateway 411, the DET 100a decodes the pay per view event in essentially the same manner as for other premium services carried on the ATM broadcast channels 318, as outlined above.

The implementation of the network illustrated in FIG. 4 also provides telephone service. Between the optical network unit and the subscriber premises, the 700–750 MHz portion of the spectrum on the coaxial cable will carry the telephone signals. This allocated spectrum provides transport for 24 DS0 telephone channels. Each subscriber premises will have telephone interface referred to as a Cable Network Unit (CNU) 340 coupled to the coaxial cable which serves to couple two-way signals between a twisted wire pair into the home and the telephone frequency channels on the coaxial cable 311.

Carrier frequencies used for telephone services may be individually assigned to particular subscriber's CNU's. Also, the telephone signal spectrum is carried on the same two fibers that carry the video and the upstream signalling between the Loop Transport Interface and the ONU. Upstream telephone signals are applied from the optical receiver 308 to a host digital terminal (HDT) 343 which provides an interface to a standard digital telephone switch 345. Downstream telephone signals from that switch pass through the HDT 343 to the RF combinet 315 for transmission in the 700–750 MHz frequency range over the fiber to the ONU 309 and the coaxial cable distribution system 311.

In an alternate implementation not shown, the Loop Transport Interface 300 would dynamically allocate the DS0 channels on the coaxial cable system 311 on a timesharing basis, in essentially the same manner as in mobile radio systems. Two additional fibers and a second optical transmitter and receiver pair would carry the two-way telephone signals to and from the ONU 309. Because of the use of the separate optical links for telephone service in this alternate implementation the HDT and telephone switch need not be closely associated or collocated with any particular one of the Loop Transport Interfaces.

Battery power for telephone service and for the various interfaces will be applied through the ONU's 309 and supplied downstream over the coaxial cable.

The implementation of the network illustrated in FIG. 4 offers access to video information providers (VIP's) for interactive broadband services, such as video on demand. For archival services and many other interactive services, each VIP has a level 2 gateway and some form of broadband information file server 403. The ATM switch 401 provides communications links between the Loop Transport Interfaces 300 and the level 2 gateways and file servers 403. Customer access to the IMTV VIP's is controlled through one or possibly more programmed computer or processor elements performing the processing functions of the level 1 gateway 411. A permanent virtual circuit (PVC) controller 415 and the Access Subnetwork Controller 417 respond to signals from the level 1 gateway to control the point to point routing through the Network. The PVC controller 415 stores data tables defining all possible virtual circuits through the ATM switch 401 and the Loop Transport Interface 300 serving each DET terminal of a customer subscribing to each particular provider's services. These data tables define the header information and the switch port to the packet handlers needed to route cells to the correct Loop Transport Interface. The Access Subnetwork Controller 417 stores similar data tables identifying the transmission fiber ports, RF channels and multiplexed digital channel bandwidth which may be used to transport each data stream processed by the ATM packet handler 319 through the fiber 305 to the appropriate ONU 309 serving each DET.

For a full, broadband interactive session, the subscriber operates the DET 100a to interact with the level i gateway 411 and select a VIP, and the level 1 gateway interacts with the VIP's level 2 gateway to determine if the VIP will accept the call, in a manner similar to the operation discussed above with regard to FIG. 3. The VIP's acceptance message includes a server port identifier and an originating VPI/VCI value for the downstream transmission. Typically, the VIP will also specify the bandwidth.

The level 1 gateway 411 sends a request to the Access Subnetwork Controller 417 requesting a connection to the subscriber's DET 100a of the specified bandwidth. Based on its stored data tables as to resources which are currently available, the Access Subnetwork Controller identifies available bandwidth on one of the RF channels and a port through the ATM packet handler 319 for data going to the modulator 317 corresponding to the particular channel. The Access Subnetwork Controller internally reserves the bandwidth capacity on the particular channel and an available terminating VPI/VCI value. The Access Subnetwork Controller 417 transmits a reply message back to the level 1 gateway 411 containing the port identifier and the VPI/VCI value.

The PVC controller 415 responds to instructions from the level 1 gateway by activating the ATM switch 401 to establish a downstream virtual circuit path between the assigned port of the VIP's server and the ATM packet handler 319 within the Loop Transport Interface 300. The Access Subnetwork Controller 417 controls the ATM packet handler 319 to route MPEG data recovered from the ATM cells for the particular point to point communication to the port for one of the RF modulators 317 so that the modulator will include the MPEG data in the assigned digital channel within a particular 6 MHz RF channel. The Access Subnetwork Controller 417 also supplies the level 1 gateway 411 with the connection block descriptor for the assigned bandwidth, and that gateway relays the descriptor through the signaling channel to the subscriber's DET 100a. The DET uses the RF channel information to tune to the particular RF channel and uses the PID value to capture and decode MPEG data from the specifically assigned digital channel within that RF channel. The later discussion of the network of FIGS. 5 to 9 provides a more detailed analysis of this dynamic digital channel allocation for an IMTV session.

Concurrently, the level 1 gateway 411 would instruct the PVC controller 415 to control the ATM switch 401 and the Access Subnetwork Controller 417 to control the network controller 323 to establish an upstream connection for control signals sent from the DET 100a up through the fiber-coax network and receiver 308 to the VIP's level 2 gateway. The combination of upstream and downstream, point to point channels are used for control functions for interactive service communications, e.g. to order 'on-demand' transmissions of selected videos.

The level 1 gateway 411 receives status and failure notifications as part of its ongoing operations. In the presently preferred embodiment of the network of FIG. 4, the function of monitoring communications between the loop transport interface 300 and individual subscribers' DET's 100a is an automatic function of the Access Subnetwork Controller 417.

The Access Subnetwork Controller 417 monitors operations of the loop transport interface 300. As part of its monitoring function, the Access Subnetwork Controller 417 also determines the status of communications to each DET 100a. As such, the Access Subnetwork Controller automatically knows the status of all components between the input ports to the loop transport interface and the output ports of the DET's 100a.

A variety of known techniques can be used to check the status of communications to the individual DET's. For example, the Access Subnetwork Controller 417 could periodically transmit a status interrogation signal to each DET 100a, through the out-of-band signaling channel. If currently operable, the DET would transmit a status message back upstream through the signaling channel informing the Controller 417 of the DET's status, e.g. operable but idle or operable and actively in-service. A DET 100a detecting some problem could transmit a fault signal upstream through the signaling channel to the Access Subnetwork Controller 417, either immediately in response to fault detection or in response the next periodic interrogation by the Access Subnetwork Controller. The Access Subnetwork Controller 417 would also interpret a failure of a DET 100a to respond to an interrogation or to confirm any other message sent to the DET within a predefined period of time as a fault condition.

During the call set up processing, the level 1 gateway 411 may receive an indication from the PVC controller 415 and/or the Access Subnetwork Controller 417 that one or both can not establish a desired broadband connection. The PVC controller 415 also monitors ongoing operations of the ATM switch 401, and the Access Subnetwork Controller 417 monitors communications through the loop transport interface 300 at all times, and each will inform the level 1 gateway 411 upon detection of any fault or interruption in any currently established broadband connection. The level 1 gateway 411 transmits notice of an inability to establish a desired broadband session through the signaling channel to the requesting DET 100a, using a variety of appropriate notices such as discussed in the above incorporated Ser. No. 08/304,174 parent application, depending on whether or not other VIP's are available to the particular subscriber at the time of the call. If the level 1 gateway 411 receives notice of a fault in an already established session, the gateway 411 stops accumulating billing data for that session and transmits a message regarding the failure to the VIP's level 2 gateway. The level 2 gateway may provide an appropriate notice to the subscriber through the signaling link, if that portion of the session is still operative. Alternatively, the level 1 gateway may transmit an appropriate display notice to the DET 100a through the signaling channel.

When the level 1 gateway 411 instructs the PVC controller 415 and the Access Subnetwork Controller 417 to tear down a broadband communication session, the gateway 411 expects responses from both of those controllers 415, 417 within a predetermined time interval. If either the PVC controller 415 or the Access Subnetwork Controller 417 does not respond within the predetermined time interval, the level I gateway 411 will send an ABORT message to the non-responsive controller 415 or 417 to cancel the original session establishment message, and the gateway 411 will also record the failure in an alarm file.

Presently Most Preferred Network Architecture

Figure 5:
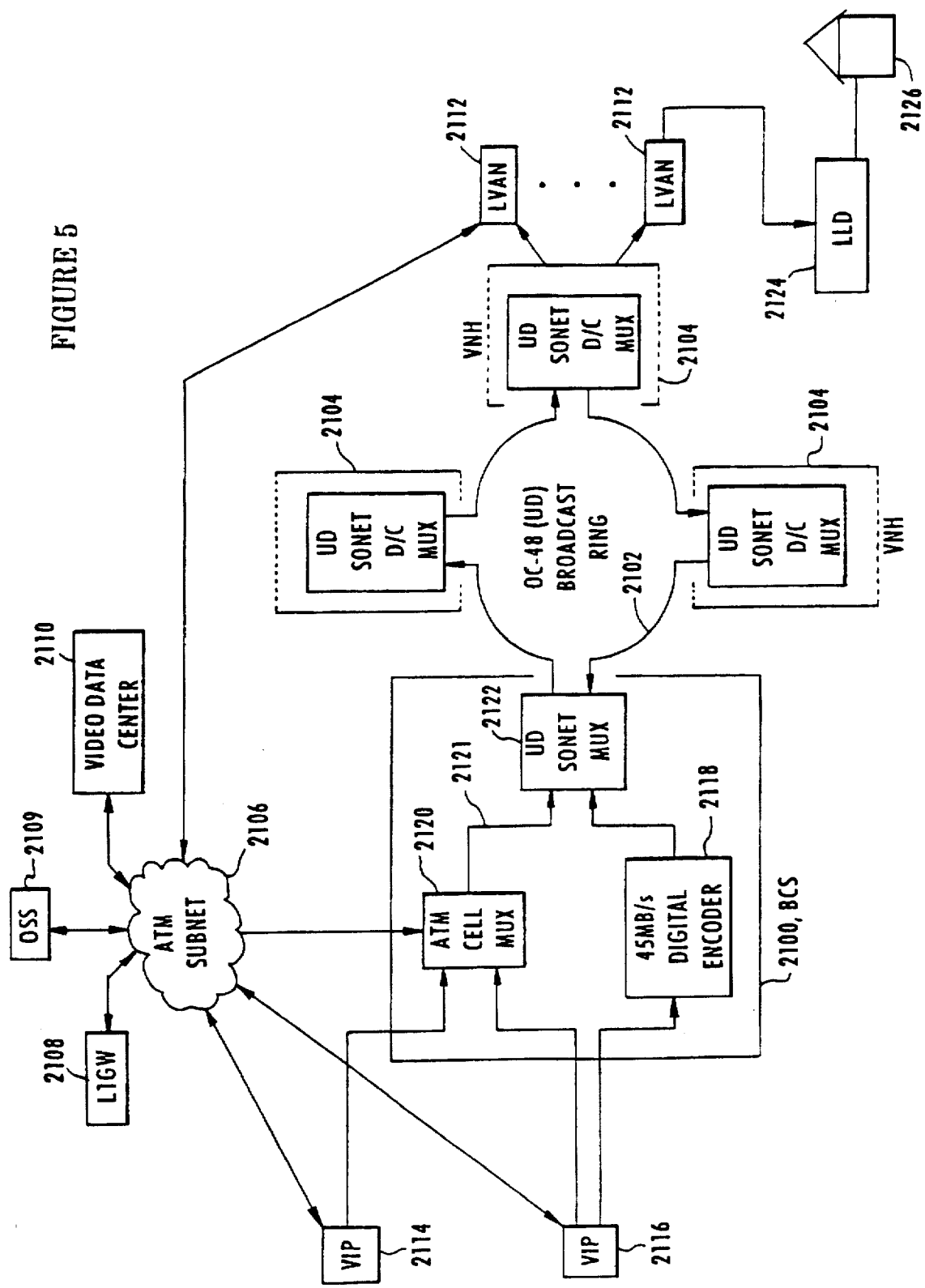
FIG. 5 is a block diagram of a distributed network architecture for the preferred implementation of the full service type video dial tone network utilizing the inventive Access Subnetwork Controller.

FIG. 5 discloses a distributed network architecture for a broadband data full service type enhanced video dial tone network according to a preferred embodiment of the present invention. FIGS. 6 to 9 provide more detailed illustrations of portions of the network of FIG. 5. The network of FIGS. 5 to 9 is a direct improvement over the network of FIG. 4 and is intended to more easily service a larger number of end users located throughout a much wider geographic area.

The network of FIG. 5 includes a level 1 gateway 2108, an ATM subnetwork 2106 and an access subnetwork. In this implementation, the access subnetwork includes at least the broadcast ring 2102, the video network hub offices (VNHs) 2104, a plurality of local video access nodes (LVANs) 2112, and a plurality of local loop distribution (LLD) networks 2124 providing communications between customer premises 2126 and the serving LVAN 2112. The broadcast consolidation section (BCS) 2100 may also be considered as a part of the access subnetwork. The network interface module (NIM) portion of the user terminal preferably also is an element of the access subnetwork and is controlled in response to instructions from the Access Subnetwork Controller 2240.

Figure 9:
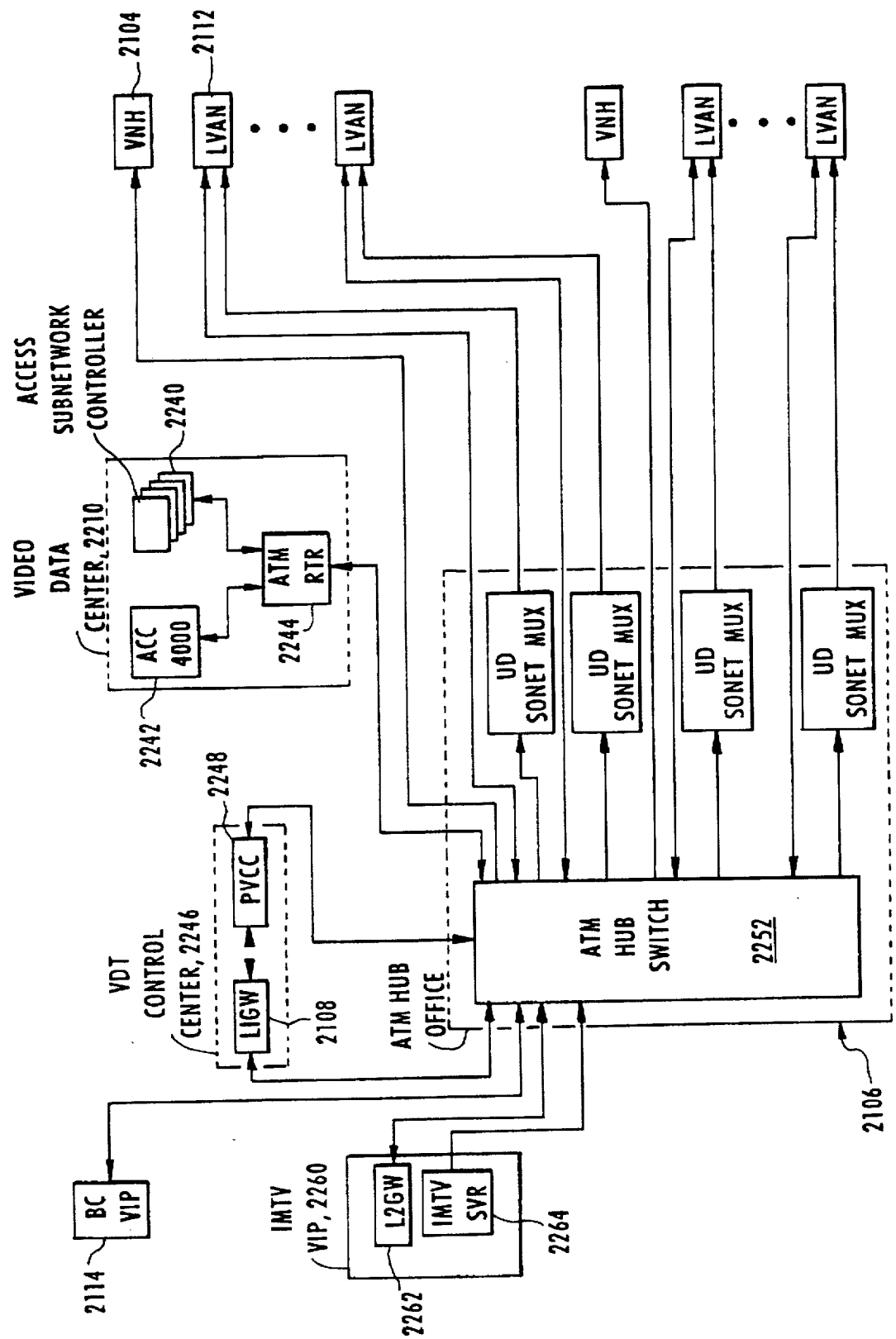
FIG. 9 is a block diagram of the ATM backbone network and the control systems for the network shown in FIG. 5.

As in the network overview of FIG. 1, each subnetwork includes a subnetwork controller. For the ATM subnetwork 2106, the controller is a PVC controller 2248, shown in FIG. 9. The Access Subnetwork Controller 2240 also is shown in FIG. 9.

The physical structure of the level 1 gateway is essentially the same in each embodiment except that the interfaces are different. Essentially, the level 1 gateway 2108 is a UNIX based computer having adequate processing power and data storage capacity. In this embodiment, the gateway 2108 has an interface for two-way ATM cell based communication through the ATM backbone subnetwork. In an initial implementation, the level 1 gateway 2108 has a direct data communication interface to the PVC controller 2248, as shown in FIG. 9. In that implementation, the PVC controller 2248 interfaces to the programmed control elements of the ATM hub switch 2252 through an X.25 packet data interface.

In a future implementation, the PVC controller 2248 will have an ATM interface to the hub switch 2252. Through this interface, the PVC controller 2248 will transmit instructions to the hub switch 2252 and receive confirmations and various reports from the hub switch. The level 1 gateway 2108 will also communicate with the PVC controller 2248 using ATM through the ATM subnetwork, in a manner similar to the communications between that gateway and the Access Subnetwork Controller 2240. The ATM interface between the PVC controller 2248 and the hub switch 2252 also will permit that controller to communicate with ATM access switches under its control.

The PVC Controller 2248 and the Access Subnetwork Controller 2240 also are computers having the appropriate network interfaces and software programming. The ACC 4000 is a computer system programmed to administer encryption keys and NIM network addresses in the hybrid-fiber-coax type access subnetwork. Computers similar to the ACC 4000 are used today in CATV headend systems, but those computers also run software relating to other CATV operations, e.g. billing.

The network shown in FIG. 5 is arranged to centralize signal processing tasks within a LATA in order to minimize hardware. At the same time, the disclosed network provides maximum flexibility by providing communications to local access nodes, each serving a local loop of subscribers.

The network disclosed in FIG. 5 includes a broadcast consolidation section (BCS) 2100, a broadcast ring 2102, a plurality of video network hubs (VNHs) or video access nodes (VAN) 2104 coupled to the broadcast ring 2102, an ATM backbone subnetwork 2106, a level 1 gateway 2108, a video data control center 2110, and a plurality of video end offices or local video access nodes (LVANs) 2112. According to the preferred embodiment, each of the video network hubs 2104 will serve a corresponding plurality of up to six (6) LVANs 2112. In addition, the preferred embodiment will provide up to sixteen (16) VNHs 2104 serviced by the ring 2102.

The broadcast consolidation section 2100 serves as the broadcast head-end and network interface for broadcast VIPs 2114 and 2116. The broadcast consolidation section 2100 is adapted to receive broadcast video data in any format that may be convenient for the VIP. Specifically, the broadcast consolidation section 2100 includes a digital encoder 2118 to convert baseband analog video signals, for example from VIP 2116, into a digitally-compressed DS-3 signal stream. Alternatively, the digital encoder 2118 could be replaced with an MPEG-2 encoder to provide compressed MPEG-2 packets at a DS-3 rate.

The broadcast consolidation section 2100 also includes an ATM cell multiplexer 2120, also referred to as an ATM edge device, which performs policing and rate conversion of incoming ATM streams. The ATM edge device 2120 performs policing of ATM cell streams by monitoring the data rate of incoming data streams from VIPs. For example, if the VIP 2114 has subscribed by contract to transmit a data stream at 3 Mbits/s to the network, the ATM edge device 2120 will prohibit or drop ATM cells that are transmitted above the subscribed bit rate; in this case, a 6 Mbits/s stream would be rejected as an unauthorized rate.

In order to maximize the data-carrying capacity of the ATM streams supplied to the ATM edge multiplexer 2120, the VIP 2144 and the VIP 2116 will preferably supply digital video signals in compressed MPEG-2 format that are adapted into in ATM cells using 5-cell and 8-cell adaptions in essentially the same manner as in the earlier embodiments.

Each of the VIPs 2114 and 2116 are preferably able to compress up to six (6) NTSC analog audio/video program signals in parallel into an MPEG-2 format. The resulting six (6) MPEG-2 packet streams with the appropriate overhead information are combined into a single MPEG-2 stream at 45 Mbits/sec (DS-3). The MPEG-2 streams are then converted into an ATM stream before transport to the ATM edge multiplexer 2120. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG encoded programs.

An ATM cell includes a header section and a payload section. The first byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes: the last four bits of the VCI; a 3-bit payload type (PT); and a cell loss priority (CLP) bit. The fifth byte of the header section 410 includes an 8-bit header error check (HEC) word. The CLP bit is used to manage traffic of ATM cells: in the event of network congestion, cells with CLP set to 1, indicating a lower priority, are dropped before cells with CLP set to 0.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0–18 for the VCI are reserved; therefore, any ATM cell having valid data must have a VCI value greater than "18". Thus, prior to transmission on the network, the ATM edge multiplexer 2120 identifies ATM cells that do not have VCI values greater than "18" as idle cells that do not carry valid data.

As noted above, each cell of a particular stream will have a header which contains a virtual path identifier/virtual circuit identifier (VPI/VCI) to identify the virtual circuit to which the cells pertain. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

As noted above, the VIP 2114 and/or VIP 2116 may transmit the ATM cells on a SONET optical fiber at an OC-3 rate, or may transmit the ATM cells at a DS-3 rate. The transmission of ATM cells in an asynchronous DS-3 signal may require a common clock reference in order to ensure frame alignment. In a preferred network implementation, the network interface 2100 receives the DS-3 signal carrying six MPEG-2 channels in ATM cell format from the ATM VIPs in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM edge multiplexer 2120 acts as a groomer for multiple VIP terminations to prevent extraneous data from using network resources. The ATM streams from the VIPs 2114 and 2116 may arrive in either DS-3 format or via optical fiber in OC-3 format. The ATM edge device 2226 provides a grooming function, whereby ATM cells are analyzed, on a cell-by-cell basis, to determine if they should be transmitted on the network. Specifically, ATM cell headers that do not have valid data are dropped from the ATM stream. Each valid ATM cell is mapped on the basis of its corresponding VPI/VCI header either to a valid OC-3 output port of the ATM edge device 2120, or possibly to a null port. In addition, the ATM edge device 2120 maps the ATM idle bits containing no information that are present in the ATM stream from the VIPs to a null port, thereby rejecting the received ATM idle bits.

The ATM cell mapping, also referred to as cell translation, enables DS-3 ATM cell streams that are transmitted at less-than-full capacity to be mapped onto at least one OC-3c stream operating at full capacity. This is particularly effective when, for example, optical fibers used by the VIPs 2114 or 2116 to transport DS-3 ATM streams using optical fibers will not be operated at capacity, especially when VIPs using the optical fibers have varying bandwidth requirements over time. The ATM edge processor 2120 processes all incoming DS-3 bit streams received thereby, and maps the DS-3 bit streams into at least one condensed, or combined bit stream for transmission through the network. Specifically, the incoming DS-3 and OC-3 streams are supplied to corresponding first-in-first-out (FIFO) input buffers internal to the 2120 to supply the ATM cells to an internal multiplexer on a cell-by-cell basis. The internal multiplexer outputs the translated cells preferably to OC-3 output buffers for synchronous transmission on optical fibers 2121. Since the ATM cells are output at a rate of 155 Mhz (OC-3), each of the optical fibers 2121 carryup to twenty (20) MPEG programs at 6 Mbits/sec. Thus, the ATM edge processor is able to fully load the downstream optical fibers 2121 thereby to fully load the capacity of the network. A more detailed description of the ATM cell multiplexer 2120 is found in copending and commonly-assigned application Ser. No. 08/380,744, filed Jan. 31, 1995, the disclosure of which is incorporated in its entirety by reference.

According to the preferred embodiment, the digital encoder 2118 outputs a digitally encoded data stream in DS-3 format (45 Mbits/s), and the ATM edge multiplexer 2120 outputs an ATM stream in OC-3c format (155.5 Mbits/s), to a SONET multiplexer 2122. The SONET multiplexer 2122 multiplexes the DS-3 and OC-3 signals from the digital encoder 2118 and the ATM edge multiplexer 2120 and outputs the consolidated broadcast data onto the unidirectional optical fiber broadcast ring 2102 operating at an OC-48 format (2488.3 Mbits/s). In other words, the SONET multiplexer 2122 may receive a plurality of OC-3 optical fibers 2121, either from the ATM edge multiplexer 2120 or a plurality of such multiplexers. In addition, the SONET multiplexer 2121 may receive a plurality of DS-3 signals from a corresponding plurality of encoders such as digital encoder 2118. The SONET multiplexer 2122 buffers the OC-3 and DS-3 input signals and multiplexes the input signals together at a rate of 2488.3 Mbits/sec. An exemplary SONET multiplexer is the FT-2000, manufactured by AT&T.

The broadcast ring 2102 is arranged as a drop-and-continue (D/C) SONET transport to service up to sixteen (16) VNHs 2104. Additional VNHs may be serviced by overcoming the distance limitations of the optical fibers. Although the broadcast ring 2102 preferably has one OC-48 fiber, the broadcast ring 2102 may be modified to include 2 or more OC-48 fibers for additional traffic, or for bidirectional traffic around the ring. As discussed below in detail with respect to FIG. 6, each VNH 2104 receives the broadcast ATM streams from the broadcast ring 2102, converts the ATM streams to MPEG-2 streams that are transmitted on an RF carrier, and adds local broadcast information (e.g., over-the-air access, public access channel) before transport to the associated LVANs 2112 as RF signals, preferably via optical fibers.

Each LVAN 2112 receives the consolidated broadcast data from the corresponding VNH 2104. The LVAN 2112 combines the received RF signals from the VNH 2104 with any data transmitted by the ATM backbone subnetwork 2106 addressed to a subscriber served by the LVAN 2112. The resulting RF signal is transmitted via a local loop distribution network 2124 to a number of customer premises 2126 (only one shown for convenience). As discussed below with reference to FIG. 8, the local loop distribution 2124 is preferably arranged as a hybrid fiber-coax distribution system, although an ADSL system or a fiber-to-the-curb system may be substituted.

The equipment at the subscriber site 2126 includes a network interface device (NID) for splitting the RF signal, a network interface module (NIM) for decoding encrypted data from the network and routing MPEG data streams, and a digital entertainment terminal (DET) for decoding the MPEG data streams passed by the NIM. Additional details regarding the NIM and the DET are discussed below with reference to FIG. 8.

As shown in FIG. 5, each LVAN 2112 has access to the ATM backbone subnetwork 2106 in order to send and receive network signaling information to and from the level 1 gateway 2108 and/or the video data control center 2110. For example, a video information user (VIU) who wishes service on the network via one of the LVAN's 2112 may request the service either by calling a network business office by telephone or by requesting a level 1 gateway session from his or her customer premises 2126 in order to perform on-line registration. As discussed in detail below, the ATM backbone subnetwork 2106 provides signaling information between the LVAN 2112 serving the VIU, the level 1 gateway 2108 and the video data control center 2110 in order to activate the VIU on the network, or to update the services available to the VIU.

The ATM backbone subnetwork 2106 also is adapted to communicate with the VIPs 2114 and 2116 in order to perform account management between the VIPs, the level 1 gateway 2108 and the video data control center 2110. For example, the VIP 2114 may supply a request to the level 1 gateway 2108 for a desired bandwidth in order to broadcast a pay-per-view event at a predetermined time. The level 1 gateway 2108 and the VIP 2114 will determine the appropriate VPI/VCI header to be loaded onto the ATM stream to be supplied to the ATM edge multiplexer 2120 of the broadcast consolidation section 2100. The level 1 gateway 2108 will inform the video data control center 2110 of the scheduled event, as well as the VPI/VCI of the video data stream. The level 1 gateway 2108 will also communicate with the VIPs 2114 and/or 2116 via the ATM backbone subnetwork 2106 in order to maintain up-to-date lists of authorized VIUs to receive the selected VIP services.

Finally, as discussed in detail below with respect to FIG. 9, the VIP 2116 may conduct an interactive (IMTV) session with a VIU via the ATM backbone subnetwork 2106 and the LVAN 2112 servicing the specific VIU. Although not shown in FIG. 5, the VIP 2116 can conduct IMTV sessions with a VIU using a level 2 gateway and an IMTV server internal to the VIP 2116. The level 2 gateway communicates with the level I gateway 2108 of the network, to receive and process requests for IMTV sessions that include routing information. The IMTV server outputs broadband data for the VIU as an ATM cell stream to the ATM backbone subnetwork 2106.

Communication between the network and the VIP 2116, as well as between the network and the VIU, is established under control the level 1 gateway 2108. From the VIU perspective, a user will communicate with the network via the level 1 gateway 2108 in order to select the VIP 2116 for an IMTV session. In a network providing access to multiple IMTV Service providers, the user wishing to establish an IMTV session identifies the provider of choice to the level 1 gateway 2108 by inputting control signals to the user's DET, which supplies the appropriate signals upstream from the customer premises 2126 to the level 1 gateway 2108 via the corresponding LVAN 2112 and the ATM backbone subnetwork 2106. In response, the level 1 gateway 2108 controls the broadband routing functionality of the network to establish a downstream broadband communication link and a signaling link between the provider and the user.

The level 1 gateway 2108 receives notification of the status of broadband communications links as they are being set up and during ongoing communications through those links. The level 1 gateway 2108 therefore can inform a subscriber when a requested session can not be set up with a selected service provider, i.e. because the provider's server ports are all busy or because the subscriber is not registered with the particular provider or due to some technical problem. The level 1 gateway 2108 also recognizes when an established link develops a fault or is interrupted and can stop accumulating usage or billing data regarding that link. The level 1 gateway 2108 cab also notify the subscriber and/or the service provider of the failure.

The level 1 gateway 2108 will also store various information relating to each subscriber's services and provide high level control of services through the network accordingly. At least some of this stored data is accessible to the subscriber through a direct interaction with the level 1 gateway 2108. For example, the user can identify certain service providers to the level 1 gateway 2108 and define an authorization code or identification number which must be input before the network should provide a session with the user's equipment 2126 and the identified providers.

Many of the functions of the level 1 gateway 2108 relate principally to set up, monitoring and billing for point-to-point type interactive sessions. As noted above, however, a number of the gateway functions also apply to broadcast services. For example, the interaction with the level 1 gateway 2108 can be used to advance order upcoming broadcast pay-per-view events. At the time for the event to begin, the level 1 gateway 2108 will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the level 1 gateway 2108 also permit subscribers to specify limitations they wish to place on their broadcast services, e.g. total number of hours of usage within some defined interval and/or time of day/week of permitted usage. The level 1 gateway 2108 will then control the broadcast network and/or the subscriber's terminal in accord with the limits defined by the subscriber.

Figure 6:
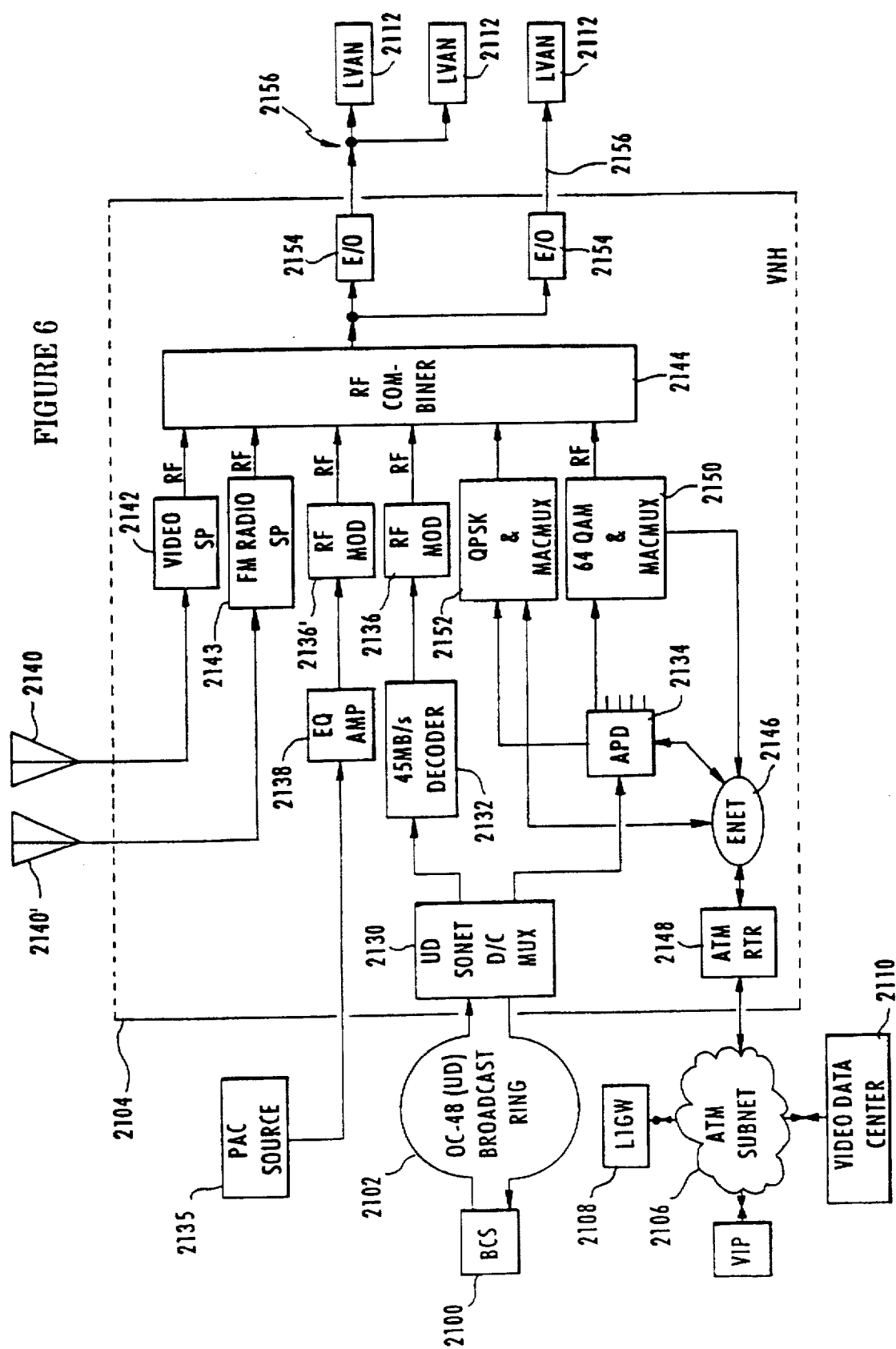
FIG. 6 is a block diagram of one of the video network hub offices shown in FIG. 5.

FIG. 6 is a block diagram of the network showing in detail a VNH 2104 in accordance with the preferred embodiment of the present invention.

As shown in FIG. 6, each VNH 2104, also referred to as a broadcast headend node, comprises a SONET multiplexer 2130 that receives the OC-48 signal from the broadcast ring 2102. The SONET multiplexer 2130 is a drop-and-continue (D/C) multiplexer that "drops" the OC-48 signal from the broadcast ring 2102 for local processing, and outputs the OC-48 signal to "continue" on the broadcast ring 2102. The SONET multiplexer 2130 converts the OC-48 signal to obtain the OC-3 ATM stream and the digitally-encoded (DS-3) baseband video signal output by the ATM edge multiplexer 2120 and the digital encoder 2118, respectively, as shown in FIG. 5.

The SONET multiplexer 2130 extracts the ATM cells by analyzing the input stream in 5-byte increments in order to check the header/error/check (HEC) sequence for valid ATM data; if the SONET multiplexer 2130 verifies the HEC sequence, the 53-byte ATM cell is extracted and supplied to an ATM packet demultiplexer (APD) 2134. Although FIG. 6 shows only one ATM packet demultiplexer 2134, in the preferred embodiment the VNH 2104 includes a plurality of the demultiplexers.

The VNH 2104 includes an analog portion that receives analog baseband video signals from the VIPs, from a Public Access Channel (PAC) broadcast source 2135, and from Over-the-Air (OTA). Specifically, the SONET multiplexer 2130 outputs the DS-3 encoded baseband video signal to a DS-3 analog decoder 2132, which converts the DS-3 signal back to the VIP analog baseband video signal. The VIP analog baseband video signal is output from the analog decoder 2132 to a modulator 2136, which includes a tuner to mix the VIP baseband video signal from the analog decoder 2132 onto a specific 6 MHz bandwidth RF channel. The PAC Broadcast Source 2135 provides public access channel (PAC) programming related to community activities as a PAC baseband analog video signal, preferably via an optical fiber. A fiber optic receiver and equalizer amplifier 2138 converts the optical signal from the PAC Broadcast Source 2135 to a baseband analog PAC video signal that is supplied to a modulator 2136' for mixing to a specified 6 MHz channel.

The analog portion of the VNH 2104 also includes a plurality of antennas 2140 that receive Over-the-Air (OTA) broadcast signals at VHF and UHF frequencies. The OTA signals are supplied to an analog signal processor 2142, which performs signal conditioning and modulates the OTA signals to specified 6 MHz bandwidth RF channels. For example, the analog signal processor 2142 may modulate the OTA television channels 4, 7 and 9 to 24, 27, and 29, respectively, in order to avoid interference with the PAC or VIP analog video channels. The VNH 2104 may also include another antenna 2140' that receives FM radio signals and supplies the FM signals to an FM radio signal processor 2143. The signal processor 2143 outputs the FM radio signal within a specified RF band, preferably the FM radio band, to the RF combiner 2144.

Thus, the video signals output by the modulator 2136 and the analog signal processor 2142 are analog RF video signals at different 6 MHz RF channel frequencies, as well as the FM signals output by the signal processor 2143. The analog signals output from the FM radio signal processor 2143, the modulator 2136 and the analog signal processor 2142 go to an RF combiner 2144. The RF combiner 2144 is a passive combiner which combines the VIP, PAC and OTA analog video signals and the FM radio signal into a single RF signal. The video portion of the combined RF signal includes a plurality of analog 6 MHz channels. Thus, the VIP analog video signals, the PAC analog video signals and the OTA analog video signals can be received and viewed using a conventional television set, without the need for a digital entertainment terminal. Thus, these analog video signals could make up a basic video service analogous to the type offered by contemporary cable-TV companies. A video dial tone network subscriber can also receive FM radio broadcasts using a conventional FM receiver.

The RF combiner 2144, however, enables passive combining of different baseband analog video signals, as opposed to known cable-TV systems, which require a rewire of modulators whenever a change was made in channel allocation. Thus, changes in the channel allocation in the disclosed embodiment can be made merely by reprogramming the modulator 2136 and the analog signal processor 2142. As discussed below, the RF combinet 2144 is also adapted to combine RF signals carrying the compressed digital video signals from the VIP.

The digital portion of the VNH 2104 receives the compressed VIP digital video signals from the recovered OC-3c ATM stream output from the SONET multiplexer 2130. The OC-3c ATM stream is output from the SONET multiplexer 2130 to one of several ATM packet demultiplexers (APD) 2134 (only one shown for convenience). The APD 2134 performs ATM processing and repacketizes the MPEG-2 packets on the basis of the VPI/VCI headers of the incoming ATM streams by reversing the 5-cell and 8-cell adaptations discussed earlier. Specifically, the ATM packet demultiplexer 2134 buffers cells until it finds a cell having an ATM cell Adaptation Unit (AAU) value of "0" in its header (first cell) and another cell having an AAU value of "1" in its header (last cell). The ATM packet demultiplexer 2134 counts the number of cells from first to last to determine the type of adaptation used to map cells.

If the ATM packet demultiplexer 2134 has captured five cells, the receiver pulls out the payload data and uses the CRC data to check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

The reconstructed MPEG packets are assigned new PID values based on the VPI/VCI value of the ATM stream that carried the MPEG packets. This mapping of new PID values in response to the VPI/VCI of the ATM stream is based upon a translation table loaded into the ATM packet demultiplexer 2134 by the Access Subnetwork Controller 2240, via a virtual circuit through the ATM subnetwork and a signaling path 2146 (Ethernet or the like), discussed in detail below.

In a typical example, there are at least three PID values for packets of a particular program, a first PID value for packets containing video, a second PID value for packets containing audio and another PID value for a packet containing a program map. There often are more than three PID's associated with programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets continuing video, audio and/or data from the particular source.

In a combined MPEG packet stream carrying packets for two or more programs, the PID values for each program will be unique. For example, the program map for HBO might be found in packets corresponding to PID 132; the program map for TMC might be found in packets identified by PID 87 and so forth. The program map for HBO in the packet with PID 132 would then identify the PID numbers for the actual packetized elementary streams (PES) for the video, audio and data (if any) channels associated with the HBO program. The program map for TMC in the packet with PID 87 would then identify the PID numbers for the actual packet sized elementary streams (PES) for the video, audio and data (if any) channels associated with the TMC program.

In the OC-3c stream received by each APD 2134, the packets carried in the ATM cells have PID values assigned by the respective VIP's encoding equipment. The MPEG-2 standard also requires that a packet stream containing packets relating to one or more programs includes a program association table in a packet identified by PID 0. The program association table maps each program source with the PID value associated with the program map related to that source. In accord with the standard, the VIPs' encoders will construct the MPEG packet streams for each program to include a PID 0 packet containing the program association table. The program streams also include a packet identified by a PID value in that table containing the program map for that program. Thus, the APD can capture the program association table in packet PID 0 to identify the PID value for the program map from the source of programming and can capture the program map to identify the PID values applied by the source encoder to identify the data (if any), video and audio for the particular program. Alternatively, the APDs could be preprogrammed with the relevant PID values inserted by the VIPs' encoders. The translation table in the APD 2134 is used to map each PID value in the reconstructed packets of a particular program into a new PID value which is unique at least within the output stream of the particular output port of the APD, as a function of the VPI/VCI value of the received ATM cells.

For example, assume for convenience that the HBO program arriving at the APD consists of video packets with a PID value of 17 and audio packets with a PID value of 19. The program map is contained in a packet identified by PID value 3, and the program association table in packet PID 0 identifies PID '3' for the program map. The APD recognizes all of the packets as originating from a single program source based on the VPI/VCI of the ATM cells and maps the PID values into new unique values, e.g. 27 for video and 37 for audio. The APD also constructs a new program map containing the new PID values for video and audio and inserts the new map in a packet identified by PID value of 132.

The APDs provide five broadband (27 Mbits/s payload) output rails. Assuming 6 Mbits/s programs for simplicity, the APDs combine four MPEG-2 packet streams representing four programs for output on each broadband rail. The APDs will combine more programs into each output transport stream if the programs use lower bit rates, e.g. 1.5 or 3 Mbits/s. Preferably, each broadband output stream contains a mix of 6 Mbits/s, 3 Mbits/s and/or 1.5 Mbits/s programs fully utilizing the 27 Mbits/s payload capacity.

If strict compliance with the MPEG-2 standard is necessary, the APDs can construct and insert a new PID 0 packet into each such broadband output stream. The PID 0 packet output in each broadband transport stream would include a new program association table for that transport stream, i.e. identifying the PID value of the program maps for the four or more programs contained in the broadband transport stream output.

As discussed in more detail below, reception of a particular digital program requires that the CPE terminal device know the RF channel transporting the program and at least one PID value associated with the program. Preferably, the PID value is that of the program map for the particular desired program, e.g. 132 in the above HBO example. Although the transport stream may include the program association table in packet PID 0 to insure compliance with the standard, the downloading of the PID value for the program maps eliminates processing time delays in channel surfing required to capture PID 0 packets. The Access Subnetwork Controller 2240 maintains tables which correlate PID values, particularly for program maps in each output stream, to logical channel numbers. The Access Subnetwork Controller 2240 includes these PID values in connection block descriptors supplied to the level 1 gateway 2108 for subsequent downloading to the DETs.

The ATM packet demultiplexer 2134 outputs the reconstructed MPEG packets on one of five 27 Mbits/s digital signal paths or 'rails' to a corresponding modulator/multiplexer 2150. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a CATV type distribution network. Using 64 QAM (quadrature amplitude modulation), 4 channels of 6 Mbits/s MPEG encoded digital video information can be modulated into one 6 Mhz bandwidth analog channel. Similarly, 16 VSB (vestigial sideband) yields 6 channels of 6 Mbits/s MPEG encoded digital video information modulated into one 6 Mhz bandwidth analog channel. Each RF modulator produces a 6 Mhz bandwidth output at a different carrier frequency.

In the illustrated preferred embodiment, the modulator/multiplexer 2150 is a Quadrature Amplitude Modulator (QAM) operating at 64 QAM, whereby media access control (MAC) is performed to ensure proper timing of the resulting time-division multiple access (TDMA) signal. Thus, each of the five 27 Mbits/s digital signals are 64 QAM modulated and multiplexed into an IF signal, which is upconverted into a specific 6 MHz channel. The upconverter may be an element of the QAM/multiplexer 2150 or a separate element (not shown) hard wired to process the output of the QAM/multiplexer 2150. Thus, the QAM/multiplexer 2150 outputs the 6 MHZ channels to the RF combiner 2144 for combining with the other 6 MHz RF signals. The RF combiner 2144 thereafter outputs the combined RF signals to a lightwave transmitter 2154, which outputs the combined RF signals on an optical fiber 2156 for transmission to the local video access nodes 2112.

Although the disclosed network is designed to transport digital broadband data for high data-rate applications such as video, the network is also able to transport low data-rate information to be broadcast from an information provider to the VIUs. In such a case, the ATM packet demultiplexer 2134 will determine from the VPI/VCI that the received data is a low-rate data signal; consequently, the ATM packet demultiplexer 2134 will output the low-rate data signal in MPEG format to a quadrature phase-shift keyed (QPSK) modulator 2152, which modulates the low-rate data signal for RF transmission after passing through the RF combiner 2144. The low data rate transmission may carry text or signaling information from a VIP in some way relating to one or more services offered by that VIP.

Thus, the APDs 2134 map ATM cells into MPEG packets for both broadband services and narrowband information (e.g. signaling). The APD 2134 is programmed to map VPI/VCI values in the cells into certain PID values in the resultant packets. Based on the VPI/VCI value, the APD 2134 also will route the packets to an identified one of its outputs. The APD 2134 outputs broadband related packets and associated in-band signaling on one of five 27 (payload) Mbits/s output rails going to one of the 64 QAM modulators 2150. The APD 2134 outputs packets related to downstream out of band signaling on a separate 1.5 Mbits/s (payload) rail going to a QPSK 2152.

The signaling path 2146 coupled to the components of the VNH 2104 is preferably an Ethernet communication path. Although not shown in detail, the Ethernet signaling path 2146 provides signaling and control signals to each of the components of the VNH 2104. The Ethernet signaling path 2146 communicates with the video data control center 2110 via the ATM backbone subnetwork 2106 in order to provide the operating status of each of the components of the VNH 2104. Specifically, the Ethernet signaling path 2146 provides upstream signaling data to an ATM router 2148, which packets the Ethernet signals in ATM cell format, provides a VPI/VCI header for the intended destination of the Ethernet signal, and outputs the ATM stream onto the ATM backbone subnetwork 2106. The ATM backbone subnetwork 2106 routes the ATM stream from the ATM router 2148 of the VNH 2104 to a corresponding ATM router 2244 at the video data control center 2110 (FIG. 9). Preferably, the ATM backbone subnetwork 2106 routes ATM streams between the VNH 2104 and the video data control center 2110 along dedicated virtual paths. The ATM router 2244 at the video data control center 2110 receives the ATM stream, reassembles the Ethernet signals, and outputs the Ethernet signals on its local Ethernet bus with a destination corresponding to the VPI/VCI of the ATM stream. The ATM virtual circuit to the video data control center 2110 is a two-way circuit and carries instructions from the video data control center 2110 back to the components of the VNH 2104.

Figure 7:
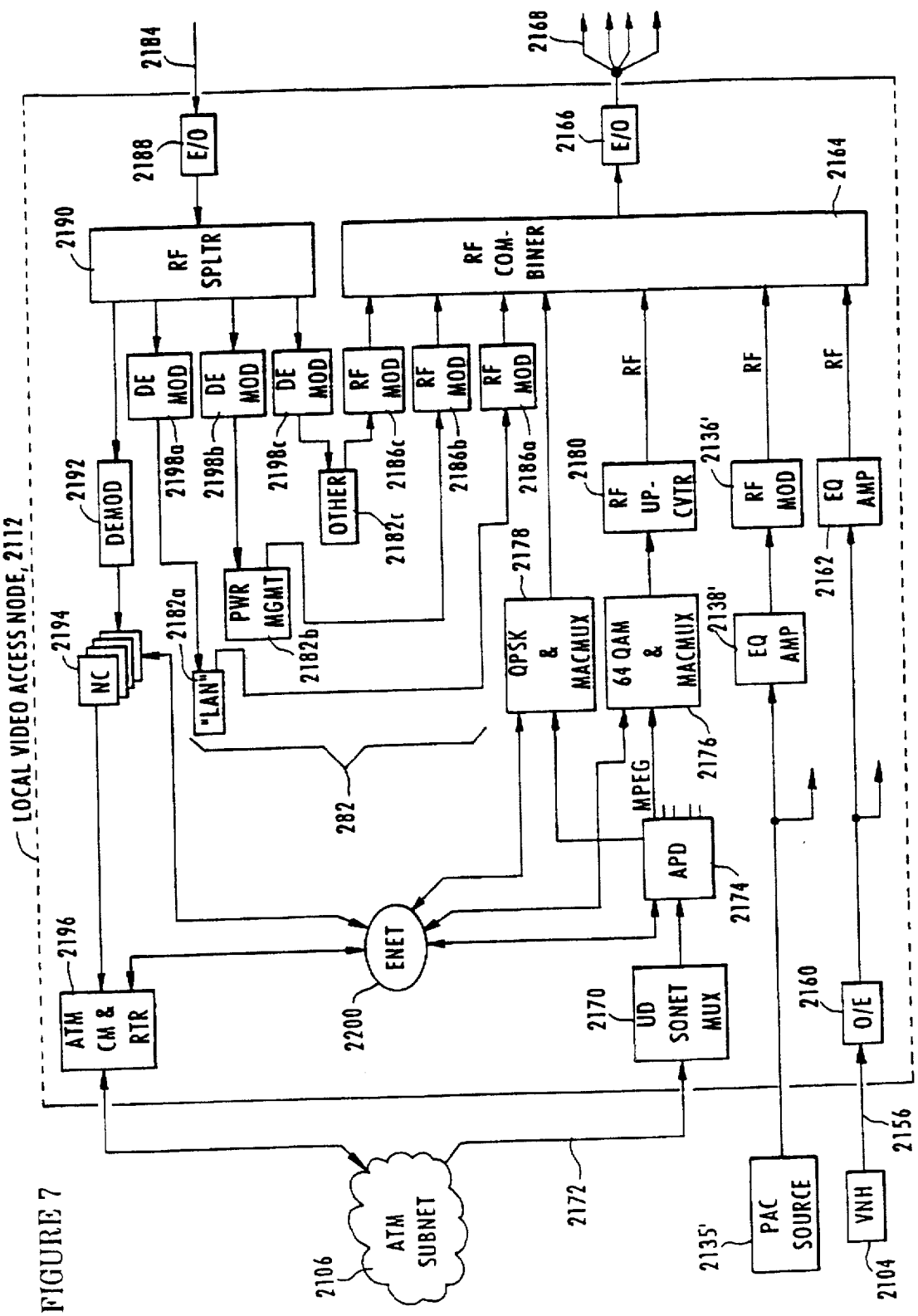
FIG. 7 is a block diagram of one of the local video access node type end offices shown in FIG. 5.

FIG. 7 discloses one of the network local video access nodes (LVAN) 2112 according to a preferred embodiment of the present invention. The disclosed LVAN 2112 is one of a plurality of LVANs that is distributed throughout the network service area in order to provide service to customers. In early implementation stages, however, it is anticipated that the first deployed LVAN 2112 may be collocated with the VNH 2104 in order to service a limited service area. Later deployed LVANs 2112 will be located remotely from the VNH 2104.

One of the electrical-to-optical converters 2154 in the video network hub (VNH) 2104 transmits, the combined RF spectrum signal over an optical fiber 2156 to one of the local video access nodes (LVNs) 2112. As shown in FIG. 7, the LVAN 2112, also referred to as a video central office or video end office, includes an optical-to-electrical (O/E) receiver 2160 that converts the optical. RF signal from the optical fiber 2156 to an electrical RF signal. The RF signal output from the O/E receiver 2160 is supplied to an equalization amplifier 2162 for signal conditioning before RF combination by an RF combiner 2164, similar to the RF combiner 2144 shown in FIG. 6. The combined RF signal is output from the RF combiner 2164 and reconverted to an optical signal by the electrical-to-optical (E/O) transmitter 2166. The E/O transmitter 2166 supplies the optical signal to the local loop distribution via optical fibers 2168.

If desired, the LVAN 2112 may also combine the RF signal from the VNH 2104 with a local PAC broadcast signal supplied by a local PAC source 2135. In such a case, the local PAC broadcast signal is received by a fiber optic receiver and equalizer amplifier 2138', which supplies the conditioned local PAC broadcast signal to the modulator 2136' for conversion to an RF signal at an available 6 MHz channel before combining by the RF combiner 2164.

The LVAN 2112 also provides signaling traffic between the VIU and the network, as well as broadband traffic for interactive multimedia television (IMTV) sessions. Specifically, the LVAN 2112 includes a SONET multiplexer 2170 that receives optical signals carrying ATM streams from the ATM backbone subnetwork 2106 via a unidirectional OC-48c optical fiber 2172. The SONET multiplexer 2170 converts the OC-48 signal into OC-3c signals carrying ATM streams. The ATM cells transport IMTV traffic and VIU signaling traffic from the VIPs and the network, respectively. The OC-3c signal is input to an APD 2134, which repacketizes the ATM cells into MPEG format and assigns PID values based on the VPI/VCI value of the received ATM cells. The APD 2134 preferably is identical to the ATM packet demultiplexer 2134 in the VNH 2104 and performs the packet reconstruction and PID value mapping in exactly the same manner as discussed above.

The APD 2174 determines from the VPI/VCI value whether the ATM cells transport broadband data such as video, or narrowband data such as VIU signaling information or text data. The APD 2174 outputs the broadband data in one of five 27 Mbits/s MPEG streams to one of five 64-QAM MACMUX modulators 2176. In addition, the APD 2174 outputs the narrowband data as an MPEG stream to a QPSK modulator 2178, which modulates the MPEG stream carrying narrowband data for combining by the RF combiner 2164. The 64-QAM MACMUX modulator 2176 outputs the modulated broadband signal to an RF upconverter 2180, which outputs the modulated broadband signal on an available 6 MHz RF channel for combining by the RF combiner 2164. Thus, the RF combiner outputs a combined RF stream carrying 6 MHz channels of information to the VIUs from different sources, including broadcast VIPs. PAC Broadcast Source 2135', IMTV VIPs, and network controllers for signaling traffic.

An additional feature of the present invention is that the information output by the RF combiner 2164 is not limited to broadband video from broadcast or IMTV VIPs, and signaling traffic from the network. Rather, since the VIU is able to transmit information to the LVAN 2112 via a optical fiber upstream signaling link 2184, the LVAN 2112 may be adapted to transmit to the VIUs information from any data source. For example, reference numeral 2182 denotes other data sources that can use the disclosed network for transport to the VIU: a user could remotely access a LAN source 2182a using the upstream signaling link 2184 for two-way communication; the network could control power to the user's DET, or alternatively work in conjunction with electric utilities to read a user's electric meter using a power management controller 2182b; or a reserved port 2182c could be set aside for future interactive data applications. In such a case, the data is output from one of the sources 2182 to a corresponding RF modulator 2186 before combining by the RF combiner 2164.

Upstream signaling from the VIU is received from the upstream signaling link 2184 by an E/O receiver 2188, which outputs the multiplexed RF signal from the VIUs to an RF splitter 2190. The RF splitter 2190 splits the RF spectrum and outputs the split RF spectrum on predetermined signal paths. For example, a predetermined RF channel will contain signaling information to be supplied from the VIU to the level 1 gateway 2108, such as a request for new service, or a request for an IMTV session with a VIP via a Level 2 gateway. This VIU signaling information will be supplied to a demodulator 2192 to demodulate the signaling information off the RF carrier. The demodulator 2192 will output the demodulated VIU request to one of thirteen (13) network controllers (NC) 2194, each of which processes VIU requests and identifies the destinations for the requests from a specified group of CPE devices. The NC 2194 passes each VIU request to an ATM router 2196, which receives inputs from the network controllers, packetizes the VIU request in an ATM cell stream, adds a VPI/VCI header to identify the destination of the request, and outputs the ATM stream onto the ATM backbone subnetwork 2106. The processing of the VIU request is discussed in more detail below.

As discussed above, the upstream signaling link 2184 may provide upstream signaling data for the other data sources 2182. For example, the RF splitter 2190 outputs an RF signal at a predetermined band to one of the demodulators 2198 corresponding to the devices 2182. The demodulators 2198 remove the RF carrier signal and output the demodulated signal to the corresponding device 2182.

As discussed above with respect to FIG. 6, the VNH 2104 includes an Ethernet control network to control the components of the VNH 2104. Similarly, the LVAN 2112 comprises an Ethernet system 2200 for controlling the components of the LVAN 2112. As discussed in detail below with respect to FIG. 9, the Ethernet system 2200 communicates with the network via the ATM router 2196, which passes Ethernet messages between the Ethernet system 2200 and remote Ethernet systems via the ATM backbone subnetwork 2106.

Figure 8:
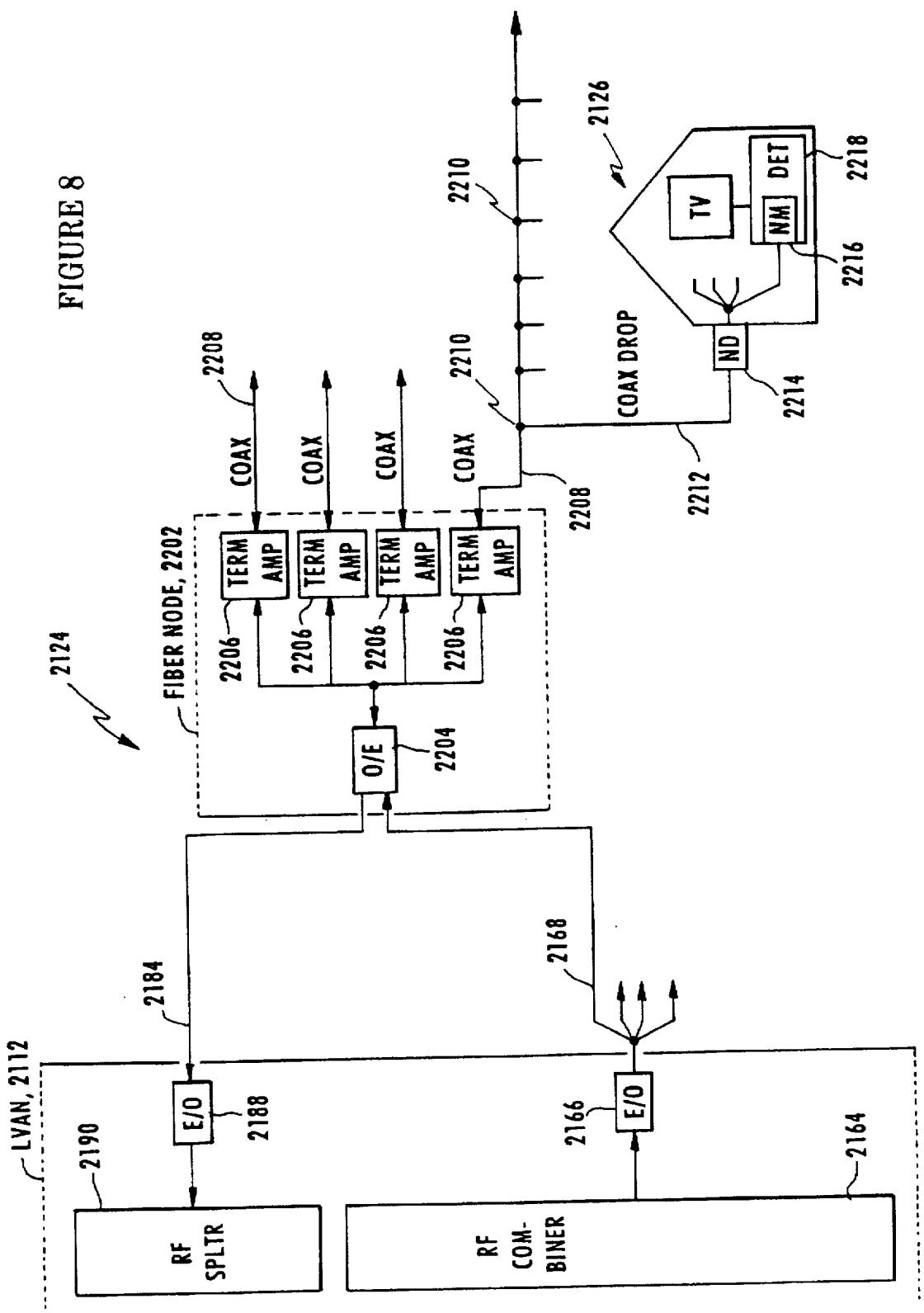
FIG. 8 is a block diagram of one local loop distribution system portion of the network shown in FIG. 5.

FIG. 8 discloses an exemplary implementation of the local loop distribution network 2124 shown in FIG. 5 in accordance with the preferred embodiment of the present invention. Although the local loop distribution 2124 shown in FIG. 8 is a hybrid-fiber coax system, one having ordinary skill in the art will appreciate that other local loop distribution systems may be used, such as Asymmetrical Digital Subscriber Loop (ADSL), Fiber-to-the-curb, or direct fiber to the living unit. One preferred alternative utilizes a switched digital video fiber-to-the-curb access subnetwork such, as shown in FIG. 3 of the 08/304,174 parent application.

As shown in instant FIG. 8, the combined RF signal output from the RF combiner 2164 is converted to an optical signal by the E/O transmitter 2166 and output to the local loop distribution 2124 on the optical fibers 2168. Generally, the optical signal will be provided to a plurality of optical fibers via an optical splitter, preferably a maximum of four optical fibers per combiner 2164. Each optical fiber 2168 carries the combined analog RF signal to a fiber node 2202.

According to the preferred embodiment, each fiber node 2202 serves one broadcast service area (BSA) of up to 500 homes passed.

The fiber node 2202 comprises an O/E transceiver 2204 that provides two-way conversion between optical and electrical RF signals transmitted to and received from a plurality of terminal amplifiers 2206. Each terminal amplifier 2206 outputs the downstream electrical RF signal onto a coaxial cable 2208. The coaxial cable 2208 is designed to pass one hundred twenty five (125) homes. Specifically, a tap 2210 is installed along the 2208 for each living unit that wishes activation on the network. A coaxial drop cable 2212 is wired between the 2210 and the customer premises 2126. Thus, assuming each home receives a tap 2210 for service on the network, each coax cable 2208 will service up to 2125 homes.

As shown in FIG. 8, the customer premises 2126 includes a network interface device (NID) 2214, a network interface module (NIM) 2216, and a digital entertainment terminal (DET) 2218. The NID 2214 receives the coax drop 2212 and splits the RF signal into four coax signal paths. Each home or living unit 2126 is preferably allocated a capacity of four digital entertainment terminals 2218 (DET's).

Each coax feed is supplied to the NIM 2216, which demodulates the downstream RF signal at a user-specified channel frequency. If the demodulated RF signal is an analog video signal from an analog source (such as the PAC 2135), the NIM 2216 passes the baseband analog video signal directly to the television set without further processing by the DET 2218.

If, however, the NIM 2216 receives an MPEG encoded signal, the NIM 2216 will de-encrypt the 27 Mbits/sMPEG encoded signal using a key downloaded from the network's ACC-4000 (described in detail below). Upon de-encrypting, the NIM 2216 supplies the 27 Mbits/s MPEG encoded signal to the main portion of the DET 2218 for further processing to present a selected program to the user.

The NIM 2216 also demodulates a downstream signaling channel carrying signaling data in MPEG packets. From the signaling channel, if the MPEG encoded signal has a PID value corresponding to the NIM address, the NIM 2214 processes the MPEG stream as NIM signaling data. If, however, the PID value corresponds to the DET address, the NIM 2214 extracts the data from the MPEG stream and outputs that data to the DET CPU. Alternatively, the NIM and DET may have a single PID value address, in which case, data within the signaling packet indicates whether the message is for the NIM or the main portion of the DET.

As noted above, the DET is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

The NIM 2216 provides the interface necessary for the DET 2218 to communicate with the local loop distribution system 2124. The structure of the NIM 2216 is dependent on the local access technology (in this case, hybrid-fiber coax). The NIM 2216 provides standardized control signals to and from the DET 2218. Consequently, the main portion of the DET 2218 can be implemented as a generic consumer product that is independent of the local access technology, whether it is hybrid-fiber coax, ADSL, satellite receiver, or fiber to the curb.

Although not shown in FIG. 8, the NIM 2216 presents two connections to the DET 2218, a high bit rate broadband connection (27 Mbits/s) and a low bit rate signaling connection. The broadband connection is a one-way downstream only connection, but the low-bit rate signaling connection is a two-way connection. The main portion of the DET 2218 receives multi-program MPEG streams from selected RF channels from the NIM 2216, and decompresses selected MPEG packets in order to recover the original digital signal. An MPEG demultiplexer within the main portion of the DET determines whether the data in the broadband MPEG packets is digital video or audio data or other broadband data, and supplies the data through respective MPEG decoders to the television or to the DET microprocessor, accordingly.

The NIM 2216 includes a frequency agile demodulator for processing the downstream narrowband transmissions. The demodulated data may relate to NIM functions or to functions of the main portion of the DET 2218. The NIM also includes a frequency agile QPSK modulator, to permit transmission of upstream signaling information over the coaxial cable on specified RF channels not used for downstream transport. The main portion of the DET can supply messages to the NIM for such upstream transmissions, and under certain circumstances, the NIM's internal control processor can transmit upstream messages in this manner.

As discussed below, the network assigns each NIM 2216 to a default channel for downstream reception and a default channel for upstream transmission. The QPSK demodulator and the QPSK modulator within the NIM can also shift to other channels allocated on a dynamic basis, e.g. to provide signaling for IMTV services requiring more bandwidth than is available through the default channels. If the narrowband digital signal is signaling information for the main portion of the DET 2218, the signaling information is supplied to the DET microprocessor as raw data, for appropriate processing. If the digital narrowband signal is signaling information for the NIM 2216, the processor within the NIM receives and processes information.

The DET 2218 is adapted to receive and store downloaded control software. The DET 2218 can establish a link to the network via a level 1 gateway session to receive operation systems code, default channel maps, and permissions tables in order to receive broadcast services from multiple VIPs. In some cases, the DET may also establish a point to point link to a VIP's interactive equipment to receive software for controlling use of a VIP's IMTV services. For broadcast services, the DET captures a cyclically broadcast application, for example navigation software.

The DET 2218 captures and processes a digital channel based on the RF channel and the PID value associated with the program map for the particular source program. As noted above, the program map specifies the PID values for packets continuing video, audio and/or data from the particular source. For example, HBO might be one of four digital programs carried in RF channel 53, and the program map for HBO might be found in packets corresponding to PID 132. The program map for CBS in the packet with PID 132 would then identify the PID numbers for the actual packetized elementary streams (PES) for the data (if any), video and audio channels associated with the HBO program.

Once the DET 2218 identifies and captures the programming map, the MPEG decoder section can extract the video elementary stream, the audio elementary stream(s) and any associated data stream for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

In the preferred network implementation, the NIM 2216 stores the decryption keys that are supplied from the ACC 4000 2242 through the APD 2134, the downstream signaling channel output on the 64-QAM MACMUX modulator 2176 and the RF upconverter 2180 in FIG. 7. The NIM uses those keys to decrypt selected programs before supplying the program signals to the main portion of the DET.

A more detailed description of the structure of the DET and NIM and the operations thereof involved in downloading applications software and operating system changes into the DET through a network similar to that of FIG. 4 are disclosed in copending application Ser. No. 08/380,755, filed Jan. 31, 1995 (attorney docket No. 680-083C), incorporated herein in its entirety by reference.

Commonly assigned U.S. patent application Ser. No. 08/413,207, filed Mar. 28, 1995 entitled "ATM Packet Demultiplexer for Use in a Full Service Network Having Distributed Architecture" (attorney docket No. 680-116), now U.S. Pat. No. 5,544,16 provides a more detailed description of the structure and operation of the APDs, the NIM and the DET, and the description of those elements from that case is incorporated herein by reference.

FIG. 9 is a block diagram illustrating the relation of the ATM backbone subnetwork 2106, the video data control center 2110, and a Video Dial Tone (VDT) control center including the level 1 gateway 2108 shown in FIG. 5. As shown in FIG. 9, the video data control center 2110 includes an Access Subnetwork Controller 2240, an ACC-4000 2242, and an ATM router 2244 for sending and receiving ATM cell streams to and from the ATM backbone subnetwork 2106.

The Access Subnetwork Controller 2240 communicates with the elements in the VNHs 2104 and the LVANs 2112 via the ATM router 2244, dedicated virtual circuits through the ATM subnetwork 2106 and the ATM routers 2148, 2196 and associated Ethernets 2146, 2200 in the respective offices. The ACC 4000 2242 communicates with the APDs 2134, 2174 in the VNHs 2104 and the LVANs 2112 via the ATM router 2244, dedicated virtual circuits through the ATM subnetwork 2106 and the ATM routers 2148, 2196 and associated Ethernets 2146, 2200 in the respective offices. For example, through such communications, the Access Subnetwork Controller 2240 downloads PID value mapping information based on the VPI/VCI values of incoming cells to the respective APDs, and the ACC 4000 2242 downloads encryption keys to the APDs. The ATM router 2244 and the ATM backbone network 2106 also permit the Access Subnetwork Controller 2242 to communicate with the level 1 gateway 2108.

The VDT Control Center 2246 comprises the level 1 gateway 2108 and a Permanent Virtual Circuit (PVC) controller 2248. Although not shown, the VDT Control Center 2246 includes a corresponding ATM router to repacketize the ATM cells and supply the messages to the level 1 gateway.

The PVC controller 2248 is the external controller for the ATM subnetwork 2106. The ATM subnetwork 2106 includes at least one hub ATM switch 2252, as shown in FIG. 9. In future implementations providing IMTV services from larger numbers of VIPs to larger numbers of VIUs, the ATM subnetwork 2106 will include the hub switch 2252 and a number of ATM access switches (not shown). The access switches will provide connections from the hub switch to particular nodes of the access subnetwork.

As shown, the PVC controller 2248 connects directly to the ATM hub switch 2252. In one implementation, this is an X.25 connection. When upgraded to interact with multiple ATM switches, the PVC controller 2248 has an open interface to all of the ATM switches to allow communication with and control of switches produced by various manufactures. In the preferred multi-switch embodiment, an ATM signaling connection from the PVC controller 2248 provides communications with the programmed controller of the hub switch itself and provides virtual circuit connections through the hub switch to the programmed controllers of the various ATM access switches. Although not shown in FIG. 9, the ATM hub switch 2252 may also provide a dedicated permanent virtual circuit for the communications between the level 1 gateway 2108 and the PVC controller 2248.

The PVC controller 2248 interfaces to the network operations support system (OSS) 2109, the level 1 gateway 2108 and the one or more switches of the ATM subnetwork 2106. The PVC controller 2248 serves as the single point of contact between the level 1 gateway 2108 and the ATM backbone subnetwork 2106. All signaling and control messages to and from the ATM subnetwork 2106 are communicated between the PVC controller 2248 and the level 1 gateway 2108.

The PVC controller 2248 stores data tables defining all possible virtual circuits through the ATM switch network. These data tables define the header information and the particular input port and output port used to route broadband and signaling cells between each interactive multimedia (IMTV) service VIP and an access point on the access subnetwork. The data tables thus define "permanent virtual circuits" (PVC's) between the providers and the ports of the access subnetwork. The data tables within the PVC controller also define various dedicated circuits for communications between various controllers of the network and/or to the VIP's equipment. The tables in the PVC controller 2248 include current availability data for VPI/VCI values and an ongoing record of which VPI/VCI values are in use. Thus, at any given time the PVC controller 2254 knows what VIP/VCI values are available to and can be assigned dynamically to provide requested bandwidth for each new IMTV session.

The ATM backbone subnetwork 2106 also comprises a plurality of unidirectional SONET multiplexers 2254. Although only four (4) SONET multiplexers 2254 are shown in FIG. 9. It should be understood that all connections to and from the ATM switch 2252 are preferably at a transmission rate of OC-3 or OC-48.

According to the preferred embodiment, the ATM switch 2252 routes all ATM streams on the basis of the VPI/VCI of the cell streams. The ATM stream virtual path is controlled by the PVC controller 2248, which provides switching control instructions to the ATM switch 2252 to set up the virtual paths in the ATM switch 2252 from the source to the destination in response to assignments from the level 1 gateway 2108. In addition, each VNH 2104 and LVAN 2112 is assigned a predetermined virtual path for communication with the video data control center 2110, thereby relieving management requirements by the PVC controller 2248. Upstream signaling traffic from a VIU to the level 1 gateway 2108 or the video data control center 2110 is routed along dedicated virtual paths.

The Access Subnetwork Controller 2240 controls all routing of broadband and narrowband data throughout the access subnetwork in response to bandwidth requirements supplied from the level 1 gateway 2108. For example, in the case of an IMTV session, the level 1 gateway identifies the ports, the VPI/VCI values and the bandwidth for both the broadband data and the upstream signaling transmission to the PVC controller 2248, and that controller instructs the respective ATM switch(es) to route cells between the ports and translate originating VPI/VCI values into terminating VPI/VCI values.

The VIU will access the level 1 gateway 2108 in order to initiate an IMTV session with an IMTV VIP 2260. As shown in FIG. 9, the system of the IMTV VIP 2260 includes a Level 2 gateway 2262 for communication with the level 1 gateway 2108 via the ATM backbone subnetwork 2106 and with the DET 2218, and an IMTV server 2264 for outputting broadband video data in ATM streams to the ATM backbone subnetwork 2106.

During the communication session between the subscriber and the IMTV VIP 2260, the DET 2218 can transmit control signalling upstream through the ATM subnetwork 2106 to the level 2 gateway IMTV VIP 2260. The level 2 gateway IMTV VIP 2260 can also send signaling information, such as control data and text/graphics, downstream through the same path to the DET or as in-band data included within the broadband output stream from the server 2264. For downstream transmission, the server 2264 will provide ATM cells with an appropriate header. The ATM switch 2252 will route the cells using the header and transmit those cells to the APD 2134 serving the requesting subscriber 2236 for conversion to MPEG format. In the presently preferred embodiment, the downstream signaling from the VIP is included as user data (in-band) as part of the broadband MPEG packet stream transmitted to the DET from the server 2264.

Certain VPI/VCI values would be assigned and available to each IMTV VIP, and other VPI/VCI values would be assigned to the access subnetwork. For each session, the Access Subnetwork Controller would pick the port and VPI/VCI value for entry into the access subnetwork, and the VIP would pick the output port and the VPI/VCI value to be output by its equipment. The level 1 gateway supplies both port identifiers and the two end point VPI/VCI values as terminating and originating information to the PVC controller as part of the request for connection through the backbone subnetwork 2106. The PVC controller 2248 assigns VPI/VCI values within the ATM subnetwork.

Each physical port of the ATM subnetwork 2106 will have more than one VPI/VCI assigned to cells passing through that port. The PVC controller 2248 stores data corresponding to each port that indicates the VPI/VCI values in use for each connection ID. When the level 1 gateway 2108 requests a connection through the ATM subnetwork 2106, the PVC controller 2248 accesses its data tables to determine if the requisite bandwidth is available between the two identified ports. If not, the PVC controller 2248 returns a negative acknowledgement message indicating the reason for the inability to complete the requested connection. If the bandwidth is available, the PVC controller 2248 provides appropriate instructions to the switch or switches which will establish the link and provides a confirmation reply message to the level 1 gateway 2108 when the link through the ATM subnetwork 2106 is complete.

Access Subnetwork Controller Communications

As outlined in the above discussion of the preferred network architecture, the Access Subnetwork Controller 2240 will receive requests from and provide various reports to the level 1 gateway 2108. The Access Subnetwork Controller 2240 also communicates with various elements of the access subnetwork, e.g. the ACC 4000 2242, the APDs 2134, 2174, etc. As shown in FIG. 5, the ATM subnetwork 2106 provides a connection to an Operations and Support System (OSS) 2109. The Access Subnetwork Controller will communicate with the OSS 2109 for a variety of provisioning functions. To facilitate understanding of the inventive Access Subnetwork Controller in the context of the preferred network architecture, the following discussion provides a detailed explanation of the types of signaling and communications that the Access Subnetwork Controller exchanges with these other network elements.

The OSS 2109 provides provisioning information regarding channels of the access subnetwork to the Access Subnetwork Controller 2240, at least during initial setup of the access subnetwork. For example, in the preferred network architecture, the OSS 2109 identifies the output ports of each APD and the modulator fed by each output and thereby the RF channel that will carry each digital output stream through the RF broadcast portion of the access subnetwork.

The Access Subnetwork Controller 2240 monitors operations of all elements within the access subnetwork and will provide status reports and alarm messages regarding detected faults to the OSS 2109.

As noted above, the Access Subnetwork Controller 2240 also communicates with the level 1 gateway 2108. The level 1 gateway 2108 transmits requests to establish and tear down connections to the Access Subnetwork Controller 2240. Such requests may relate to IMTV connections, to making certain broadcast services available to a particular VIU, defining pay-per-view events and activating pay-per-view events for VIUs who have purchased particular events, etc. In general, connection and tear down requests identify the DET and bandwidth or throughput in both directions. In the presently preferred embodiment, the DET identifier will take the form of an E.164 address.

Requests relating to broadcast services will include a channel identifier and may under some circumstances include VPI/VCI information. As discussed in more detail below, the level 1 gateway 2108 will request that the Access Subnetwork Controller 'establish a connection' to the DET 2218 for each broadcast channel to which the VIU has subscribed. These 'connections' for broadcast channels make those channels available by enabling the DET to process each channel. Once the access subnetwork establishes such a broadcast availability connection, the VIU can view each channel simply by selecting that channel through the DET 2218, unless and until the level 1 gateway 2108 instructs the Access Subnetwork Controller 2240 to tear down the particular broadcast connection.

The level 1 gateway 2108 issues requests relating to broadcast services to the Access Subnetwork Controller 2240 only infrequently, i.e. when a VIU subscribes to a new broadcast service or when removing a broadcast service from availability to a particular VIU (e.g. a VIU that no longer subscribes to broadcast services of a specified VIP or that has not based bills for VDT services or services of the specified broadcast VIP).

Requests relating to IMTV service will include a connection identifier, VIU identifier and bandwidth. Unlike requests relating to broadcast services, the level 1 gateway 2108 frequently issues requests relating to IMTV services to the Access Subnetwork Controller 2240, i.e. whenever a VIU requests an IMTV session.

Requests defining a broadcast pay-per-view event include an event identifier, start time, end time, channel and preview duration. Connection requests relating to activation of a purchased event for a particular VIU identify the DET and the event.

When the Access Subnetwork Controller 2240 receives a connection establishment request from the level 1 gateway 2108, the access subnetwork 2240 transmits certain information back to that gateway that other elements of the network need in order to set-up the end to end connection. For a broadcast channel to which the VIU subscribes, the DET needs a connection block descriptor for that channel. The connection block descriptor includes the network logical channel number and the RF channel carrying the particular program. For digital services, the connection block descriptor will also include one or more PID values (preferably the PID value for the respective program map) that the DET needs in order to capture and begin processing MPEG-2 packets relating to the particular program.

In the preferred embodiment, the Access Subnetwork Controller administers the connection block descriptors and the VPI/VCI values available on each port of the access subnetwork.

When the Access Subnetwork Controller 2240 receives a connection establishment request for an IMTV session, the Access Subnetwork Controller first identifies an APD 2174 having available bandwidth capable of supporting the requested session. The Access Subnetwork Controller 2240 provides the port ID and an available one of the VPI/VCI values assigned to that APD 2174 to the level 1 gateway 2108. As noted above, in the preferred embodiment, the level 1 gateway 2108 forwards the port identifier for the APD 2174 and the assigned VPI/VCI value to the PVC controller 2248.

Figure 14A:
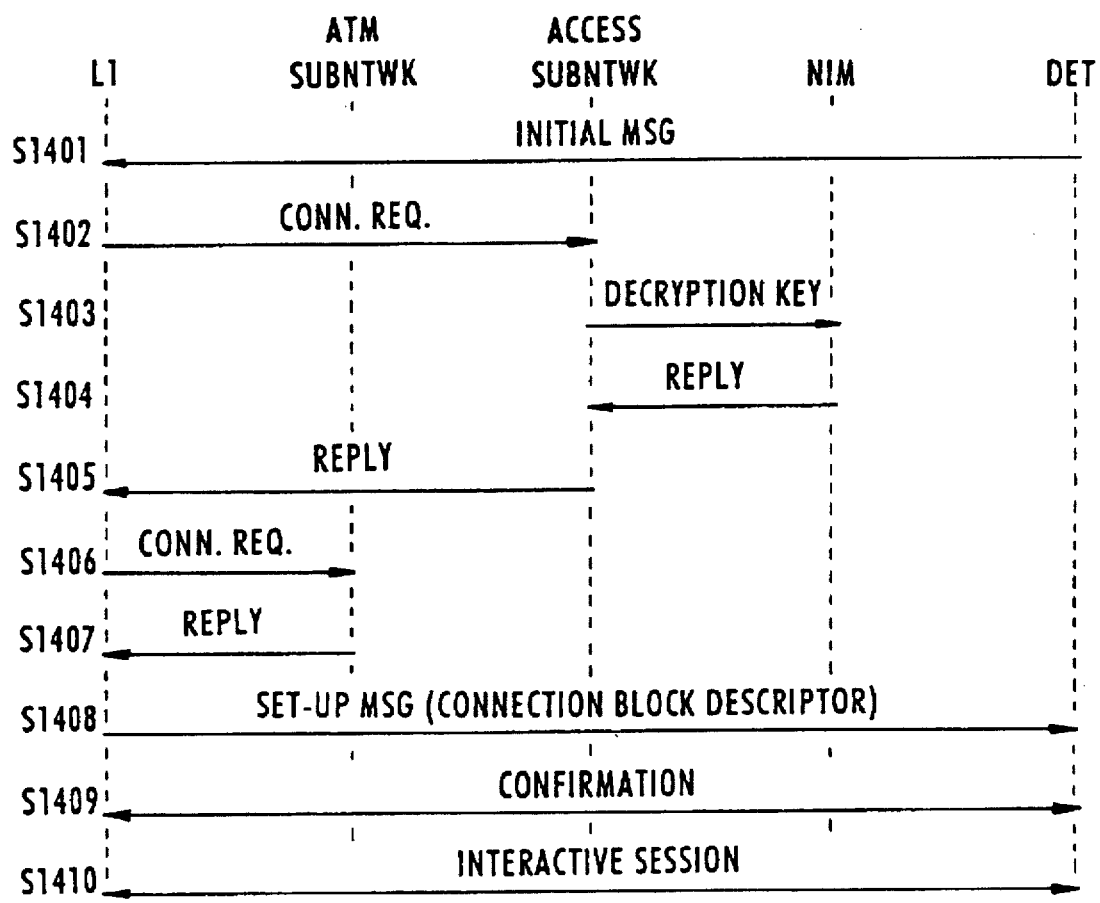
FIGS. 14A and 14B illustrate, in simplified form, the flow of messages between various components of the network of FIGS. 5–9 during establishment of an interactive broadband communication session with an IMTV VIP.
Figure 14B:
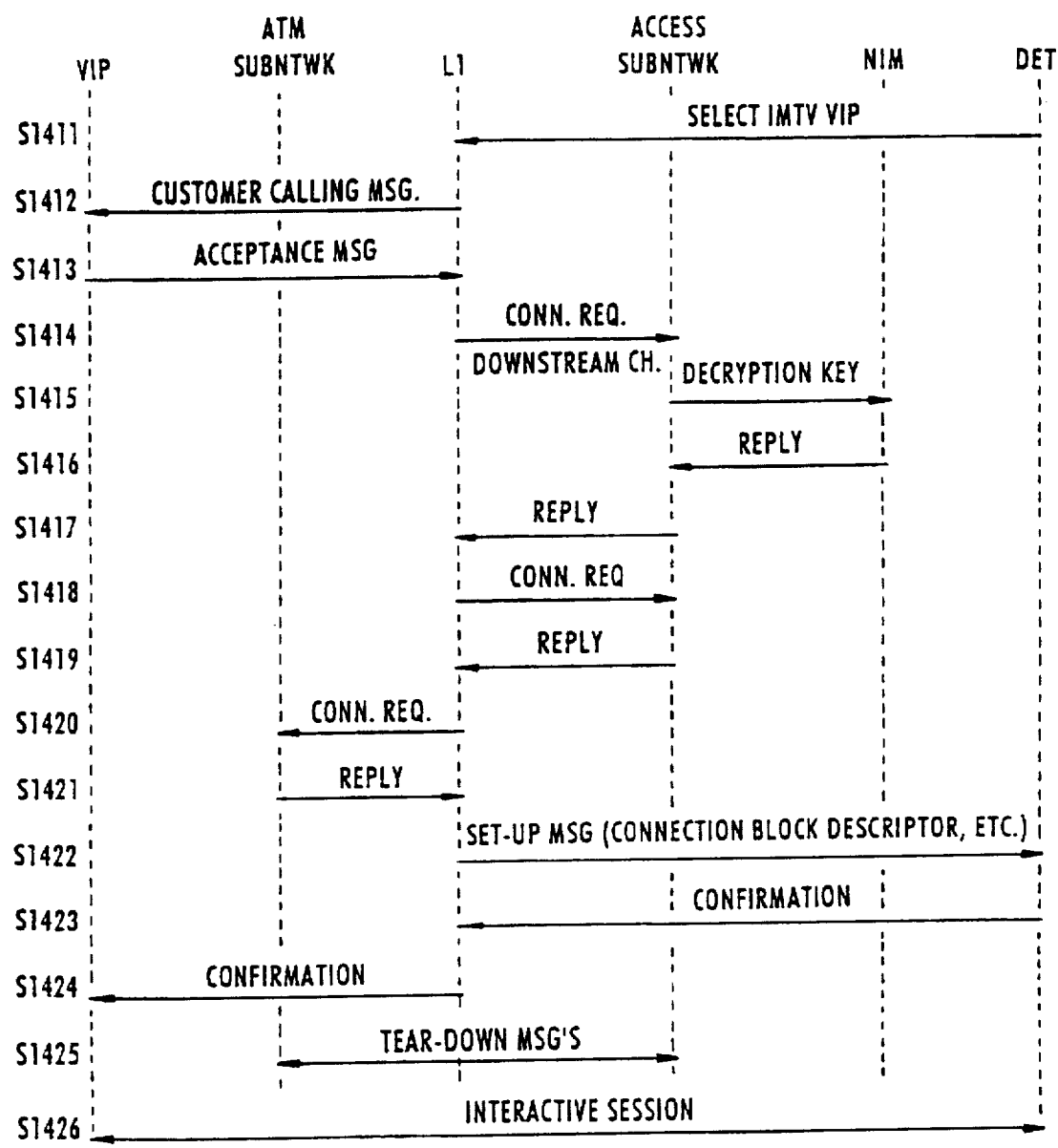

The APD 2174 is preprogrammed by the Access Subnetwork Controller 2240 to map ATM cells having the VPI/VCI value into MPEG packets having particular PID values and supply those packets through a specific one of its output rails for RF transmission on a particular channel. The Access Subnetwork Controller 2240 therefore knows the connection block descriptor corresponding to the bandwidth it assigned to the requested IMTV session. The Access Subnetwork Controller 2240 supplies that connection block descriptor back to the level 1 gateway 2108, and that gateway forwards the connection block descriptor to the DET 2218 to permit tuning to the correct RF channel and capturing and processing of MPEG packets from that RF channel. The discussion of FIGS. 14A and 14B provides a more detailed explanation of the full process flow for establishing an IMTV session.

The level 1 gateway 2108 could store the connection block descriptors for all broadcast services. However, in the preferred implementation, the Access Subnetwork Controller 2240 administers the connection block descriptors for broadcast services in a manner similar to that done for IMTV connection, albeit on a more static basis than for IMTV. When the Access Subnetwork Controller 2240 receives a connection establishment request for a broadcast channel from the level 1 gateway 2108, the access subnetwork 2240 knows the applicable connection block descriptor for that channel. The access subnetwork 2240 transmits that connection block descriptor back to the level 1 gateway 2108. The level 1 gateway 2108 in turn forwards the connection block descriptor to the DET 2218.

In response to a connection request (establishment or tear down), the Access Subnetwork Controller 2240 provides appropriate instructions to the elements of the access subnetwork needed to perform the connection function. For example, for an IMTV session, the access subnetwork may instruct the APD 2174 to map cells having a specified VPI/VCI into MPEG packets having specified PID values and output those packets on a specified one of its five output rails, to thereby place the packets in a particular RF channel.

For a pay-per-view event, the Access Subnetwork Controller provides the event definition information to the ACC 4000 2242. The ACC 4000 in turn instructs the APD 2134 to encrypt the program using a specific key at a specific start time. The Access Subnetwork Controller identifies the DETs 2218 of VIUs who purchase the event, and the ACC 4000 2242 provides the decryption key needed to decode the program to the NIMs 2216 associated with those DETs 2218, at the appropriate times. At the end of an event, the ACC 4000 instructs the APD 2134 to change the encryption key, thereby terminating decryption by those DETs having a now obsolete decryption key.

In normal operation, the level 1 gateway 2108 requests establishment or tear down of specific IMTV connections through the access subnetwork. When the elements of the access subnetwork perform the requested connection function, reports thereof are provided to the Access Subnetwork Controller 2240. The Access Subnetwork Controller 2240 in turn provides confirmation to the level 1 gateway 2108. The level 1 gateway 2108 will time the period for confirmations, and if an expected confirmation is not received in the expected time period, the level 1 gateway recognizes a fault in the access subnetwork. If necessary resources are not available when the level 1 gateway 2108 requests a connection, the Access Subnetwork Controller 2240 will so inform the level 1 gateway.

The level 1 gateway 2108 can request audit or status information from the Access Subnetwork Controller 2240. In response, the Access Subnetwork Controller 2240 can supply the level 1 gateway 2108 with audit or status information relating to the condition of various channels and sessions through the access subnetwork. The Access Subnetwork Controller 2248 will also provide the level 1 gateway 2108 will alarm or failure reports relating to specification connections through the access subnetwork.

The Access Subnetwork Controller also communicates with various elements of the access subnetwork. For example, the Access Subnetwork Controller 2240 transmits instructions to the ACC 4000 2242, and if the instructions are successfully carried out, receives confirmations back from the ACC 4000. These instructions and reports may relate to encryption functions of the APDs for new broadcast services, new pay-per-view events and channels allocated to IMTV. These instructions and reports may also relate to activation of decryption functions within the NIM 2216 to enable reception of specific services. As another example, the Access Subnetwork Controller 2240 also communicates with the various APDs in the access subnetwork, i.e. to provide instructions as to mapping MPEG PID values as a function of the VPI/VCI values in incoming cells and to route resultant MPEG packets to the correct output ports of the APDs. The Access Subnetwork Controller 2240 also communicates with the network controllers (NCs) 2194 to establish upstream signaling channels, e.g. default channels and dynamically assigned wider bandwidth signaling channels for interactive sessions.

Process Flows in the Most Preferred Network

Figure 10:
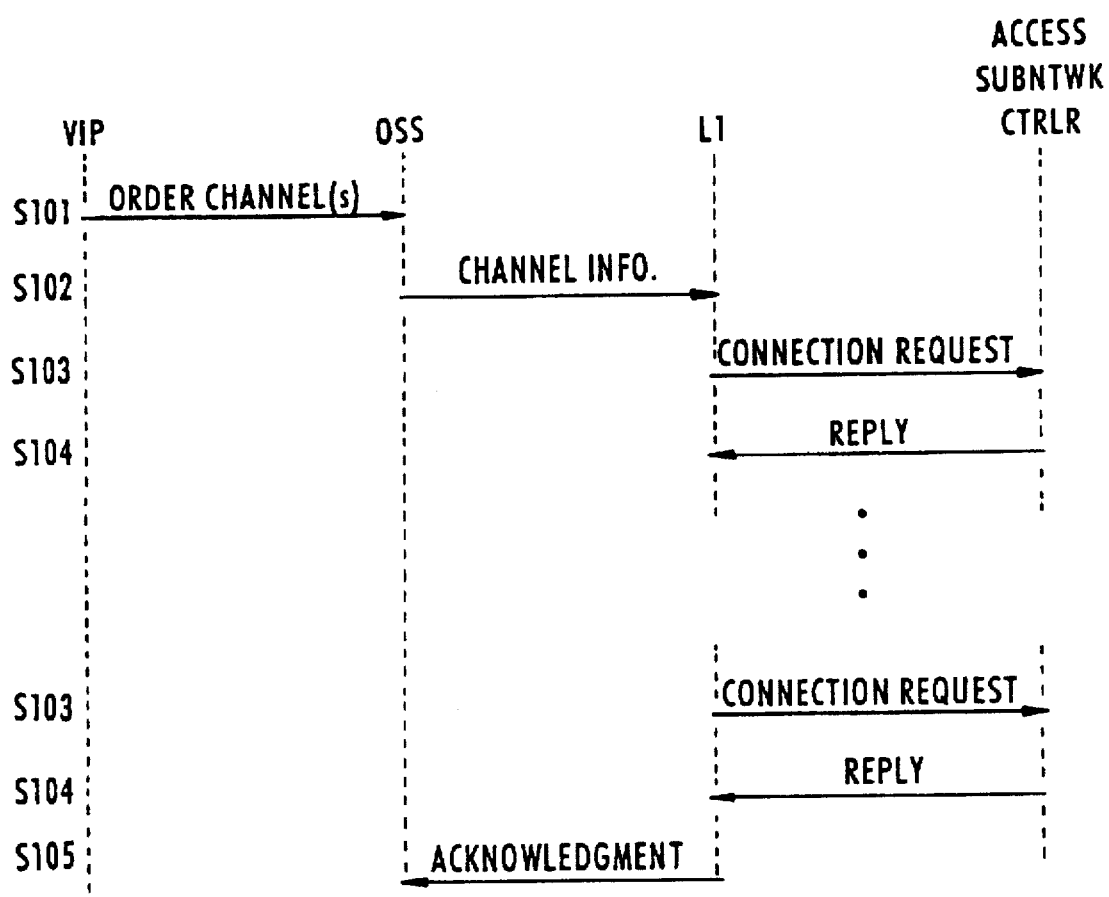
FIG. 10 illustrates, in simplified form, the flow of messages between various components of the network of FIGS. 5-9 during provisioning of broadcast channels.

The level 1 gateway controls initial establishment of services, e.g. provisioning, for new broadcast services offered by the broadcast VIPs and for activation of service to individual subscriber VIUs. Provisioning of a new broadcast service will be considered first. FIG. 10 depicts a simplified flow of messages between various components of the enhanced video dial tone network during provisioning of broadcast channels.

When a new VIP wants to offer broadcast services through the enhanced video dial tone network or an existing VIP wants to add additional channels to the VIP's services broadcast through the network, the VIP places an order for a number of channels with the OSS 2109 (step S101). OSS personnel will go into the field and make any necessary new physical connections of the VIP's equipment into the network and provision the ATM edge mux 2120 to which the VIP will supply the new channels. OSS personnel provision the edge mux, either manually or preferably through a communication link from the OSS 2109 through the ATM backbone subnetwork 2106.

OSS personnel will also negotiate with the VIP to determine the VPI/VCI values (originating) that the VIP's equipment will use in the cells of the new channels. The OSS personnel input various information into the ATM edge mux 2120, such as maximum bandwidth (data rate) and incoming VPI/VCI value for each new channel, to permit the edge mux to perform its policing and grooming functions.

The OSS system 2109 also will provide relevant provisioning information to the level 1 gateway 2108 (step S102). The provisioning information transmitted to the level 1 gateway 2108 includes a VIP ID and the number of channels as well as a channel ID and network input port ID (at the Broadcast Consolidation Section (BCS) 2100) for each channel. The information will also specify the type of service on each channel, i.e. whether the service is analog, digital broadcast, digital pay-per-view, enhanced pay-per-view, etc. The VIP also specifies the desired maximum bandwidth for each new channel ordered, and the OSS 2109 relays that information to the level 1 gateway 2108. The level 1 gateway stores the information in a table in memory.

The level 1 gateway 2108 now sends a connection request to the Access Subnetwork Controller 2240 via a signaling channel through the ATM backbone subnetwork 2106 (step S103). This connection request instructs the Access Subnetwork Controller 2240 to activate the broadcast service throughout the access subnetwork. The information in the request message includes the VIP ID as well as the channel ID, the input port ID, the service type (analog or digital) and the maximum bandwidth for one new channel. For convenience, further discussion here will concentrate on activation of a digital broadcast service.

When the Access Subnetwork Controller 2240 receives a digital broadcast channel connection establishment request from the level 1 gateway 2108, the access subnetwork 2240 identifies an APD 2134 having available bandwidth capable of supporting the requested channel, in each of the video network hubs 2104 and assigns a VPI/VCI (terminating) corresponding to the available bandwidth to the newly requested channel, as discussed in more detail below. The Access Subnetwork Controller 2240 transmits a reply message back to the level 1 gateway 2108 which includes at least the assigned VPI/VCI value (step S104).

The APDs 2134 in the video network hubs 2104 are essentially duplicates of each other and have commonly assigned VPI/VCI values for the channels that they are to broadcast to the respective local video access node offices 2112. The APDs 2134 in the video network hubs 2104 are wired in the same manner to QAM modulators 2150 so that in each video network hub 2104, the APDs 2134 and modulators 2150 output each particular broadcast program channel on the same RF channel. The Access Subnetwork Controller 2240 also instructs the corresponding APDs 2134 in all of the hubs 2104 to map assigned VPI/VCI values into the same MPEG PID values.

The ATM routing functions around the broadcast ring are preprovisioned during network creation. In an initial implementation wherein all broadcast programs are to be broadcast throughout the network serving area, the ATM routing functions around the broadcast ring are preprovisioned so that cells having VPI/VCI values in certain ranges always go to certain ones of the APDs. In future, some broadcast VIPs may not want to distribute their broadcast programming to the entire area served by the network. In that case, at least some VPI/VCI values used on the broadcast ring would be uniquely assigned to APDs in the respective video network hubs or to a subset of less than all of the hubs. As a result, a program using such VPI/VCI value would go only to the APD in each hub to which it was assigned, and the hub(s) would broadcast the program only to a portion of the access subnetwork.

Returning to the initial implementation wherein all digital broadcast signals are broadcast throughout the network, the SONET drop and continue multiplexers 2130 are programmed to drop a copy of cells having a specified VPI/VCI value to the corresponding one of the APDs 2134 in each respective video network hubs 2104. The VPI/VCI values assigned to each APD 2174 therefore are resources managed by the Access Subnetwork Controller 2240. By assigning one VPI/VCI to a newly requested program channel, the Access Subnetwork Controller 2240 assigns the channel to a particular APD 2134 in each video network hub office 2104, and assigns the broadcasts of that program to an identified RF channel and PID values.

For example, in response to a request for connection of the VIP's broadcast service identified as network logical channel 1, the Access Subnetwork Controller might assign a VPI/VCI of 1001/001. Assume now for discussion purposes that the VPI of 1001 identifies the first APD 2134 in each video network hub 2104. The SONET mux 2130 in each video network hub office 2104 therefore supplies a copy of each cell containing the VPI/VCI value of 1001/001 to the first APD 2134 in that respective office. The first APD 2134 in each hub 2104 in turn is programmed to output the reconstructed MPEG packets from the ATM cells on a specified one of its output ports and to include specified PID values in those packets.

Continuing the example, assume for simplicity that the program consists only of audio and video. The Access Subnetwork Controller 2240 might program the first APD 2134 in each hub office 2104 to map the cells containing the VPI/VCI value of 1001/001 into MPEG packets containing three PID values of (001, 007 and 010) and output those packets on the first output port of that APD (additional PID values may be provided for user data, secondary audio, etc.). In the simplified audio/video only example, the APD 2134 would construct a program map indicating that the PID values 007 and 010 identify video and audio packets, respectively, for the program and would insert that new program map in the output packets containing PID 001. The Access Subnetwork Controller knows the RF channel frequency of the QAM modulator 2150 connected to that output port, and that frequency is the same for all of the video network hub offices 2104. For example, the RF channel might correspond to CATV standard television channel 42. The Access Subnetwork Controller 2240 stores tables of connection block descriptors for all channels in the access subnetwork. In the example, the newly established connection block descriptor would identify network logical channel 1, RF channel 42 and PID value 001.

The reply to the level 1 gateway (S104) in response to the connection request for logical network channel 1 would include at least the VPI/VCI of 1001/001. If the level 1 gateway 2108 stores tables of connection block descriptors, the reply message from the Access Subnetwork Controller 2240 (step S104) would also include the connection block descriptor for that channel. In the example, the connection block descriptor would identify network logical channel 1, RF channel 42 and PID value 001. In the preferred embodiment discussed later, the Access Subnetwork Controller 2240 supplies connection block descriptors to the level 1 gateway 2108 as part of a procedure for activating specific channel services for a VIU.

The connection request and reply procedure (steps S103, S104) between the level 1 gateway 2108 and the Access Subnetwork Controller 2240 is repeated for each new broadcast channel ordered by the VIP in step S101. The level 1 gateway 2108 in turn provides one or more acknowledgement messages back to the OSS (step S105). For each channel, the acknowledgement identifies the VIP, the channel, the input port, and the VPI/VCI value. OSS personnel use this information to complete the provisioning of the edge mux 2120 for processing of the new channels. Specifically, for each channel, the edge mux 2120 is programmed to translate the originating VPI/VCI value of the cells input from the VIP's equipment into the assigned terminating VPI/VCI value for routing the cells through the broadcast ring to the input port of the correct APDs 2174 as assigned by the Access Subnetwork Controller 2240.

The above discussion of provisioning the edge mux 2120 assumes that the OSS personnel program that unit. This may be a perfectly adequate approach because the relevant programming of the edge mux remains relatively static. There would be no need to change this information unless the VIP changed his arrangement with the network regarding the particular channel, e.g. to upgrade to a higher bandwidth. However, to further automate the broadcast channel activation procedure, the Access Subnetwork Controller 2240 could communicate with the edge mux 2120 through a virtual circuit through the ATM backbone subnetwork 2106 to provide at least the terminating VPI/VCI data directly to that mux.

In future implementations, the Access Subnetwork Controller 2240 may assume full control over the ATM edge mux 2120 in the broadcast consolidation point 2100, as broadcast service processing by that unit becomes more dynamic. For example, the Access Subnetwork Controller 2240 could control the ATM edge mux 2120 to insert advertisements into broadcast programs, to allow two different programs to use the same digital broadcast channel at different times of the day or week or to switch digital broadcast services over to an emergency alert broadcast.

A procedure similar to that shown in FIG. 10 can be used to provision analog channels. In the preferred embodiment, however, the analog channels are broadcast on the bottom 40 RF channels. Rather than administer the port ID's, RF channels and connection block descriptors for these channels through the Access Subnetwork Controller 2248, the OSS 2109 can supply the relevant information to the level 1 gateway 2108 for storage during initial set-up of the network.

In the above discussion, the Access Subnetwork Controller 2240 assigned one digital broadcast program into a single channel (RF channel and PID value) for broadcast throughout the entire network controlled by that controller 2240. In a broadcast network serving a particularly large area, there will be more than one Access Subnetwork Controller 2240. Each Access Subnetwork Controller 2240 will control a number of video network hubs 2104 and the subtending local video access nodes 2112. The Access Subnetwork Controllers 2240 serving different areas may arbitrarily assign one digital program into different channels in their respective areas. Alternatively, the Access Subnetwork Controllers 2240 may be programmed to coordinate channel assignments, so that one program channel appears on the same channel (RF channel and PID value) throughout the network.

In the preferred implementation, a broadcast VIP will have a signaling connection into the network. Accordingly, when a broadcast VIP 2114 first establishes a presence on the video dial tone network, the level 1 gateway will transmit a request to the PVC controller 2248 requesting the signaling connection through the ATM backbone subnetwork 2106. In the preferred embodiment, this signaling connection establishes a permanent virtual circuit connection between the VIP's equipment and the level 1 gateway 2108, for example, to allow the VIP to input information regarding upcoming pay-per-view events.

In the preferred embodiment, the level 1 gateway 2108 will not accumulate usage statistics relating to broadcast services. The network operator will bill on a flat fee basis for broadcast services. The network operator may bill the broadcast VIPs, in which case, those VIPs pass on the charges to their subscribers. Alternatively, the network operations company and the VIP may agree that the network operator should develop a combined bill for network charges and VIP charges. In this later case, the network operations company would send out the combined bills, collect payments, and divide the revenue between the network operating company and the VIP.

The broadcast link for a particular channel through to the port(s) on the video network hubs provisioned in the procedure of FIG. 10 is identified as a broadcast 'stub'. At this point, the broadcast channel is available to the access subnetwork, but the access subnetwork has not yet provided a connection to make the broadcast channel available to any VIUs.

Once the stub is provisioned, a VIU can subscribe to the broadcast program. In general, an order comes to the level 1 gateway, and the level 1 gateway sends an instruction to the Access Subnetwork Controller to add the subscriber connection to that stub, i.e. to enable reception of the broadcast program through the VIUs terminal device. In RF an broadcast implementation such as shown in FIG. 4 and in FIGS. 5–9, the connection through the broadcast network already exists, except for the enablement of reception through the NIM. In a digital star type access subnetwork, such as that of FIG. 3, the connection to the customer premises may not yet exist. To the level 1 gateway, however, the signaling and results appear the same. The gateway requests a connection of a broadcast service to a DET, the Access Subnetwork Controller instructs one or more elements of the access subnetwork to make the connection, and the Access Subnetwork Controller provides a confirmation reply message back to the gateway when the connection has been established.

Figure 11:
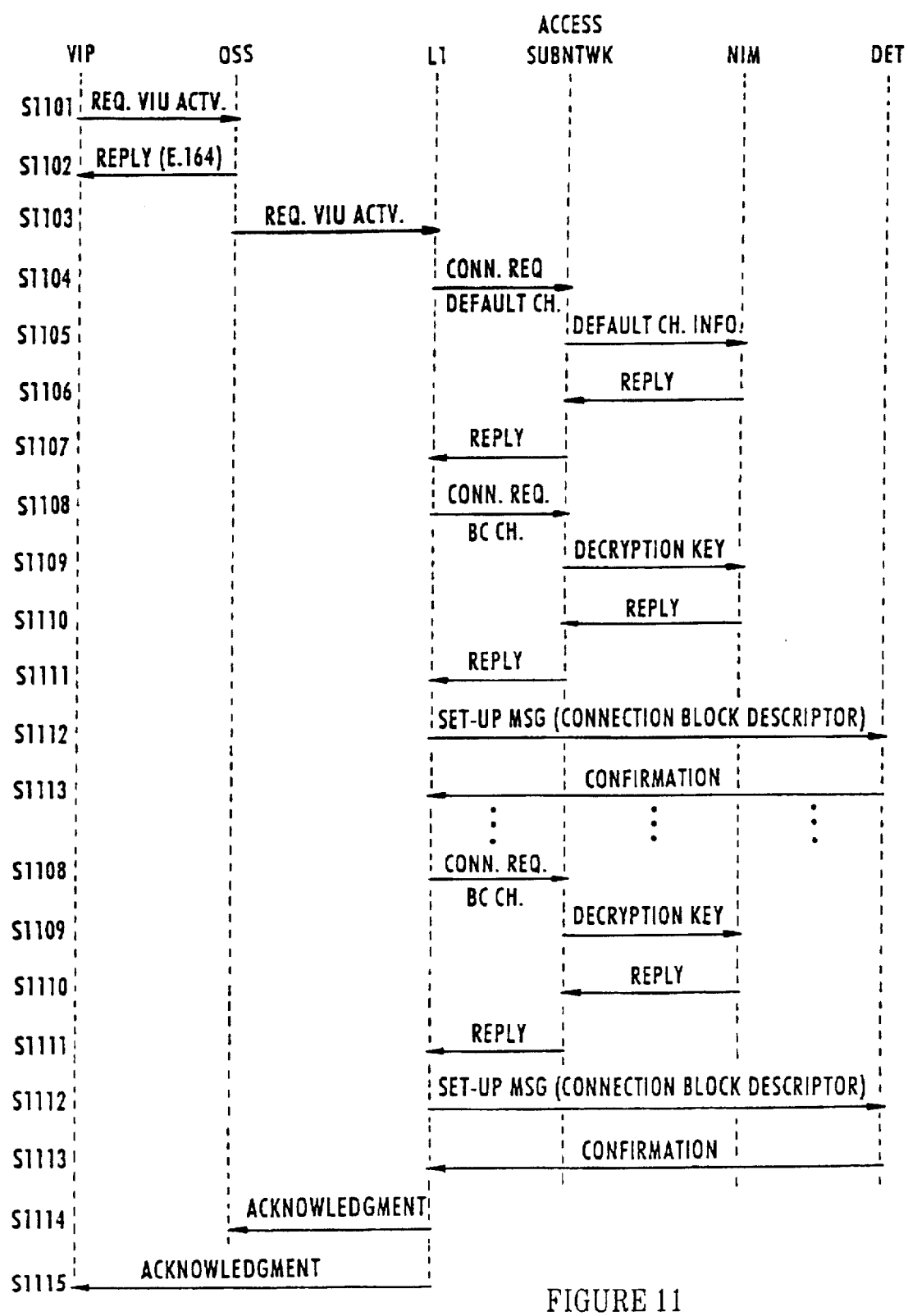
FIG. 11 illustrates, in simplified form, the flow of messages between various components of the network of FIGS. 5-9 during activation of broadcast services to a new video information user.

FIG. 11 depicts an exemplary activation procedure for activating a new customer, specifically on the network of FIGS. 5–9. As discussed in detail below, this activation procedure involves a variety of initialization functions, including activation of default signaling channels. The activation procedure also involves activation or 'connection' of the subscriber's terminal devices to broadcast program channels for the services to which the new customer has subscribed.

When a party requests activation of a new customer (typically requested by a VIP selling video services to new subscribers or a contractor selling DET's to consumers), that party submits a request message. If requested by the VIP, the VIP may send the activation request to the network company's operations support system (OSS) 2109 which in turn forwards the request to the level 1 gateway. Alternatively, the VIP may request VIU activation over the direct signaling link to the level 1 gateway 2108. For subscribers already active on the network, they may request modifications or upgrades in services, e.g. to add broadcast services of another available VIP, by a direct interaction through the network with the OSS 2109 or with an application running within the level 1 gateway 2108.

For simplicity of discussion and illustration in the flow diagram of FIG. 11, it is assumed that the VIP transmits the request for activation to the OSS 2109 (step S1101). The VIU activation request includes a variety of customer related information, as well as the number of DET's this customer is purchasing. The request also identifies the party requesting the activation, in the present example, the VIP. The OSS 2109 will assign and return an E.164 address for each DET 2218 to the party requesting activation (step S1102). The party activating the DET's will enter the respective E.164 address into each DET, using the remote control, the television display and an initialization routine programmed into the DET. The entered E.164 is thereafter considered the DET's global ID.

As discussed above with respect to FIG. 8, each DET will connect into a fiber node 2202 serving up to 500 homes. One Access Subnetwork Controller 2240 as shown in FIG. 9 will control a number of such fiber nodes 2202 through the respective LVANs 2112. For each DET 2218 of the new customer, the OSS 2109 will transmit a message to the level 1 gateway 2108 (step S1103). The message to the level 1 gateway 2108 identifies the DET 2218 by its E.164 address, identifies the VIP, identifies the broadcast channels to which the VIU has subscribed, and provides an identification of the fiber node 2202 serving the particular subscriber.

For each new DET 2218, the level 1 gateway 2108 sends a series of connection request messages to the Access Subnetwork Controller 2240 that will service the customer. For example, the first connection request might request establishment of a default signaling channel between the DET 221 and the level 1 gateway 2108. Subsequent connection requests would then relate to specific broadcast channels for broadcast VIP services to which the VIU has subscribed. Each activation request provides the Access Subnetwork Controller 2240 with necessary information for activating service, including the node ID for the new customer, the E.164 address of the particular DET 2218 and information identifying the specific type of channel requested (e.g. signaling, broadcast, etc.).

According to the preferred embodiment, each DET 2218 is assigned default RF channels for downstream signaling with the level 1 gateway 2108, the ACC-4000 2242, the elements of the local video access node 2112 and the Access Subnetwork Controller 2240, as well as for upstream signaling. Each QPSK mux 2178 broadcasts approximately 1.5 Mbits/s of signaling information downstream on a different assigned channel. The signaling data on each QPSK channel is encapsulated in MPEG-2 packets, therefore, within the downstream signaling channel, each DET assigned to that RF signaling channel also is assigned a PID value which effectively corresponds to the network address of the NIM. The main position of the DET 2218 may be assigned a separate PID value as discussed briefly above, but for simplicity of discussion here, it is assumed that the data within the MPEG packets on the default signaling channel will differentiate between NIM messages and DET messages.

The downstream default channel through the access subnetwork preferably provides each DET 16 kbits/s of signaling capacity within the 1.5 Mbits/s stream which is QPSK modulated by one of the QPSK modulators 2178 shown in FIG. 7 into a portion of the RF spectrum not used for broadband transmission. Also, the NIM 2216 of the DET 2218 includes a QPSK transmitter for sending signaling information upstream through the hybrid-fiber-coax loop distribution plant (FIG. 8) on an assigned channel outside the portion of the spectrum carrying the broadband transmissions to one of the network controllers (NCs) 2194. The upstream signaling channel is preferably 400 bits/s.

The default channels and corresponding default VPI/VCI values provide dedicated two-way signaling communications from the DET 2218 up as far as the level 1 gateway 2108. For example, the DET 2218 sends a message to the level 1 gateway by QPSK modulating the appropriate data in the upstream default channel. The network controller 2197 shown in FIG. 7 receives the message and passes the message to the ATM router 2196 which repacketizes the message as one or more ATM cells identified by the upstream default VPI/VCI value for communication with the level 1 gateway 2108. The ATM router 2196 sends the ATM cell(s) through the ATM subnetwork 2106 to the level 1 gateway 2108. For messages from that gateway intended for the particular DET, the level 1 gateway 2108 formulates an ATM cell containing the downstream message data. This cell uses the downstream default VPI/VCI value. The ATM switch routes this cell through the APD 2174 to the QPSK modulator 2178 in the local video access node 2112 serving this subscriber. The APD 2174 repacketizes the data from the ATM cell payload as an MPEG packet data message bearing the NIM network address PID, and the QPSK modulator 2178 transmits that message through the QPSK signaling channel for downstream default signal transport.

Although the order of the requests to the Access Subnetwork Controller 2240 could differ, assume now that the level 1 gateway 2108 first requests establishment of the default signaling channel (step S1104) and then sequentially requests activation of a series of broadcast channels. In this example, the first connection request that the level 1 gateway 2108 transmits to the Access Subnetwork Controller 2240 relates to the default signaling channel.

In response to the default signaling channel activation request from the level 1 gateway 2108, the Access Subnetwork Controller 2240 assigns default channels to each new DET. The Access Subnetwork Controller 2240 also assigns upstream and downstream port identifiers and VPI/VCI values for communications between the DET 2218 and the level 1 gateway 2108. The port identifier and the VPI for downstream signaling communications correspond to an input of one of the APDs 2174 in the local video access node 2112 serving the VIU. The port and VPI value for the upstream signaling correspond to the ATMrouter 2196 and one of the network controllers (NCs) 2194 in the local video access node 2112 serving the VIU.

The Access Subnetwork Controller 2240 will return one or more reply messages relating to each connection request from the level 1 gateway 2108. With regard to the default signaling channel, the Access Subnetwork Controller may return an immediate reply message not shown, containing the assigned port identifiers and VPI/VCI values. Alternatively, the Access Subnetwork Controller may return that information as part of the reply message (S1106) after it completes activation of the default channels through the NIM (S1105).

The virtual circuits throughthe ATM subnetwork 2106 for the default signaling channels, e.g. from the level 1 gateway 2108 to the OC-3c input port of one of the APDs 2174, all are preprovisioned as part of the network setup. The signaling channels are allocated to each DET 2218 as part of the DET activation routine. Hence it is sufficient to assign, VPI/VCI values and ports, from inventory, to the default channels to each DET. The level 1 gateway 2108 does not need to request channel set up through the ATM backbone subnetwork, as for other services such as the IMTV session set-up discussed below.

The NIM 2216 may be considered as part of the access subnetwork. When the Access Subnetwork Controller 2240 assigns the bandwidth for the default signaling channels, the controller 2240 executes a procedure to activate the default channels all the way through the access subnetwork to the NIM 2216 (step S1105). Specifically, the Access Subnetwork Controller 2240 gives the E.164 address and the QPSK values for the RF default channels to the ACC-4000 2242. The ACC-4000 2242 in turn assigns a NIM network address to the new DET 2218. The NIM network address is also correlated with the assigned upstream default channel bandwidth. In the presently preferred embodiment, the NIM network address corresponds to a PID value for MPEG packets carried on the assigned downstream QPSK modulated signaling channel, as noted above.

The ACC-4000 2242 formulates a packet containing the E.164 and the PID value. The ATM router 2244 encapsulates that packet in one or more ATM cells having the downstream default VPI/VCI value and transmits those cells through the ATM backbone subnetwork. In a manner similar to broadcast digital video information, the VPI value identifies an input port of an APD, in this case one of the APDs 2174 in the local video access node 2112 serving the subscriber. The ATMbackbone subnetwork 2106 outputs the cells on an OC-3c input port of the APD 2174 assigned to process signaling communications for the subscriber. The APD 2134 converts the payload data from the ATM cells into one or more MPEG packets and outputs those packets on the 1.5 Mbits/s (payload) rail going to the associated QPSK modulator 2178 for broadcast on the downstream default channel.

As part of the initialization routine noted above, the DET 2218 will generate an initialization menu for display on an associated television. As part of the resultant initialization procedure, the DET 2218 will prompt for and receive a keyed input of the assigned E.164 address. The main portion of the DET 2218 will transfer the E.164 address to memory in the NIM 2216. When the user or technician connects the NIM 2216 to the hybrid-fiber-coax distribution line, the new NIM 2216 will scan for and capture the broadcast transmission containing the E.164 address and the PID value corresponding to its assigned NIM network address. The NIM 2216 will also capture other relevant information, such as the channel assignments for the upstream and downstream default signaling channels.

After the NIM 2216 is initialized with the network address etc., the NIM 2216 transmits back an acknowledgement signal to the Access Subnetwork Controller 2240. The Access Subnetwork Controller 2240 in turn provides appropriate information to the various network nodes, e.g. the level 1 gateway 2108 and the ACC-4000 2242, indicating that the default channel to the DET 2218 is now activated throughthe access subnetwork (step S1107).

In the exemplary procedure illustrated in FIG. 11, the level 1 gateway sequentially requests broadcast channel connections, after completion of the procedure for establishing the default signaling channels. More specifically, the level 1 gateway 2108 transmits a connection request for a first broadcast channel to which the VIU has subscribed (step S1108). The connection request identifies the DET 2218 by its E.164 address and identifies the channel by its network logical channel number.

The Access Subnetwork Controller 2240 provides an instruction to the ACC-4000 2242, and in response, the ACC-4000 2242 sets up a communication with the NIM 2216 and downloads decryption key for the channel for storage in the NIM (step S1109). More specifically, the ACC-4000 2242 transmits a message to the NIM 2216 using the default channel and the PID value assigned as the NIM network address for the particular DET 2218. This message specifies at least the RF channel number and the decryption key needed to decode the particular RF channel. The NIM 2216 monitoring its default channel, recognizes its network address and captures the packet of message data for further processing. In the present case, the NIM 2216 responds to the message by adding the decryption key for the channel to its memory.

The NIM 2216 transmits back a confirmation message type reply (step S1110), and the ACC-4000 2242 so informs the Access Subnetwork Controller 2240. The Access Subnetwork Controller 2240 provides a reply message to the level 1 gateway 2108 indicating activation of the channel through to the NIM 2216 and provides the level 1 gateway 2108 with the connection block descriptor for the particular channel (step S1111). The level 1 gateway 2108 transmits a 'set-up' message containing the connection block descriptor to the main portion of the DET 2218 through the downstream default signaling channel (step S1112), and the main portion of the DET 2218 returns a confirmation message back through the upstream default signaling channel (step S1113). The level 1 gateway 2108 repeats the sequence of steps for activating a channel through the NIM and providing the connection block descriptor (steps S1108–S1113) for each of the channels to which the VIU has subscribed. As a result, the NIM 2216 will receive and store a table of decryption keys for the VIUs available channels, and the main portion of the DET 2218 will receive and store a default channel map.

The default channel map consists of connection block descriptors for the channels the subscriber is permitted to receive. Each connection block descriptor includes the logical network channel number used to identify and select the channel and the RF channel in which the channel transmission appear on coaxial cable drop into the subscribers premises. For digital broadcast services, the connection block descriptor also includes one or more PID values needed to capture and begin decoding MPEG packets containing program information for the specific service (from 27 Mbits/s streams containing four broadband programs and possibly some in-band signaling information). Preferably, the PID value identifies the program map packet for the particular channel.

At some point in the procedure, e.g. after confirmation of the last set-up request by the DET, the level 1 gateway 2108 provides an acknowledgement back to the OSS indicating that services have been activated to the particular VIU, for billing purposes (step S1114). The level 1 gateway 2108 also provides an acknowledgement back to the VIP (step S1115). Depending on the interface through which the VIP requested activation of the VIU, the acknowledgement may go back through the OSS 2109, or the acknowledgement may go directly through the signaling link through ATM backbone subnetwork from the level 1 gateway 2108 to the VIP's equipment 2114.

The level 1 gateway 2108 and the ACC-4000 2242 will update the data stored in the NIM/DET as necessary, e.g., if the subscriber changes the services to which she subscribes, if the encryption key changes or if connection block descriptors change because of movement of channels to other slots on the network.

For upgrades or additions to services provided to a VIU through a particular DET, the level 1 gateway 2108 receives a request for the service modification. The request may come directly from the DET 2218, from the OSS 2109 or from the broadcast VIP 2114. If from the DET, the level 1 gateway 2108 may ask for authorization from the broadcast VIP 2114. The level 1 gateway 2108 will initiate a series of connection requests to the Access Subnetwork Controller 2240 to make the newly requested channels available through the DET 2218, in a manner similar to steps S1108 through S1113 in FIG. 11.

When the subscriber selects a digital broadcast channel, the main portion of the DET 2218 accesses the connection block descriptor for that channel stored in the current version of the default channel map. The main portion of the DET 2218 supplies a 'connect' message to the NIM requesting that the NIM supply signals from the specified RF channel number to the main portion of the DET. In response to the RF channel number, the selected NIM 2216 tunes to the identified channel, and the NIM 2216 uses the decryption key from its memory to descramble the tuned RF signal. As a result, the NIM 2216 passes digital signals from the RF channel through the interface to the main portion of the DET 2218. In turn, the main portion of the DET 2218 uses the PID value from the connection block descriptor to begin MPEG decoding of the selected program. Thus, for broadcast services, the DET/NIM stores all necessary permission data and can begin reception and decoding in response to a selection by the user, without any upstream signaling to any other node of the network.

When activating broadcast channels to the VIU, the ACC 4000 2242 downloads the decryption key as described above if the program channel is a normal braadcast channel. However, if the broadcast channel in the procedure shoWn in FIG. 11 is a pay-per-view channel, that particular step is skipped. The DET receives the connection block descriptor in the usual manner, therefore the user can view free (un-encrypted) previews. The ACC 4000 2242 downloads one or more decryption keys for pay-per-view channels on an ass needed basis, to permit individual subscribers to view only purchased pay-per-view events, as discussed in more detail below with regard to FIG. 13.

Although not shown in FIG. 11, the level 1 gateway 2108 may signal the broadcast VIPs equipment 2114 for an authorization before activating broadcast channels for a particular VIU. For example, if a VIU is already active on the video dial tone network, the level 1 gateway 2108 may offer on-line service upgrade options, including the option to subscribe to additional VIPs' services. The user would first establish an interactive session with an appropriate software application running on the level 1 gateway 2108, in a manner discussed in more detail below. The user would then interact with the software application to select a new broadcast service, e.g. view option menus and select a particular package of broadcast services from a selected VIP. The level 1 gateway 2108 would execute the steps S1108 through S1113 to activate the relevant broadcast channels to the user's DET only after requesting and obtaining authorization to do so from the VIP 2114. The signaling for this authorization procedure could go through the OSS 2109, but preferably the signaling link through the ATM backbone subnetwork 2106 carries this communication for automatic real-time authorization.

There will be a flat rate monthly video dial tone charge for each VIU connected to the network. The network operations company may bill this charge directly to the VIU. Another option is for the network operations company to bill each VIU a flat monthly charge for each VIU connected to that VIP's broadcast services. In this later case, the VIP may choose to pay the video dial tone connect charge for their subscribers and absorb that expense as part of their own rate calculations. The network could also charge VIUs for the number of broadcast channels which the network has enabled them to receive. In response to the acknowledgement message from the level 1 gateway 2108 to the OSS 2109 when the network activates the various services, the billing systems within the OSS record appropriate code in the billing record for the VIP and the VIUs.

As discussed above, the network can bill the VIPs for the network charges, in which case, the VIPs bill the VIUs. Alternatively, the VIPs may provide billing information for their broadcast services to the OSS 2109, and the billing systems within the OSS combine that information with network billing related information to develop a combined bill to send to the VIU. In this case the network collects the bill payments and disburses an agreed amount to the VIPs. The preferred network implementation is flexible enough to allow different VIPs to select each alternative type of billing arrangement for their respective broadcast services.

Figure 12:
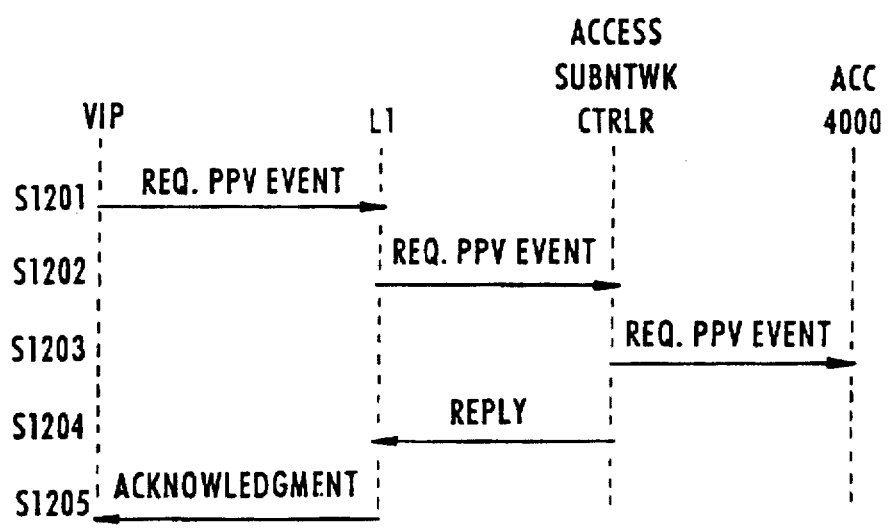
FIG. 12 illustrates, in simplified form, the flow of messages between various components of the network of FIGS. 5-9 during set-up of an upcoming pay-per-view event.

FIG. 12 is a simplified flow diagram illustrating the exchange of messages between various components of the network of FIGS. 5–9 during set-up of an upcoming pay-per-view event. As shown, the VIP 2114 transmits a request for the pay-per-view (PPV) event to the level 1 gateway 2108 (step S1201). The level 1 gateway 2108 can receive this request directly from the VIP's equipment via the signaling link through the ATM backbone subnetwork 2106. The request indicates the logical network channel on which the event will appear, the start time for the event, and either the event duration or the stop time of the event. The request may also specify one or more windows, for free previews and/or cancellation of purchase orders. Alternatively, the VIP may supply the information regarding the event to the OSS 2109, and then the OSS relays the relevant information in the necessary format to the level 1 gateway 2108.

The level 1 gateway 2108 assigns an event ID to the requested event. The level 1 gateway 2108 provides the event ID together with the information regarding the event to the Access Subnetwork Controller 2240 (step S1202), and the Access Subnetwork Controller 2240 in turn relays the request including the relevant information to the ACC 4000 (step S1203). The Access Subnetwork Controller 2240 provides a confirmatory reply message back to the level 1 gateway 2108 (step S1204), and the level 1 gateway 2108 provides an acknowledgement message back to the VIP 2114. The acknowledgement message sent to the VIP 2114 includes the event ID that the level 1 gateway 2108 assigned to the VIP's pay-per-view event.

At the time of the event specified in the VIP's request, the ACC-4000 transmits a new encryption key to the APD 2134 processing the signals for the network logical channel specified in the request. Only a NIM 2216 storing a corresponding decryption key can decode the event broadcast for display via the associated MPEG decoder in the DET 2218 and the associated television. As discussed below, the network will supply the necessary decryption key only to the NIMs for subscribers who have purchased the particular pay-per-view event. At the end of the event, the ACC 4000 2242 transmits a new encryption key to the APD 2134, effectively disabling reception through NIMs storing the old decryption key. The level 1 gateway of the present invention permits both advance ordering of pay-per-view events and impulse ordering at or about the actual start time of the event.

Figure 13:
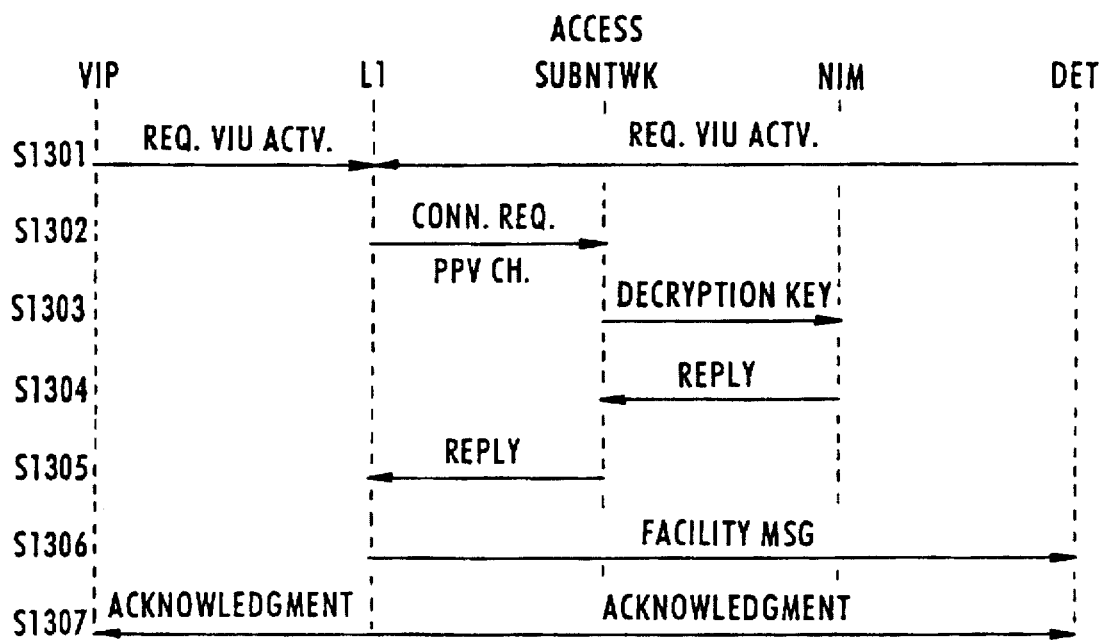
FIG. 13 illustrates, in simplified form, the flow of messages between various components of the network of FIGS. 5-9 during activation of pay-per-view event reception for a video information user who has purchased the event.

FIG. 13 is a simplified flow diagram illustrating the exchange of messages between various components of the network of FIGS. 5–9 during activation of pay-per-view event reception for a video information user (VIU) or subscriber who has purchased the event.

Subscribers will be able to order pay-per-view events in a number of different ways, and each VIP offering such services may elect to allow subscribers to use any one or more of the available ordering techniques, depending on how each VIP chooses to set up the VIP's pay-per-view services. The VIU may place an order with the VIP, either by a standard telephone call or during an interactive session through the video dial tone network. In these cases, the VIP will provide the order information to the level 1 gateway (step S1301), either directly through the ATM backbone subnetwork 2106 or through the OSS 2109.

Alternatively, the VIU may order pay-per-view events through an on-line interaction with the level 1 gateway 2108 (step S1301). The level 1 gateway 2108 provides menus through the DET 2218 and the associated television, and the user operates the remote control of the DET to transmit selection information (VIP and pay-per-view event) back to the level 1 gateway. Different VIPs 2114 will require different levels of security. For example, a first broadcast VIP may choose to pre-authorize pay-per-view purchasing by all VIUs who subscribe to that VIP's broadcast pay-per-view services. The level 1 gateway 2108 therefore would only need to check its internal database to determine if the current VIU subscribes to the pay-per-view services of the selected VIP. Alternatively, another VIP may require that the level 1 gateway 2108 signal the VIP's equipment 2114 to identify the VIU and the ordered event, so that the VIP can validate subscription and authorize or deny the purchase for each VIU purchasing the event. The level 1 gateway of the present invention can support a variety of other security scenarios, for example preauthorization for all of the VIP's subscriber's for events priced below a specified threshold value and validation of the VIU purchase by the VIP for events priced above the specified threshold value.

In each of the ordering techniques described above, the level 1 gateway receives a request message to activate the VIU for reception of the pay-per-view event (step S1301). The activation request identifies the VIU's DET, e.g. by its assigned E.164 address, and includes the event ID for the pay-per-view event that this VIU has purchased.

The level 1 gateway 2108 transmits a connection request, for connecting the pay-per-view event to the VIU who purchased the event, to the Access Subnetwork Controller 2240 (step S1302). This connection request identifies the DET 2218 by its E.164 address and includes the pay-per-view event ID number. The Access Subnetwork Controller 2240 instructs the ACC-4000 2242 to enable reception of the pay-per-view event. The instruction to the ACC-4000 2242 includes the pay-per-view event ID and an identifier of the DET (either the E.164 or the NIM network address assigned within the access subnetwork).

In response to the instruction, the ACC-4000 2242 sets up a communication with the NIM 2216 and downloads a decryption key for the channel for storage in the NIM (step S1303). More specifically, the ACC-4000 2242 transmits a message to the DET 2218 using the default channel and the PID value assigned as the NIM network address for the particular DET 2218. This message specifies start time, event duration and the decryption key needed to decode the selected event. The NIM 2216 monitoring its default channel, recognizes its network address and captures the packet of message data for further processing. In the present case, the NIM 2216 responds to the message by adding the decryption key for the program to its memory and stores the duration information.

The NIM 2216 may transmit back a confirmation message (step S1304), and the ACC-4000 2242 so informs the Access Subnetwork Controller 2240. The Access Subnetwork Controller 2240 provides a reply message to the level 1 gateway 2108 indicating activation of the reception of the ordered pay-per-view event through to the NIM 2216 (step S1305).

The reply message may provide the level 1 gateway 2108 with the connection block descriptor for the particular channel, in a manner similar to the activation of a broadcast channel discussed above. In the preferred embodiment, however, the connection block descriptors for pay-per-view channels are supplied to the DET 2218 as part of the activation routine. The ACC-4000 changes the encryption key for those channels frequently, i.e. at least for each new event. Accordingly, actual reception of a pay-per-view event on a particular channel requires only that the ACC-4000 download the decryption key for the particular event, as was done in step S1303.

In response to the reply message (step S1305), the level 1 gateway 2108 does transmit a message to the main portion of the DET 2218 through the downstream default signaling channel (step S1306). This message, termed a 'facility' message contains at least the event ID and the start time. The facility message may also include the current time and the end time or duration of the event. If the 'facility' message includes the current time, the DET 2218 uses that time value to reset its internal clock to the current value of the network time clock.

If the network has not already supplied the connection block descriptor, the 'facility' message would provide the connection block descriptor to the main portion of the DET 2218. The main portion of the DET 2218 stores the information from the 'facility' message in memory.

The level 1 gateway 2108 provides a confirmation message to the VIP (step S1307) indicating activation of reception of the particular event by the particular VIU, e.g. to allow the VIP to bill the VIU for the purchase of the event. If the VIU ordered the event via a direct interaction with the level 1 gateway 2108 (step S1301), the level 1 gateway will also transmit an acknowledgement message back through the DET 2218 to provide an acknowledgement display on the associated television (step S1308).

The level 1 gateway 2108 transmits a request for pay-per-view event connection to the Access Subnetwork Controller 2240, for each VIU who purchased an event (step S1302), essentially causing a repeat of steps S1302 through S1308 for each of those VIUs. At the time of the event, a user activates the DET 2218 to select viewing of the pay-per-view event. The main portion of the DET 2218 accesses the stored connection block descriptor for the channel carrying the event. The main portion of the DET 2218 supplies a 'connect' message to the NIM requesting that the NIM supply signals from the specified RF channel number to the main portion of the DET. In response to the RF channel number, the selected NIM 2216 tunes to the identified channel, and the NIM 2216 uses the encryption key from its memory to descramble the tuned RF signal. As a result, the NIM 2216 passes digital signals from the RF channel through the interface to the main portion of the DET 2218. In turn, the main portion of the DET 2218 uses the PID value from the connection block descriptor to begin MPEG decoding of the selected program and provide signals to the associated television set so as to provide an audio/visual display of the ordered pay-per-view event.

The 'facility' message from the level 1 gateway 2108 to the DET 2218 (step S1306) could initiate additional control functions. As noted, the 'facility' message specifies the start time of the event. In one example of an additional control function, a software application downloaded by the selected VIP may provide additional automatic operations for pay-per-view event viewing. Specifically, the software may respond to the start time either to display information on the television indicating that the purchased event is about to begin and recommending that the viewer tune to the correct channel to view the purchased event. Alternatively, the software may automatically turn the DET 2218 on and select the appropriate channel for reception and decoding at the beginning of the event.

Although not illustrated in the process flow of FIGS. 22 and 13 for simplicity, the pay-per-view event information supplied by the vendor will specify at least a preview window and may specify a cancellation time period. The ACC-4000 may instruct the relevant APD 2134 to modify the encryption key at different times, e.g. use a first key during the preview and a second key for the remainder of the event, and then provide the appropriate decryption keys for use at the correct times to the various NIMs 2216. Alteratively, the preview may be transmitted 'in-the-clear' without encryption. In this later case, the ACC-4000 only supplies the correct encryption and decryption keys, to the APD 2174 and the NIMs 2216 respectively, together with instructions to begin use the respective keys at the end of the preview window.

At the end of a pay-per-view event, the ACC-4000 supplies a new encryption key to the APD 2134. In response, the APD 2134 changes to encryption of the program channel, and the old decryption key stored in the NIMs for the previous event is no longer valid. The NIM/DETs not having the corresponding new decryption key can not receive and decode any new information transmitted on the pay-per-view channel.

In the preferred embodiment, the level 1 gateway 2108 maintains a list of the VIUs successfully activated to receive each purchased pay-per-view event. The level 1 gateway 2108 forwards this list to an appropriate billing system within the OSS 2109. If the VIP has elected to bill the VIUs for pay-per-view purchases, the purchase statistics go from the level 1 gateway to the CABS system to provide an itemized bill to the VIP who in turn adds the correct amounts to the VIUs' bills. Alternatively, the purchase statistics go from the level 1 gateway to the CRIS system so that the network operations company can bill the VIUs directly.

IMTV sessions through the network of FIGS. 5–9 will be discussed below with regard to the simplified message flow diagrams of FIG. 14A and 14B.

Some limited applications on the level 1 gateway 2108 may utilize the default channels. However, for most purposes, the default channels carry only certain limited initial signaling, particularly in the downstream direction. For most applications running on the level 1 gateway 2108, the exchange of signals between the level 1 gateway 2108 and the DET 2218 requires more bandwidth, at least in the downstream channel, than is available through the default channel. The level 1 gateway 2108 therefore controls the network to set up an interactive session between itself and the DET 2218 (See FIG. 14A). If a result of that session is a selection of an IMTV VIP 2260, the level 1 gateway 2108 then interacts with the relevant network control elements to establish a new communication session between the VIP's equipment and the DET 2218 (see FIG. 14B).

In the preferred embodiment, an interactive session begins when the user activates a button on the remote control specifying the level 1 gateway 2108. In response, the DET 2218 transmits an initial services request message through the upstream default channel through the access subnetwork and the ATM subnetwork to the level 1 gateway 2108 (step S1401 in FIG. 14A). Based on the VPI/VCI value and/or identification information in the message, the level 1 gateway identifies the DET 2218.

The level 1 gateway 2108 transmits a connection request to the Access Subnetwork Controller 2240 through the dedicated virtual circuit through the ATM backbone subnetwork 2106. The request at least identifies the DET 2218 and specifies the desired downstream bandwidth. If the signaling application for the level 1 gateway predicts a need for more upstream bandwidth than provided by the upstream default channel, this request or a separate request from the level 1 gateway will request additional upstream capacity. For convenience of discussion here, it is assumed that the level 1 gateway only requests a downstream channel and will rely on the upstream default channel for upstream signaling transport.

In response to the connection establishment request, the Access Subnetwork Controller 2240 first identifies an APD 2174 having available bandwidth capable of supporting the requested session and allocates a VPI/VCI value preassigned to that APD. The level 1 gateway 2108 will use a standard data transmission format, not necessarily MPEG. For non-MPEG transmissions, the APD 2174 will extract data from ATM cell payloads and encapsulate the data in MPEG-2 packets. Preferably the APD 2174 is preprogrammed to process cells having the allocated VPI/VCI value in a particular manner, i.e. to provide the correct PID values in the resultant MPEG packets and to output the packets on an identified one of the five output rails to result in transmission over a known RF channel. If not preprogrammed, the Access Subnetwork Controller 2240 instructs the assigned APD 2174 to provide the correct PID value in the MPEG packets and to output the packets on the identified output rail for result in transmission over a known RF channel. The Access Subnetwork Controller 2240 therefore effectively determines the connection block descriptor that will apply for this session between the level 1 gateway 2108 and the DET 2218.

The Access Subnetwork Controller 2240 also identifies the NIM or the DET to the ACC-4000 2242 and indicates the relevant network logical channel number. If the channel is encrypted, the ACC-4000 2242 sets up a communication with the NIM 2216 and downloads a decryption key for the channel for storage in the NIM (step S1403). More specifically, the ACC-4000 2242 transmits a message containing the decryption key to the NIM 2216 using the default channel and the PID value assigned as the NIM network address for the particular DET 2218. The NIM 2216 monitoring its default channel, recognizes its network address and captures the packet of message data for further processing. In the present case, the NIM 2216 responds to the message by adding the decryption key for the program to its memory.

The NIM 2216 may transmit back a confirmatory reply message (step S1404), and the ACC-4000 2242 so informs the Access Subnetwork Controller 2240. The Access Subnetwork Controller 2240 provides a reply message to the level 1 gateway 2108 indicating activation of the downstream channel throughto the NIM 2216 (step S1405). The reply message will include the connection block descriptor (logical channel number, RF channel, and PID value) for the assigned channel and the port ID and VPI/VCI value assigned for this session.

Internally, the level 1 gateway 2108 assigns one of its own ATM output ports and a VPI/VCI value for this session with the DET 2218. The level 1 gateway 2108 transmits a connection request to the PVC controller 2248 of the ATM subnetwork 2106 (step S1406). This connection request message includes an originating port ID, an originating VPI/VCI value, a terminating port ID, and a terminating VPI/VCI value. The originating port ID and VPI/VCI value are those of the level 1 gateway 2108, and the terminating port ID and VPI/VCI value are those of the access subnetwork. The connection request to the PVC controller 2248 also specifies bandwidth.

The PVC controller 2248 provides appropriate instructions to the ATM hub switch 2252 and/or to an ATM access switch (not shown) to establish an active ATM virtual circuit between the output port of the level 1 gateway 2108 and the assigned input port of the APD 2174 and to perform the necessary translation(s) between the originating VPI/VCI and the terminating VPI/VCI. The PVC controller 2248 then provides a confirmatory reply back to the level 1 gateway 2108 (step S1407).

The level 1 gateway 2108 transmits a 'set-up' message containing the connection block descriptor to the main portion of the DET 2218 through the downstream default signaling channel (step S1408). The main portion of the DET 2218 stores the connection block descriptor and returns a confirmation message back through the upstream default signaling channel (step S1409). At this point, the level 1 gateway 2108 can begin transmitting downstream information through the assigned virtual circuit through the ATM backbone subnetwork 2106 and the assigned logical channel through the access subnetwork. The main portion of the DET 2218 supplies a 'connect' message (not shown) to the NIM 2216 requesting that the NIM supply signals from the RF channel number specified in the connection block descriptor to the main portion of the DET. In response to the RF channel number, the selected NIM 2216 tunes to the identified channel, and the NIM 2216 uses the decryption key from its memory to descramble the tuned RF signal. As a result, the NIM 2216 passes digital signals from the RF channel through the interface to the main portion of the DET 2218. In turn, the main portion of the DET 2218 uses the PID value from the connection block descriptor to begin decoding and processing of MPEG packetized signals from the level 1 gateway 2108.

A two-way interactive session ensues between the VIU operating the DET 2218 and the level 1 gateway 2108 (step S1410). Although the level 1 gateway may request and obtain additional upstream signaling bandwidth, the example given relies only on the upstream default channel for signaling from the DET 2218 up to the level 1 gateway 2108. The level 1 gateway 2108 transmits information back to the DET 2218 for processing and/or presentation to the VIU via the newly established link downstream to the DET.

Although encapsulated in MPEG packets, either by the level 1 gateway itself or preferably by the APD 2174, the data can be video, audio or user data. The user data typically is text, signaling and control information for processing by the microprocessor in the main portion of the DET 2218. The information from the level 1 gateway may comprise still frame video information, limited and/or full motion video, as well as accompanying audio.

The interactive session between the VIU and the level 1 gateway 2108 can relate to a variety of applications available throughthat gateway. Examples of such applications include on-line pay-per-view event ordering, parental control functionalities, help, change PIN numbers, customize menus, select menu languages, check billing/account information, service changes/upgrades, etc. Many of these applications run entirely within the level 1 gateway 2108 and do not result in establishment of any further connection of the DET 2218 to other elements of the network.

Other applications running on the level 1 gateway 2108 result in a need to establish a new connection between the DET 2218 and some other service element on the network. The connection may go to an element of OSS 2109, e.g. to allow the VIU to review and/or modify her services. This type of situation also results when a user selects an IMTV service type VIP. In this later case, the preferred embodiment of the network will establish a broadband downstream connection between the VIP 2262 and the DET 2218 and at least an upstream signaling connection between the DET 2218 and the VIP 2262. Typically, the VIP has a level 2 gateway 2262 and a broadband multi-media server 2264. The broadband server 2264 transmits broadband information together with downstream signaling messages from the level 2 gateway 2262 through the downstream channel. The level 2 gateway 2262 receives signaling messages from the main portion of the DET 2218 through the somewhat narrower upstream channel.

In the present example, now assume that the interactive session with the level 1 gateway 2108 (S1410) results in the VIU selecting a Specific one of the IMTV VIPs connected to the enhanced video dial tone network (step S1411 in FIG. 14B).

In response, to the selection message from the DET (S1411), the level 1 gateway 2108 communicates over the locked up or dedicated "permanent" virtual circuit through the ATM backbone subnetwork 2106 with the level 2 gateway 2262 of the selected VIP 2260. Specifically, the level 1 gateway 2108 contacts the level 2 gateway and indicates, through a standard message, that it has a customer calling (step S1412). The level 1 gateway 2108 identifies the customer to the level 2 gateway, e.g. by the E.164 address of the DET 2218. The level 1 gateway 2108 may provide CPE identification information and CPE-type information for the DET 2218, and the VIP's level 2 gateway 2262 may accept or reject the call after receiving the initial request indicating a customer is available, in the manner discussed in more detail in the above incorporated 08/380,174 parent application.

If the VIP accepts the call, the level 2 gateway 2262 identifies a server output port and VPI/VCI value available for this session. The level 2 gateway 2262 sends an acceptance message back to the level 1 gateway 2108 through the dedicated virtual circuit through the ATM backbone subnetwork 2106 (step S1413). This message includes the server port ID, the VPI/VCI value and the downstream bandwidth. The level 2 gateway 2262 may also identify a signaling port on the level 2 gateway, a second VPI/VCI value and a bandwidth for the necessary upstream signaling connection and include this information in the acceptance message.

The level 1 gateway 2108 will send requests to the respective subnetwork controllers to establish the broadband downstream link and the narrowband upstream signaling link. In a preferred embodiment, the level 1 gateway would transmit a single request to each subnetwork controller. The ATM backbone subnetwork inherently provides two-way connections of specified bandwidths in each direction. The access subnetwork, however, may be viewed as only providing individual one-way connections. As a result, in an initial implementation, set-up of the downstream and upstream channels through the access subnetwork will require two separate requests and two separate procedures for establishing the desired channels.

FIG. 14B illustrates a multi-connection request procedure for establishing the broadband downstream channel and the upstream signaling channel through the access subnetwork. In the illustrated example, the level 1 gateway 2108 first requests the downstream channel and then requests the upstream channel. Other sequences are possible to establish the same upstream and downstream channels.

At step S1414, the level 1 gateway 2108 transmits a connection request for the downstream channel to the Access Subnetwork Controller 2240 through the dedicated virtual circuit through the ATM backbone subnetwork 2106. The request at least identifies the DET 2218 and specifies the desired downstream bandwidth. In response to the connection establishment request, the Access Subnetwork Controller 2240 first identifies an APD 2174 having available bandwidth capable of supporting the newly requested session. The APD 2174 has a VPI value and a range of VCI values assigned thereto. The Access Subnetwork Controller 2240 allocates a VCI value to this session and thereby defines an assigned VPI/VCI value for the downstream part of this session.

In the present example, assume that the IMTV VIP's equipment 2260 transmits all downstream data in MPEG packets, both for program information and in-band signaling messages ('user data'). Preferably the APD 2174 is preprogrammed to process cells having the assigned VPI/VCI value in a particular manner, i.e. to provide the correct PID values in the reconstructed MPEG packets and to output the packets on an identified one of the five output rails to result in transmission over a known RF channel. If not preprogrammed, the Access Subnetwork Controller 2240 instructs the assigned APD 2174 to provide the correct PID value in the MPEG packets and to output the packets on the identified output rail for result in transmission over a known RF channel. The Access Subnetwork Controller 2240 therefore effectively determines the connection block descriptor (logical channel number, RF channel and PID value) that will apply for the downstream portion of the session between the server 2264 and the DET 2218.

The Access Subnetwork Controller 2240 also identifies the NIM or the DET to the ACC-4000 2242 and indicates the relevant network logical channel number. If the assigned channel is encrypted, the ACC-4000 2242 sets up a communication with the NIM 2216 and downloads a decryption key for the channel for storage in the NIM (step S1415). More specifically, the ACC-4000 2242 transmits a message containing the decryption key to the NIM 2216 using the default channel and the PID value assigned as the NIM network address for the particular DET 2218. The NIM 2216 monitoring its default channel, recognizes its network address and captures the packet of message data for further processing. In the present case, the NIM 2216 responds to the message by adding the decryption key for the program to its memory.

The NIM 2216 may transmit back a confirmation message (step S1416), and the ACC-4000 2242 so informs the Access Subnetwork Controller 2240. The Access Subnetwork Controller 2240 provides a reply message to the level 1 gateway 2108 indicating activation of the downstream channel through to the NIM 2216 (step S1417). The reply message will include the connection block descriptor (logical channel number, RF channel, and PID value) for the assigned channel, as well as the port ID and VPI/VCI value assigned for this session.

The level 1 gateway 2108 next sends a connection request to the Access Subnetwork Controller 2240 for an upstream signaling channel (step S1418). Based on available resources identified within its internal databases, the Access Subnetwork Controller assigns RF bandwidth and an identifier for the upstream channel between the NIM and the demodulator 2192 and associated network controller (NC) 2194. The Access Subnetwork Controller also identifies a port, identifier and VPI/VCI value for the upstream communication.

The port and VPI value for the upstream signaling correspond to the ATM router 2196 and one of the network controllers (NCs) 2194 in the local video access node 2112 serving the VIU. The Access Subnetwork Controller 2240 instructs the assigned network controller 2192 to convert upstream messages carrying the assigned identifier (temporarily corresponding to the DET 2218) to an Ethernet format for transport through the local video access node 2112 to the ATM router 2196. In accord with this instruction, the network controller will apply an Ethernet address which the ATM router 2196 will map into the assigned VPI/VCI value when it encapsulates the message into ATM cell(s).

The Access Subnetwork Controller 2240 transmits a reply message to level 1 gateway 2108 (step S1419). The reply message contains the assigned port ID and VPI/VCI value for the upstream signaling channel.

The level 1 gateway 2108 next transmits a connection request to the PVC controller 2248 of the ATM subnetwork 2106 (step S1420). This connection request includes an originating port ID, an originating VPI/VCI value, a terminating port ID, a terminating VPI/VCI value and bandwidth, for both the upstream connection and the downstream connection. The originating IDs and VPI/VCI values are those of the server 2264 and associated level 2 gateway 2262, as previously assigned by the level 2 gateway. The terminating IDs and VPI/VCI values are those of the access subnetwork, assigned by the Access Subnetwork Controller 2240.

The PVC controller 2248 provides appropriate instructions to the ATM hub switch 2252 and/or to an ATM access switch (not shown) to establish an active two-way ATM virtual circuit between the specified VIP ports and the assigned ports of the APD 2174 and the ATM router 2196. The PVC controller 2248 also instructs the switch(es) to perform the necessary translation(s) between the originating VPI/VCIs and the terminating VPI/VCIs for transmissions in both directions through the ATM backbone subnetwork 2106. The PVC controller 2248 then provides a confirmatory reply back to the level 1 gateway 2108 (step S1421).

The level 1 gateway 2108 transmits a 'set-up' message to the main portion of the DET through the still existing downstream interactive link with the DET 2218 (step S1422) This message contains the connection block descriptor for the downstream channel and the RF channel assignment and packet identifier assigned for the upstream channel. The main portion of the DET 2218 stores the connection block descriptor in its memory and supplies the upstream channel information to the control processor of the NIM 2216 for use in transmitting upstream signaling messages. The DET 2218 returns a confirmation message back through the upstream signaling channel to the level 1 gateway 2108 (step S1423). In the present example, this message goes through the upstream default channel.

The 'set-up' message and corresponding reply message also indicate an end to the current session between the level 1 gateway 2108 and the DET 2218. The level 1 gateway transmits a message to the level 2 gateway 2262 indicating establishment of the broadband and signaling links (step S1424), and the level 1 gateway 2108 initiates a billing record for the call. The level 1 gateway also transmits tear down instructions to both the PVC controller 2248 and the Access Subnetwork Controller 2240 to take down the upstream and downstream session links between the level 1 gateway 2108 and the DET 2218 (step S1425). At this point, the level 2 gateway 2262 instructs the server 2264 to begin transmitting downstream information through the assigned virtual circuit through the ATM backbone subnetwork 2106 and the assigned logical network channel through the access subnetwork. The main portion of the DET 2218 supplies a 'connect' message (not shown) to the NIM 2216 requesting that the NIM supply signals from the RF channel number specified in the connection block descriptor to the main portion of the DET. In response to the RF channel number, the selected NIM 2216 tunes to the identified channel, and the NIM 2216 uses the decryption key from its memory to descramble the tuned RF signal. As a result, the NIM 2216 passes digital signals from the RF channel through the interface to the main portion of the DET 2218. In turn, the main portion of the DET 2218 uses the PID value from the connection block descriptor to begin decoding and processing of MPEG packetized signals from the level 1 gateway 2108.

For each upstream signaling message, e.g. responsive to a user input, the processor in the main portion of the DET 2218 supplies a message to the processor of the NIM 2216. Under the later processor's control, the NIM packetizes the message using the assigned identifier and transmits the packet(s) upstream over the assigned RF channel, using QPSK modulation. The demodulator 2192 demodulates the transmitted message and supplies the packet(s) to the network controller 2194. The network controller 2194 in turn routes the message over Ethernet 2200 to the ATM router 2196. The ATM router 2196 encapsulates the message into ATM cell(s), applies the upstream terminating VPI/VCI value assigned by the Access Subnetwork Controller 2240 and outputs those cells to the ATM subnetwork 2106. The ATM subnetwork 2106 routes the cells to the port of the level 2 gateway 2262 and maps the upstream terminating VPI/VCI value into the upstream originating VPI/VCI value originally assigned by the level 2 gateway.

Using these established downstream and upstream paths, a two-way interactive session ensues between the VIU operating the DET 2218 and the IMTV VIP system 2260 (step S1426).

The level 1 gateway 2108 times periods for confirmations or reply messages from the subnetwork controllers 2240 and 2248 and the DET 2218 in a manner discussed in more detail in the above incorporated 08/380,174 parent application to identify processing failures. Although not discussed in detail with regard to this embodiment, the level 1 gateway 2108 will provide displays to the VIU regarding various network conditions relating to IMTV call processing which are similar to the displays discussed in more detail in the parent case incorporated above.

When a broadband session ends, e.g. as indicated by an exchange of appropriate messages between the DET 2218 and the level 2 gateway 2262, the level 2 gateway instructs the level 1 gateway 2108 to tear down the broadband session connections. The instruction includes the DET identifier (typically the E.164 address) and the VIP's port identification numbers for the VIP ports used for the broadband and signaling communications. In response, the level 1 gateway 2108 stops the billing timing for that broadband session and transmits an instructions to the PVC controller 2248 and the Access Subnetwork Controller 2240 to tear down the broadband and signaling connections throughthe respective subnetworks.

The level 1 gateway 2108 creates a usage record for each IMTV session which will at least identify the VIU, the VIP, the start time and either the duration or the end time of the session. The level 1 gateway 2108 periodically uploads these usage records to billing systems within the OSS 2109. The billing systems bill the VIP or the VIU in precisely the same manner as discussed with regard to the embodiment of FIG. 1 in the above incorporated 08/380,174 parent application.

The level 1 gateway 2108 creates a log record that contains specific information including the time that the level 1 gateway received or sent each message. The subnetwork controllers provide failure reports, indicating the session to which the failure relates, to the level 1 gateway 2108. The level 1 gateway 2108 then notifies the level 2 gateway 2262 and possibly the DET 2218 of the network failure and terminates the billing record for the IMTV session.

For simplicity, the above discussion assumed that the IMTV VIP 2260 determined the downstream bandwidth for the interactive session when the level 1 gateway 2108 first notified the level 2 gateway 2262 of the incoming call. The present invention will also permit the VIP to renegotiate the bandwidth for either the downstream or the upstream connections, during an ongoing IMTV session. For example, at call set-up, the VIP might arbitrarily select a medium bandwidth requirement. If the VIU orders a high definition video requiring a higher bandwidth during the session, the VIP's level 2 gateway 2262 would transmit a request for higher bandwidth to the level 1 gateway 2108. The level 1 gateway would instruct the subnetworks to tear down existing connections and establish new connections as needed, in a manner similar to the procedure starting at step S1414 in FIG. 14B, to set-up the new higher bandwidth downstream link and/or modify the upstream signaling channel. The level 1 gateway 2108 would record the time and new bandwidth, as part of the record of this session.

Although preferred embodiments of the Access Subnetwork Controller operation and digital video distribution networks using that Controller in accord with the present invention have been described in detail above, it should be clear that the present invention is capable of numerous modifications as would be apparent to one of ordinary skill in the art. For example, the detailed discussion of the network implementations included all broadcast links within the access subnetwork. Future implementations providing national service likely will include a broadcast backbone network which supplies the broadcast video, e.g. in ATM cell streams, from the broadcast VIPs' systems to the broadcast consolidation point which serves as the broadcast service input point to the local access subnetwork. If the broadcast backbone subnetwork has dynamic control capabilities, e.g. for ATM switching type functions, the broadcast backbone subnetwork would also have a subnetwork controller with functions similar to those of the PVC controller and the Access Subnetwork Controller.

As noted, the preferred embodiments utilize an ATM switch based architecture for the backbone subnetwork $15_1$. However, a variety of other point-to-point routing technologies could be used. For example, the ATM switches could be replaced with digital dross connect switches or optical switches.

These and any other apparent modifications all fall within the purview of the appended claims.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A communication network comprising:

a plurality of user terminals receiving and processing broadband information;

a plurality of information provider systems;

a backbone subnetwork providing point-to-point communication sessions;

an access subnetwork receiving broadcast information signals and distributing the broadcast information signals to authorized ones of the user terminals and receiving digital broadband information signals from a selected interactive information provider system via the backbone subnetwork for transmission to one of the user terminals, the access subnetwork comprising:

(1) a broadcast provider interface receiving digital signals from respective broadcast information providers and combining the received digital signals into a consolidated broadcast signal, (2) a plurality of broadcast headend nodes receiving the consolidated broadcast signal, each broadcast headend node receiving a corresponding local broadcast signal and outputting a combined digital broadcast signal carrying at least a portion of the consolidated broadcast signal and the corresponding local broadcast signal, (3) groups of end offices receiving the combined digital broadcast signals from the respective broadcast headend nodes, each end office outputting to a selected group of the user terminals the combined digital broadcast signal from the corresponding broadcast headend node and a specified portion of the digital broadband information signals from the backbone subnetwork; and an access subnetwork controller controlling the access subnetwork including at least the end offices thereof to establish broadcast and dedicated connections therethrough in response to connection requests and providing reports regarding specific connections.

2. A communication network comprising:

a plurality of user terminals receiving and processing broadband information;

a plurality of information provider systems;

a backbone subnetwork providing point-to-point communication sessions;

an access subnetwork receiving broadcast information signals and distributing the broadcast information signals to authorized ones of the user terminals and receiving digital broadband information signals from a selected interactive information provider system via the backbone subnetwork for transmission to one of the user terminals; and an access subnetwork controller controlling the access subnetwork to establish broadcast and dedicated connections therethrough in response to connection requests and providing reports regarding specific connections, wherein the access subnetwork comprises:

a network of first optical fibers carrying digital broadcast programming from at least one of the information provider systems;

a plurality of host digital terminals, each host digital terminal being connected to the backbone subnetwork and the network of first optical fibers for selectively supplying digital point-to-point broadband information signals to at least one of the user terminals and digital broadcast programming from the network of first optical fibers to a group of the user terminals in response to selection requests from the group of user terminals and control signals from the access subnetwork controller.

3. A communication network as in claim 2, wherein the access subnetwork further comprises a respective second optical fiber connected to each host digital terminal carrying the digital point-to-point broadband information from the backbone network, wherein each host digital terminal selectively supplies the digital point-to-point broadband information from the respective second optical fiber to at least one user terminal.

4. A communication network as in claim 2, wherein the access subnetwork further comprises a plurality of optical network units connected by optical fiber to each host digital terminal, each optical network unit being connected by a cable to a subset of a group of user terminals.

5. A communication network as in claim 1, wherein the access subnetwork further comprises:

means for receiving said broadcast information signals in asynchronous transfer mode (ATM) cell streams and converting the ATM cell streams into a packet stream containing a plurality of said broadcast information signals, said means for receiving being controlled by said access subnetwork controller;

a modulator for modulating the packet stream into a predetermined channel; and means for broadcast the predetermined channel to the user terminals.

6. A communication network as in claim 5, wherein the broadcast information signals are encrypted, and the access subnetwork further comprises:

a network interface module connected to each user terminal for decrypting broadcast information signals; and a processor supplying decyption keys for specific broadcast information signals to network interface modules in response to instructions from the access subnetwork controller.

7. A communication network comprising:

a plurality of user terminals receiving and processing broadband information;

a plurality of information provider systems;

a backbone subnetwork providing point-to-point communication sessions;

an access subnetwork receiving broadcast information signals and distributing the broadcast information signals to authorized ones of the user terminals and receiving digital broadband information signals from a selected interactive information provider system via the backbone subnetwork for transmission to one of the user terminals; and an access subnetwork controller controlling the access subnetwork to establish broadcast and dedicated connections therethrough in response to connection requests and providing reports regarding specific connections, wherein the access subnetwork comprises:

a broadcast provider interface receiving digital signals from broadcast information providers, said broadcast provider interface comprising:

(1) means for combining asynchronous transfer mode (ATM) cell streams having specified VPI/VCI values and each containing one of the digital signals into a consolidated broadcast signal, and (2) means for optically transmitting the consolidated broadcast signal;

a plurality of broadcast headend nodes receiving the optically transmitted consolidated broadcast signal, each broadcast headend node comprising:

(i) at least one first ATM converter receiving two or more ATM cell streams having specified VPI/VCI values from the consolidated broadcast signal and recovering two or more of the digital signals from the received ATM cell streams, (ii) at least two modulators, each modulator modulating a recovered digital signal onto an assigned channel, (iii) a combiner combining modulated channel signals from the modulators into a first combined spectrum signal, and (iv) means for optically transmitting the first combined spectrum signal;

groups of end offices, each group of end offices receiving the first combined spectrum signal from a broadcast headend node servicing the group, each end office comprising:

(a) at least one second ATM converter which receives an ATM cell stream having a specified VPI/VCI value from the backbone network and recovers a digital broadband signal from the received ATM cell stream, (b) a modulator modulating the recovered digital signal onto an assigned channel to produce an additional signal, (c) a combiner combining the additional signal with the received first combined spectrum signal to form a second combined spectrum signal, and (d) means for transmitting the second combined spectrum signal; and for each end office, a local distribution network transporting the second combined spectrum signal from that end office to a group of the user terminals.

8. A communication network as in claim 7, wherein the first and second ATM converters encrypt the recovered digital signals, and the access subnetwork further comprises:

a network interface module connected to each user terminal for decrypting encrypted signals; and a processor supplying decyption keys for specific signals to network interface modules in response to instructions from the access subnetwork controller.

9. A system comprising:

an access subnetwork receiving broadcast information signals and selectively distributing the broadcast information signals to authorized user terminals and receiving interactive service broadband information signals from a point-to-point link through a backbone subnetwork for transmission to one of the user terminals; and an access subnetwork controller controlling the access subnetwork to establish broadcast and point-to-point connections through the access subnetwork to authorized user terminals in response to instructions and reporting on the status of connections through the access subnetwork;

wherein the access subnetwork comprises:

a network of first optical fibers carrying digital broadcast programming from at least one of the information provider systems;

a plurality of host digital terminals, each host digital terminal being connected to the backbone subnetwork and the network of first optical fibers for selectively supplying digital point-to-point broadband information signals to at least one of the user terminals and digital broadcast programming from the network of first optical fibers to a group of the user terminals in response to selection requests from the group of user terminals and control signals from the access subnetwork controller.

10. A system as in claim 9, wherein the access subnetwork further comprises a respective second optical fiber connected to each host digital terminal carrying digital point-to-point transmissions from the backbone network, wherein each host digital terminal selectively supplies digital point-to-point transmissions from the respective second optical fiber to at least one user terminal.

11. A system as in claim 9, wherein the access subnetwork further comprises a plurality of optical network units connected by optical fiber to each host digital terminal, each optical network unit being connected by a cable to a subset of a group of user terminals.

12. A system comprising:

an access subnetwork receiving broadcast information signals and selectively distributing the broadcast informationm signals to authorized user terminals and receiving interactive service broadband information signals from a point-to-point link through a backbone subnetwork for transmission to one of the user terminals; and an access subnetwork controller controlling the access subnetwork to establish connections through the access subnetwork to authorized user terminals in response to instructions and reporting on the status of connections through the access subnetwork;

wherein the access subnetwork comprises:
  (1) means for receiving said broadcast information signals in asynchronous transfer mode (ATM) cell streams from broadcast providers and converting the ATM cell streams into a first packet stream containing a plurality of said broadcast information signals, said means for receiving being controlled by said access subnetwork controller;
  (2) an ATM demultiplexer, controlled by the access subnetwork controller, converting second ATM cell streams received from the backbone subnetwork and carrying the interactive service broadband information signals into a second packet stream carrying the interactive service broadband information,
  (3) a modulator for modulating the first and second packet streams onto channels assigned by the access subnetwork controller; and
  (4) means for broadcasting the assigned channels to the user terminals.

13. A system as in claim 12, wherein the broadcast information signals are encrypted, and the access subnetwork further comprises:
  a network interface module connected to each user terminal for decrypting broadcast information signals; and
  a processor supplying decyption keys for specific broadcast information signals to network interface modules in response to instructions from the access subnetwork controller.

14. An access subnetwork comprising:
  a broadcast provider interface receiving digital signals from broadcast information providers, said broadcast provider interface comprising:
  (1) means for combining asynchronous transfer mode (ATM) cell streams having specified VPI/VCI values and each containing one of the digital signals into a consolidated broadcast signal, and
  (2) means for optically transmitting the consolidated broadcast signal;
  a plurality of broadcast headend nodes receiving the optically transmitted consolidated broadcast signal, each broadcast headend node comprising:
  (i) at least one first ATM converter receiving two or more ATM cell streams having specified VPI/VCI values from the consolidated broadcast signal and recovering two or more of the digital signals from the received ATM cell streams,
  (ii) at least two modulators, each modulator modulating a recovered digital signal onto an assigned channel,
  (iii) a combiner combining modulated channel signals from the modulators into a first combined spectrum signal, and
  (iv) means for optically transmitting the first combined spectrum signal;
  groups of end offices, each group of end offices receiving the first combined spectrum signal from a broadcast headend node servicing the group, each end office comprising:
  (a) at least one second ATM converter which receives an ATM cell stream having a specified VPI/VCI value from the ATM network and recovers a digital broadband signal from the received ATM cell stream,
  (b) a modulator modulating the recovered digital signal onto an assigned channel to produce an additional signal,
  (b) a combiner combining the additional signal with the received first combined spectrum signal to form a second combined spectrum signal, and
  (c) means for transmitting the second combined spectrum signal;
  for each end office, a local distribution network transporting the second combined spectrum signal from that end office to a group of digital entertainment terminals; and
  an access subnetwork controller controlling at least some operations of the broadcast headend nodes and the end offices in response to connection requests and providing reports regarding specific connections.

15. A communication network as in claim 14, wherein the first and second ATM converters encrypt the recovered digital signals, and the access subnetwork further comprises:
  a network interface module connected to each user terminal for decrypting encrypted signals; and
  a processor supplying decyption keys for specific signals to network interface modules in response to instructions from the access subnetwork controller.

16. The system of claim 9, wherein the host digital terminals initiate a connection for transport of said broadcast information to a new user in response to a provisioning request from the access subnetwork controller.

17. The system of claim 12, wherein the access subnetwork further comprises a broadcast provider interface receiving the broadcast information signals from the respective broadcast providers and multiplexing the received broadcast information signals into said ATM cell streams.

18. The system of claim 17, wherein the broadcast provider interface comprises a digital encoder generating encoded broadcast signals from analog broadcast signals received from at least one of the broadcast providers, the ATM cell streams carrying the encoded broadcast signals.

19. A system comprising:
  an access subnetwork comprising:
    (1) a broadcast interface receiving first ATM cell streams carrying broadcast information signals, recovering the broadcast information signals from the ATM cell streams, and selectively distributing the recovered broadcast information signals to authorized user terminals in response to reception of broadcast selection signals,
    (2) an interactive interface receiving, from a backbone subnetwork, second ATM cell streams carrying interactive service broadband information signals from a point-to-point link through the backbone subnetwork, the interactive interface recovering the interactive service broadband information signals from the second ATM cell stream for transmission to one of the user terminals via said point-to-point link,
    (3) a local distribution network selectively supplying the recovered broadcast information signals and the interactive service broadband information signals to the user terminals; and
  an access subnetwork controller controlling the broadcast interface and the interactive interface to establish connections through the local distribution network to authorized user terminals in response to instructions and reporting on the status of connections through the access subnetwork.

20. The system of claim 19, wherein the broadcast selection signals are supplied by the authorized users.

21. The system of claim 19, wherein the broadcast selection signals are supplied by the access subnetwork controller.

* * * * *